United States Patent
Mashino et al.

(10) Patent No.: US 8,792,359 B2
(45) Date of Patent: Jul. 29, 2014

(54) COMMUNICATION SYSTEM, TRANSMITTING DEVICE, RECEIVING DEVICE, TRANSMISSION METHOD, AND COMMUNICATION METHOD

(75) Inventors: Jun Mashino, Yokosuka (JP); Takatoshi Sugiyama, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 363 days.

(21) Appl. No.: 13/133,075

(22) PCT Filed: Dec. 16, 2009

(86) PCT No.: PCT/JP2009/006923
§ 371 (c)(1), (2), (4) Date: Jun. 6, 2011

(87) PCT Pub. No.: WO2010/070898
PCT Pub. Date: Jun. 24, 2010

(65) Prior Publication Data
US 2011/0249569 A1    Oct. 13, 2011

(30) Foreign Application Priority Data

Dec. 18, 2008 (JP) ................ 2008-322864
Dec. 19, 2008 (JP) ................ 2008-324701

(51) Int. Cl.
*H04J 1/16* (2006.01)

(52) U.S. Cl.
USPC .......................... 370/242; 370/333

(58) Field of Classification Search
USPC ................................ 370/242, 333
See application file for complete search history.

(56) References Cited

U.S. PATENT DOCUMENTS

2006/0160498 A1* 7/2006 Sudo .................. 455/103
2009/0141818 A1  6/2009 Hiramatsu et al.

FOREIGN PATENT DOCUMENTS

| EP | 1 551 121 A1 | 7/2005 |
|---|---|---|
| JP | 2004-187257 | 7/2004 |
| JP | 2004-266739 | 9/2004 |
| JP | 2009-147529 | 7/2009 |
| WO | 2007/007795 | 1/2007 |
| WO | 2010/010867 | 1/2010 |
| WO | 2010/010936 | 1/2010 |

OTHER PUBLICATIONS

Mashino, Jun, et al., "An Interference Suppression Scheme using FEC Metric Masking for Superposed Multi-Carrier Transmission," Proceedings of the Society Conference of the Institute of Electronics, Information, and Communication Engineers, B-5-83, Sep. 2, 2008, p. 396.
Notice of Reasons for Rejection, Japanese Patent Application No. 2010-542875, Aug. 7, 2012.

(Continued)

*Primary Examiner* — Sai-Ming Chan
(74) *Attorney, Agent, or Firm* — Harness, Dickey & Pierce, P.L.C.

(57) ABSTRACT

A communication system employs a transmitting device and a receiving device. The transmitting device allocates certain data, based on transmission data, to both a non-superposed band, corresponding to a frequency band with no interference signal present, and a superposed band, corresponding to a frequency band where an interference signal is present. Alternatively, the transmitting device allocates the data to the non-superposed band while giving a higher priority to the non-superposed band. The transmitting device then generates and transmits a multicarrier signal based on the allocation, so that the receiving device can receive it.

19 Claims, 35 Drawing Sheets

(56) References Cited

OTHER PUBLICATIONS

Jin Young Kim, "Performance of OFDM/CDMA system with turbo coding in a multipath fading channel", IEEE Transactions on Consumer Electronics, vol. 45, No. 2, pp. 372-279, May 1999.

Hiroaki Terada et al., College Course: Information Communication Engineering, Ohmsha, Mar. 25, 1993, pp. 24-25 with partial English translation thereof.

J. Mashino et al., "Frequency Utilization Efficiency Improvement by Superposed Multicarrier Transmission Scheme", IEICE Technical Report, vol. 108, No. 188, pp. 85-90, RCS2008-67 (Aug. 2008) with English abstract.

J. Mashino et al., "Frequency Utilization Efficiency Improvement by Cyclic FEC Decoding in Superposed Multicarrier Transmission", IEICE Technical Report, vol. 108, No. 305, pp. 13-18, RCS2008-132 (Nov. 2008) with English abstract.

International Search Report (Japanese and English) and Written Opinion of the ISA (Japanese) for PCT/JP2009/006923.

Jin Young Kim, "Performance of OFDM/CDMA system with turbo coding in a multipath fading channel", IEEE Transactions on Consumer Electronics, vol. 45, No. 2, pp. 372-379, May 1999.

International Search Report (Japanese and English) and Written Opinion of the ISA (Japanese) for PCT/JP2009/006923 mailed Feb. 23, 2010.

\* cited by examiner

COMMUNICATION SYSTEM, TRANSMITTING DEVICE, RECEIVING DEVICE, TRANSMISSION METHOD, AND COMMUNICATION METHOD

TECHNICAL FIELD

The present invention relates to a multicarrier signal communication system, a transmitting device, a receiving device, a transmission method, and a communication method. More specifically, the present invention relates to a communication system, a transmitting device, a receiving device, a transmission method, and a communication method when wireless communication is performed using a multicarrier transmission scheme in a wireless communication environment in which interference signals are present.

Priority is claimed on Japanese Patent Application No. 2008-322864, filed on Dec. 18, 2008, and Japanese Patent Application No. 2008-324701, filed on Dec. 19, 2008, the contents of which are incorporated herein by reference.

BACKGROUND ART

Recently, with the proliferation of wireless communications, radio waves of various wireless systems are present in close frequency bands. Generally, in order to receive a desired signal with a predetermined quality, it is preferable that there is only the desired signal and no interference signals. In other words, when a receiving device receives an interference signal together with the desired signal, the reception precision of the desired signal in the receiving device is deteriorated, and it becomes difficult to correctly reproduce transmitted data.

In regard to such problems, the reception precision of the desired signal can be enhanced by performing an interference-avoidance operation of detecting a frequency band in which an interference signal is present, and shifting the frequency band of the desired signal so as to arrange it in a frequency band that is different from that of the interference signal. However, in this case, since the total frequency bandwidth occupied by the desired signal and the interference signal must at least be greater than or equal to the sum of the frequency bandwidths of the respective signals, this method is not preferable from the point of view of the frequency utilization efficiency.

On the other hand, a technique is proposed in which a multicarrier transmission scheme is introduced that applies a forward error correction code to signals that are adjacent in a frequency domain, overlapping of spectra of transmission signals in the frequency domain is allowed, and then each transmitting device transmits a signal, thereby reducing the total frequency bandwidth occupied by a plurality of systems and increasing the frequency utilization efficiency. In this technique, the receiving device detects the frequency position and band in which an interference signal is present based on any means such as a pilot signal or a null signal interval, performs filtering or equivalent weighting signal processing to suppress multicarrier signals and interference signals in the detected frequency position of the interference signal, demodulates respective subcarriers of a multicarrier signal after suppression by the filtering has been performed, and subjects the demodulated signal to error correction. Thus, it becomes possible to adequately achieve an error correction effect using subcarriers at frequency positions unaffected by the interference signal, restore data of subcarriers affected by the interference signal, and receive the data correctly. Hereinafter, this type of transfer technique will be termed superposed multicarrier transmission.

In this way, in the field of recent wireless communications, there is a demand for shared-frequency wireless communications. FIG. 36 is a conceptual diagram showing the entirety of two wireless local area network (LAN) systems with different frequency channels, as an example of a combination of wireless communication systems sharing a frequency band.

In the figure, the wireless communication systems are provided with wireless LAN base stations $2a$ and $2b$, and a receiving device $1a$. The wireless LAN base station $2a$ performs communications using a frequency band of CH1 having a center frequency fa. On the other hand, the wireless LAN base station $2b$ performs communications using a frequency band of CH5 having a center frequency fb (where fa<fb).

In this case, the receiving device $1a$ is arranged at a position at which radio signals of both the wireless LAN base station $2a$ and the wireless LAN base station $2b$ arrive, and receives a signal in which two radio signals including a radio signal having the center frequency fa and a radio signal having the center frequency fb partially interfere with each other.

In this way, when the receiving device $1a$ communicates with the wireless LAN base station $2a$ serving as its communications target, it is essential for the receiving device $1a$ to accurately receives a desired signal even in shared-frequency wireless communication in which the transmission frequency band of the desired signal having the center frequency fa partially overlap the transmission frequency band of an interference signal having the center frequency fb from the wireless LAN base station $2b$.

It is noted that as another example of sharing a frequency band, there is a case in which frequencies are shared between systems with different communication schemes, such as combinations of a wireless LAN system, Bluetooth (registered trademark), and WiMAX (registered trademark).

On the other hand, Non-Patent Document 1 gives a detailed description of a mechanism of a turbo code, which is one type of error correction code for accurately receiving a desired signal, and reception performance when the turbo code is combined with orthogonal frequency-division multiplexing (OFDM), which is a multicarrier signal.

Additionally, two-way communication systems sometimes employ a retransmission technique as a compensatory technique when transmitted data has not been properly received. For example, in an automatic repeat request (ARQ) error control scheme, error detection processing is performed at a receiving device, and, when no error is detected, an acknowledgment (ACK) is transmitted to a transmitting device; when an error is detected, a negative acknowledgment (NACK) is transmitted to the transmitting device. The transmitting device, which receives a NACK, retransmits the data corresponding to the NACK until an ACK is received.

PRIOR ART DOCUMENTS

Non-Patent Documents

Non-Patent Document 1: Jin Young Kim, "Performance of OFDM/CDMA system with turbo coding in a multipath fading channel," IEEE Transactions on Consumer Electronics, Vol. 45, No. 2, pp. 372-379, MAY 1999

Non-Patent Document 2: Hiroaki Terada et al, "College Course: Information Communication Engineering," Ohmsha, Mar. 25, 1993, pp. 24-25.

DISCLOSURE OF INVENTION

Problems to be solved by the Invention

In order to correct an error in a radio signal and accurately receive a desired signal, a forward error correction (FEC)

code such as, for example, the turbo code mentioned above is used. One type of FEC code generates an input bit sequence of systematic bits, and an error correction bit sequence of parity bits or punctured parity bits obtained by puncturing (thinning) parity bits. It is known that, when using such an FEC code, if the coding rate is the same, a desired signal can be received more accurately when the ratio of correctly received systematic bits is high than when the ratio of correctly received parity bits is high. That is, in a multicarrier wireless communication system where interference is occurring as shown in FIG. 36, when systematic bits are transmitted in frequency bands where no interference is occurring, the desired signal can be received more accurately.

However, since it is conventional not to treat systematic bits and parity bits differently when dispersing them to a plurality of subcarriers, there is a possibility that deterioration in reception quality of the systematic bits will result in saturation of the bit error rate (BER) performance.

Additionally, in wireless communications, since a propagation path environment generally fluctuates over time, it is often the case that the propagation path environment will be improved by repeated retransmission with ARQ, enabling the transmission processing to be completed normally. However, in superposed multicarrier transmission, in order to increase the utilization efficiency of the frequency bands, a desired signal is transmitted so as to intentionally interfere with interference signals in part of a frequency band. Such an interference signal often continues to be present in a specific frequency band; in such a case, the propagation path environment does not improve over time. Consequently, there is a problem that the transmission processing cannot be completed normally using a conventional ARQ.

The present invention has been made in consideration of the above circumstances, and an object thereof is to provide a communication system, a transmitting device, a receiving device, a transmission method, and a communication method that can enhance reception quality in multicarrier wireless communications.

More specifically, an object of the present invention is to provide a communication system, a transmitting device, a receiving device, a transmission method, and a communication method that, in a multicarrier wireless communication system to which error correction that generates systematic bits and parity bits is applied, can enhance reception quality by transmitting the systematic bits in a frequency band where no interference is occurring.

Moreover, an object of the present invention relates to retransmission processing, which is a countermeasure against decoding errors that occur due to radio wave interference in part of the frequency bands used in superposed multicarrier transmission, and is to provide a communication system, a transmitting device, a receiving device, a transmission method, and a communication method that can reduce the error occurrence probability during retransmission and enhance reception quality.

Means for Solving the Problems

[1] In order to solve the abovementioned problems, a communication system of the present invention is a communication system which superposes and transfers a wireless multicarrier signal including a plurality of subcarriers, including: a transmitting device which performs allocation of predetermined data generated from transmission data to both a non-superposed band which is a frequency band in which no interference signal is present and a superposed band which is a frequency band in which the interference signal is present, or to the non-superposed band while giving a higher priority to the non-superposed band, and generates and transmits the multicarrier signal based on the allocation; and a receiving device which receives the multicarrier signal transmitted from the transmitting device.

[2] In the communication system of the present invention, the transmitting device may include: a coding section which applies error correction coding to generate systematic bits and parity bits from the transmission data; a data allocating section which, based on information on the superposed band in a used frequency band of the multicarrier signal, preferentially allocates the systematic bits generated by the coding section to the non-superposed band in the used frequency band, and preferentially allocates the parity bits generated by the coding section to the superposed band; a modulating section which modulates the systematic bits and the parity bits into subcarriers in a frequency band allocated by the data allocating section; and a multicarrier signal modulating section which generates the multicarrier signal from a signal modulated into the respective subcarriers by the modulating section, the receiving device may include: a multicarrier signal demodulating section which demodulates the multicarrier signal received from the transmitting device for the respective subcarriers; a demodulating section which demodulates received signals of the respective subcarriers demodulated by the multicarrier signal demodulating section; a data extracting section which, based on the information on the superposed band in the used frequency band of the multicarrier signal, obtains used frequency bands of the systematic bits and the parity bits, and, based on the used frequency bands thus obtained, extracts the parity bits and the systematic bits from the received signal of the respective subcarriers demodulated by the demodulating section; and a decoding section which decodes the transmission data using the systematic bits and the parity bits extracted by the data extracting section, and the predetermined data may be the systematic bits.

[3] In the communication system of the present invention, the transmitting device may further include an interleaver for systematic bits which interleaves the systematic bits generated by the coding section, and outputs to the modulating section, and the receiving device may further include a deinterleaver for systematic bits which deinterleaves the systematic bits extracted by the data extracting section, and outputs to the decoding section.

[4] In the communication system of the present invention, the transmitting device may further include an interleaver for parity bits which interleaves the parity bits generated by the coding section, and outputs to the modulating section, and the receiving device may further include a deinterleaver for parity bits which deinterleaves the parity bits extracted by the data extracting section, and outputs to the decoding section.

[5] In the communication system of the present invention, the transmitting device may further include an interleaver for non-superposed band which interleaves the systematic bits and the parity bits allocated to the non-superposed band by the data allocating section, and outputs to the modulating section, and the receiving device may further include a deinterleaver for non-superposed band which deinterleaves a received signal demodulated from subcarriers of the non-superposed band by the demodulating section, and outputs to the data extracting section.

[6] In the communication system of the present invention, the transmitting device may further include an interleaver for superposed band which interleaves the parity bits allocated to the superposed band by the data allocating section, and outputs to the modulating section, and the receiving device may further include a deinterleaver for superposed band which deinterleaves a received signal demodulated from subcarriers of the superposed band by the demodulating section, and outputs to the data extracting section.

[7] In the communication system of the present invention, the coding section may apply the error correction coding with a coding rate by which a ratio of a bit sequence of the parity bits to a bit sequence of the systematic bits is larger than a ratio of the superposed band to the non-superposed band.

[8] In the communication system of the present invention, the communication system may be a multicarrier wireless communication system which applies error correction coding and transfers the wireless multicarrier signal, the receiving device may include: a demodulating section which demodulates the received multicarrier signal for the respective subcarriers; a superposed band information generating section which generates superposed band information indicating the superposed band in the received multicarrier signal; a superposed band information signal transmitting section which transmits the superposed band information to the transmitting device; a weighting coefficient generating section which generates a weighting coefficient for each subcarrier which reduce the reliability in the error correction coding of subcarriers with interference among the plurality of subcarriers, as compared to the reliability of other subcarriers; a weighting calculation section which performs weighting calculation processing of applying the weighting coefficient to a demodulated value of a subcarrier of the multicarrier signal demodulated by the demodulating section; a decoding section which performs error correction processing and decoding processing using a value calculated by the weighting calculation section for each subcarrier; an error deciding section which detects whether or not an error has occurred in a bit sequence decoded by the decoding section based on an error detection code, and, if an error has occurred, transmits retransmission command information to the transmitting device; and a retransmitted signal receiving control section which, when the error deciding section has transmitted the retransmission command information, generates a retransmitted bit sequence based on the bit sequence relating to a signal retransmitted from the transmitting device, the transmitting device may include: a coding section which adds the error detection code to the transmission data, performs error correction coding, and generates coded bits; a modulating section which modulates the coded bits to generate a plurality of modulated symbols; a subcarrier allocating section which arranges the respective modulated symbols in respective subcarriers to generate a demodulated signal; a transmitting section which generates a transmission signal from the modulated signal, and performs transmission; and a retransmission control section which temporarily stores the modulated symbols, receives the retransmission command information and the superposed band information, and, when retransmission is commanded, selects subcarriers with no interference based on the superposed band information, and commands the subcarrier allocating section to arrange modulated symbols to be retransmitted among the modulated symbols being temporarily stored, in the selected subcarriers, and to perform retransmission and the predetermined data is the modulated symbols to be retransmitted.

[9] In the communication system of the present invention, when the number of the modulated symbols to be retransmitted is larger than the number of the subcarriers with no interference, the retransmission control section may transmit all of the modulated symbols to be retransmitted by performing a plurality of retransmissions using only the subcarriers with no interference, and may additionally transmit retransmission control information indicating that the modulated symbols to be retransmitted are transmitted in the plurality of transmissions, and the retransmitted signal receiving control section may combine respective bit sequences transmitted in the plurality of transmissions based on the retransmission control information, to generate a retransmitted bit sequence.

[10] In the communication system of the present invention, the transmitting device may perform wireless communication with a plurality of receiving devices by allocating a plurality of subcarriers in an available frequency band to the plurality of receiving devices, and the retransmission control section may select the subcarriers with no interference for use in the retransmission from among all subcarriers included in the available frequency band.

[11] In the communication system of the present invention, the retransmission control section may select a plurality of subcarriers which are furthest in a frequency domain from the subcarriers with interference from among all subcarriers included in the available frequency band.

[12] Additionally, a transmitting device of the present invention is a transmitting device in a communication system which superposes and transfers a wireless multicarrier signal including a plurality of subcarriers, including: a data allocating section which performs an allocation of predetermined data generated from transmission data to both a non-superposed band which is a frequency band in which no interference signal is present and a superposed band which is a frequency band in which the interference signal is present, or to the non superposed band while giving a higher priority to the non-superposed band, and the transmitting device may generate and transmit the multicarrier signal based on the allocation.

[13] The transmitting device of the present invention may further include a coding section which applies error correction coding to generate systematic bits and parity bits from the transmission data, and, based on information on the superposed band in a used frequency band of the multicarrier signal, the data allocating section may preferentially allocate the systematic bits generated by the coding section to the non-superposed band in the used frequency band, and may preferentially allocate the parity bits generated by the coding section to the superposed band, the transmitting device may further include: a modulating section which modulates the systematic bits and the parity bits into subcarriers in a frequency band allocated by the data allocating section; and a multicarrier signal modulating section which generates the multicarrier signal from a signal modulated into the respective subcarriers by the modulating section, and the predetermined data may be the systematic bits.

[14] Additionally, a receiving device of the present invention is a receiving device which receives a wireless multicarrier signal including a plurality of subcarriers, including: a multicarrier signal demodulating section which demodulates the multicarrier signal received from a transmitting device for the respective subcarriers; a demodulating section which demodulates received signals of the respective subcarriers demodulated by the multicarrier signal demodulating section; a data extracting section which, based on information on a superposed band in a used frequency band of the multicarrier signal, obtains used frequency bands of systematic bits and parity bits, and extracts the parity bits and the systematic bits from the received signal of the respective subcarriers demodulated by the demodulating section based on the used frequency band thus obtained; and a decoding section which decodes transmission data using the systematic bits and the parity bits extracted by the data extracting section.

[15] Additionally, a communication method of the present invention is a communication method used in a communication system which superposes and transfers a wireless multicarrier signal including a plurality of subcarriers, including: a data allocating step in which a transmitting device performs an allocation of predetermined data generated from transmission data to both a non-superposed band which is a frequency band in which no interference signal is present and a superposed band which is a frequency band in which the interference signal is present, or to the non-superposed band, while giving a higher priority to the non-superposed band; a step in which the transmitting device generates and transmits the multicarrier signal based on the allocation; and a step in which a receiving device receives the transmitted multicarrier signal.

[16] The communication method of the present invention may further include a coding step in which the transmitting device applies error correction coding to generate systematic bits and parity bits from the transmission data, in the data allocating step, based on information on the superposed band in a used frequency band of the multicarrier signal, the transmitting device may preferentially allocate the systematic bits generated in the coding step to the non-superposed band in the used frequency band, and may preferentially allocate the parity bits generated in the coding step to the superposed band; the method may further include: a modulating step in which the transmitting device modulates the systematic bits and the parity bits into subcarriers in a frequency band allocated in the data allocating step; a multicarrier signal modulating step in which the transmitting device generates the multicarrier signal from a signal modulated into the respective subcarriers in the modulating step; a multicarrier signal demodulating step in which the receiving device demodulates the multicarrier signal received from the transmitting device for the respective subcarriers; a demodulating step in which the receiving device demodulates received signals of the respective subcarriers demodulated in the multicarrier signal demodulating step; a data extracting step in which the receiving device, based on the information on the superposed band in the used frequency band of the multicarrier signal, obtains used frequency bands of the systematic bits and the parity bits, and, based on the used frequency bands thus obtained, extracts the parity bits and the systematic bits from the received signal of the respective subcarriers demodulated in the demodulating step; and a decoding step in which the receiving device decodes the transmission data using the systematic bits and the parity bits extracted in the data extracting step, and the predetermined data may be the systematic bits.

[17] In the communication method of the present invention, the communication method may be a multicarrier wireless communication method which applies error correction coding and transfers the wireless multicarrier signal, and may further include: a demodulating step in which the receiving device demodulates the received multicarrier signal for the respective subcarriers; a superposed band information generating step in which the receiving device generates superposed band information indicating the superposed band in the received multicarrier signal; a superposed band information signal transmitting step in which the receiving device transmits the superposed band information to the transmitting device; a weighting coefficient generating step in which the receiving device generates a weighting coefficient for each subcarrier which reduces the reliability in the error correction coding of subcarriers with interference among the plurality of subcarriers, as compared to the reliability of other subcarriers; a weighting calculation step in which the receiving device performs weighting calculation processing of applying the weighting coefficient to a demodulated value of a subcarrier of the multicarrier signal demodulated in the demodulating step; a decoding step in which the receiving device performs error correction processing and decoding processing using a value of each subcarrier calculated in the weighting calculation step; an error deciding step in which the receiving device detects whether or not an error has occurred in a bit sequence decoded in the decoding step based on an error detection code, and, if an error has occurred, transmits a retransmission command information to the transmitting device; a retransmitted signal receiving control step in which, when the error deciding step has transmitted the retransmission command information, the receiving device generates a retransmitted bit sequence based on the bit sequence relating to a signal retransmitted from the transmitting device; a coding step in which the transmitting device adds the error detection code to the transmission data, performs error correction coding, and generates coded bits; a modulating step in which the transmitting device modulates the coded bits and generates a plurality of modulated symbols; a subcarrier allocating step in which the transmitting device arranges the respective modulated symbols into the respective subcarriers, and generates a modulated signal; a transmitting step in which the transmitting device generates a transmission signal from the modulated signal, and performs transmission; and a step in which the transmitting device temporarily stores the modulated symbols, receives the retransmission command information and the superposed band information, and, when retransmission is commanded, selects subcarriers with no interference based on the superposed band information, arranges modulated symbols to be retransmitted among the modulated symbols being temporarily stored, in the selected subcarriers, and performs retransmission, and the predetermined data may be the modulated symbols to be retransmitted.

[18] Additionally, a transmission method of the present invention is a transmission method used in a communication system which superposes and transmits a wireless multicarrier signal including a plurality of subcarriers, including: a data allocation step of performing an allocation of predetermined data generated from transmission data to both a non-superposed band which is a frequency band in which no interference signal is present and a superposed band which is a frequency band in which the interference signal is present, or to the non-superposed band, while giving a higher priority to the non-superposed band; a step of generating and transmitting the multicarrier signal based on the allocation.

Effect of the Invention

In accordance with the present invention, in a multicarrier wireless communication system applying error correction that generates systematic bits and parity bits, reception quality can be enhanced by preferentially transmitting systematic bits in a frequency band in which no interference is occurring. In addition, by randomizing the systematic bits in an interference region, the reception quality can be further enhanced.

Furthermore, in accordance with the present invention, when an error has occurred during reception of a packet due to interference in superposed multicarrier transmission, retransmission is accomplished using subcarriers with no interference. Therefore, even in an environment where interference is liable to occur, such as superposed multicarrier transmission, the transmission processing can be completed normally. Moreover, the error occurrence probability during retransmission can be reduced, enhancing the reception quality.

MODE FOR CARRYING OUT THE INVENTION

Hereinafter, respective embodiments of the present invention will be described with reference to the drawings.

One feature of each embodiment of the present invention is that, in superposed multicarrier transmission, while giving a higher priority to a non-superposed band, which is a frequency band in which no interference signal is present, predetermined data generated from transmission data (as described below, systematic bits constituting a bit sequence of input transmission data, or modulated symbols constituting a packet commanded to be retransmitted) is allocated to both the non-superposed band and a superposed band, which is a frequency band in which an interference signal is present, or only to one of them (i.e., the non-superposed band).

Figure 1:
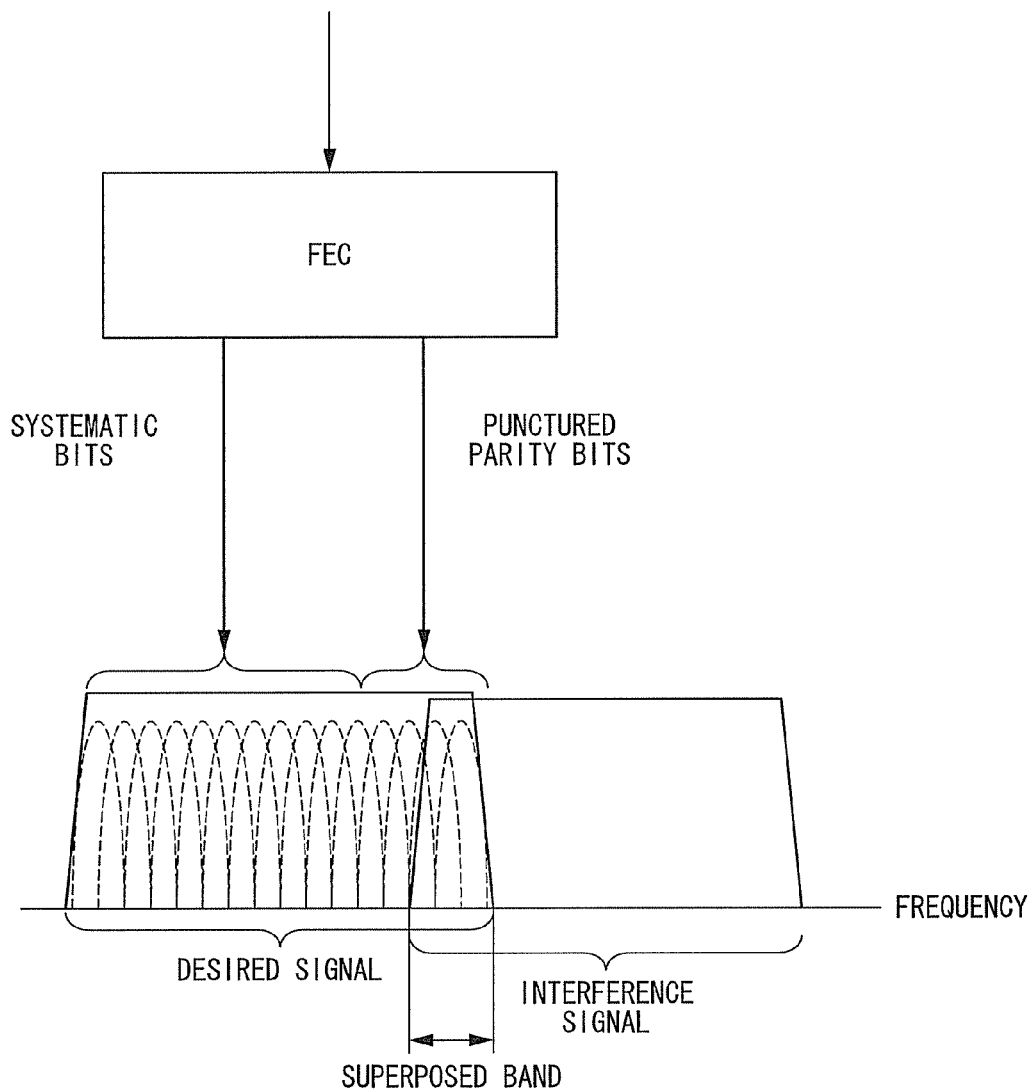
FIG. 1 is a diagram showing an overview of an operation of a transmitting device in accordance with a first embodiment of the present invention.

FIG. 1 shows an overview of the operation of a transmitting device in accordance with a first embodiment and a second embodiment of the present invention. The transmitting device of the present embodiments transmits a multicarrier signal of orthogonal frequency-division multiplexing (OFDM) or the like, and uses a forward error correction (FEC) code as an error correction code. The transmitting device applies a turbo code or the like to generate systematic bits, which are a bit sequence of input transmission data, and parity bits, which are an error-correction bit sequence, and performs puncturing by thinning the generated parity bits in accordance with a coding rate. Then a signal sequence of punctured parity bits obtained by the puncturing is preferentially allocated to the superposed band, and a signal sequence of the systematic bits is preferentially allocated to the non-superposed band. The systematic bits are thus allocated to a frequency band with no interference, whereby the systematic bits are correctly received, enabling the receiving device to receive a desired signal more accurately and preventing deterioration in the quality of a received signal. Moreover, by randomizing by separate interleaving of the systematic bits and the parity bits and/or separate interleaving of the non-superposed band and the superposed band, the systematic bits can be received even more accurately.

First Embodiment

An embodiment in which interleaving is performed separately for systematic bits and parity bits will now be described.

Figure 2:
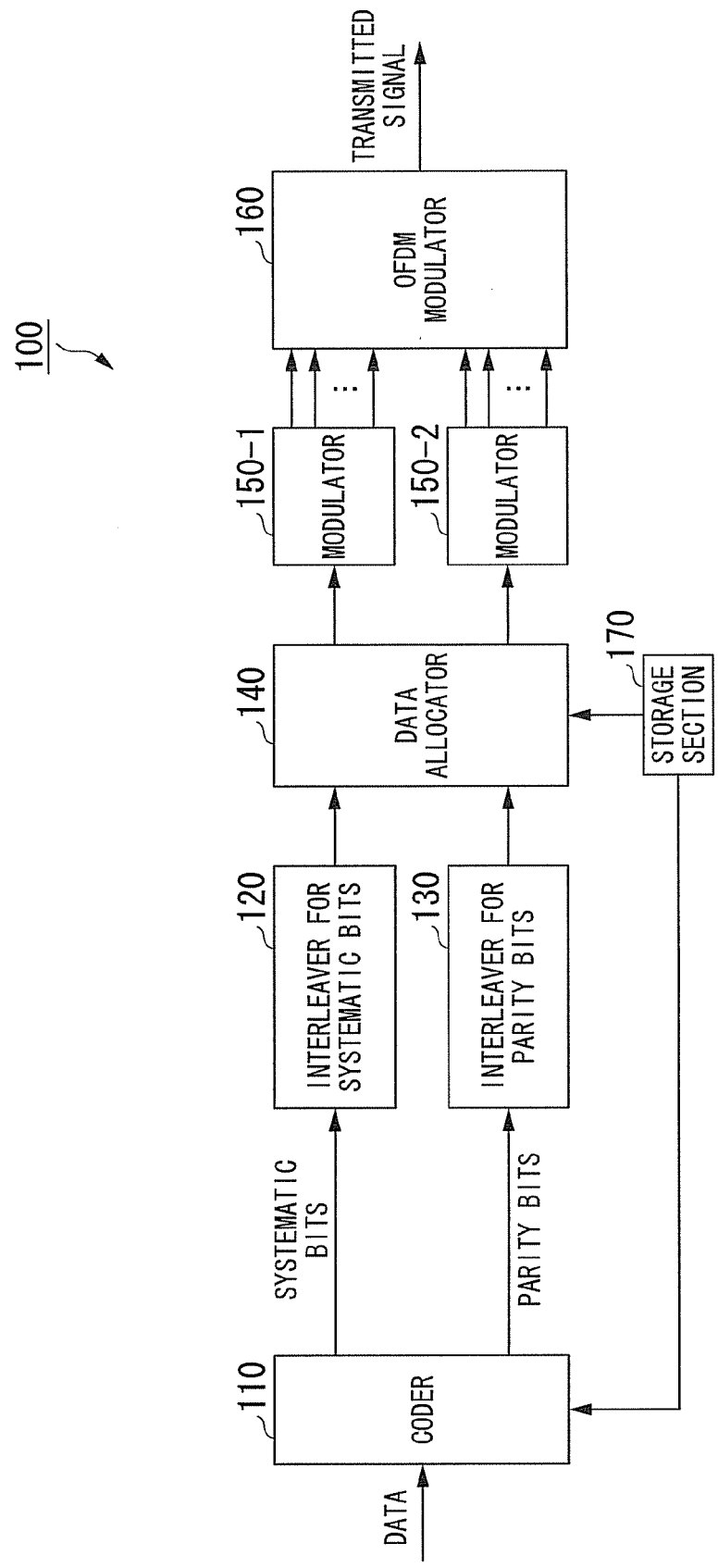
FIG. 2 is a block diagram showing the configuration of the transmitting device in accordance with the same embodiment.

FIG. 2 is a block diagram showing the configuration of a transmitting device 100 in accordance with the first embodiment of the present invention.

In the figure, a coder 110 codes transmission data using FEC, generates systematic bits and punctured parity bits in accordance with a coding rate, outputs the systematic bits to an interleaver for systematic bits 120, and outputs the punctured parity bits to an interleaver for parity bits 130. The interleaver for systematic bits 120 interleaves the systematic bits input thereto. Additionally, the interleaver for parity bits 130 interleaves the parity bits input thereto.

Based on information on the superposed band or the like that was notified from a receiving device in the previous operation and stored in a storage section 170, a data allocator 140 determines frequency bands (subcarriers) to which the systematic bits and the parity bits are allocated. The data allocator 140 preferentially allocates the systematic bits to the non-superposed band; if the non-superposed band has extra resource, the data allocator 140 allocates the parity bits to that portion, and allocates parity bits that have not been able to be allocated to the non-superposed band to the superposed band. The data allocator 140 outputs the systematic bit input from the interleaver for systematic bits 120 and information indicating the frequency band allocated to those bits, to a modulator 150-1; it outputs the parity bits output from the interleaver for parity bits 130 and information indicating the frequency band allocated to those bits, to a modulator 150-2.

The modulator 150-1 modulates the systematic bits input from the data allocator 140 into subcarriers of the frequency band allocated to those bits, and outputs them as a parallel signal for the respective subcarriers to an OFDM modulator 160. The modulator 150-2 modulates the parity bits output from the data allocator 140 into subcarriers of the frequency band allocated to those bits, and outputs them as a parallel signal for the respective subcarriers to the OFDM modulator 160. The OFDM modulator 160 modulates the parallel signals input from the modulators 150-1 and 150-2, performs a parallel/serial conversion on the modulated signals to generate an OFDM signal, and outputs the generated OFDM signal as a transmitted signal.

Subsequently, an operation of the transmitting device 100 in accordance with the present embodiment will be described.

First, the coder 110 of the transmitting device 100 codes transmission data using FEC to generate systematic bits and parity bits, and then performs puncturing of the parity bits in accordance with the present coding rate. For example, when the systematic bits and the parity bits are generated with a ratio of 3:6 as a result of the coding of the transmission data using FEC, and the coding rate=(number of systematic bits)/{(number of systematic bits)+(number of parity bits)}=¾, the coder 110 performs puncturing of the generated parity bits by thinning them to ⅙.

Figure 3:
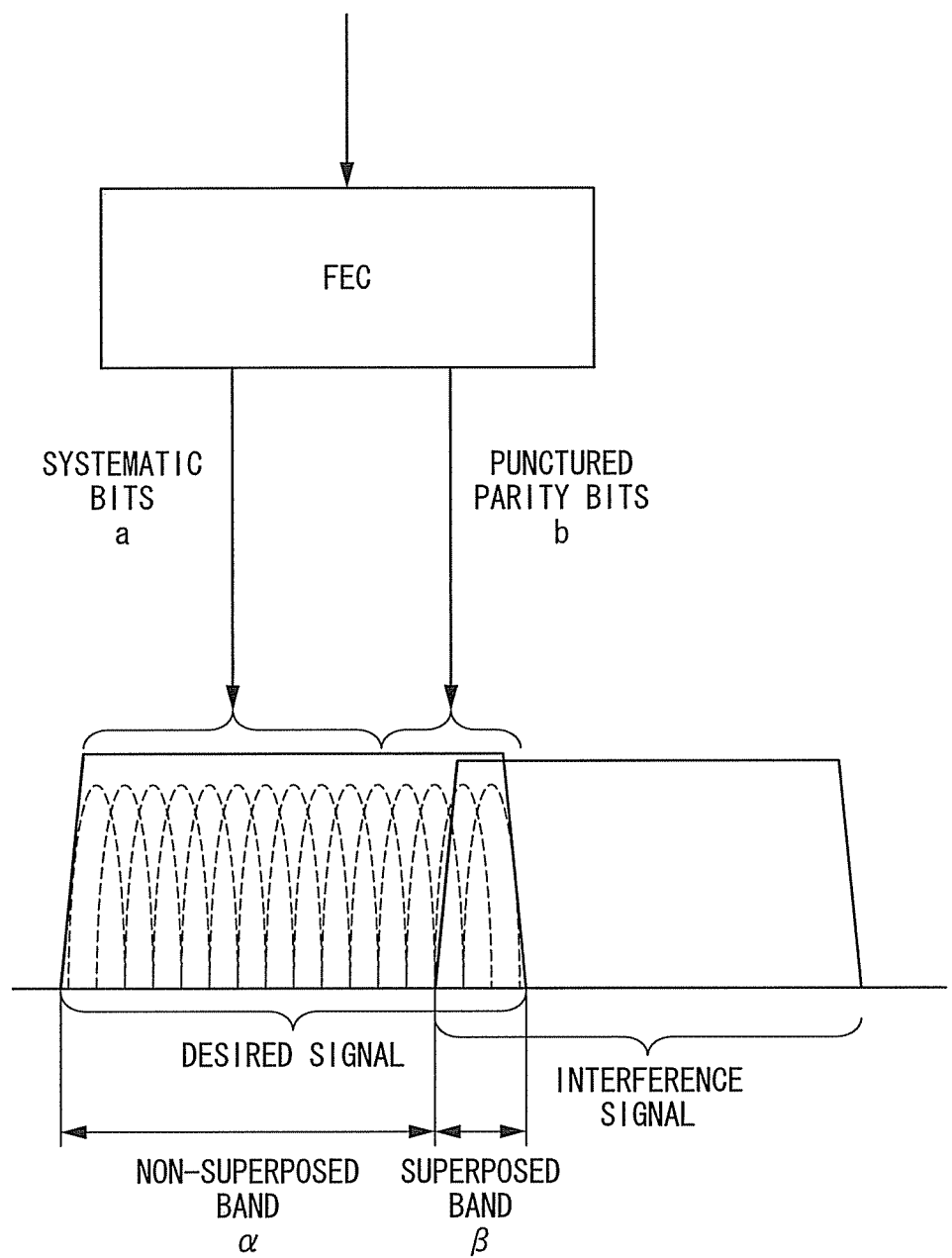
FIG. 3 is an explanatory diagram of a method for determining a coding rate in the transmitting device in accordance with the same embodiment.

As shown in FIG. 3, when α is a non-superposed band where no interference is occurring and β is a superposed band where interference is occurring among the frequency bands used by the transmitting device 100, and the ratio of a systematic bit sequence to a punctured parity bit sequence is a:b, under conditions where $(b/a)>(\beta/\alpha)$, a coding rate is determined as $a/(a+b)$. This can provide a coding rate that enables all the systematic bits to be transmitted in the non-superposed band while transmitting only parity bits in the superposed band.

It is assumed that information on the coding rate is set beforehand in the storage section 170 or received from the receiving device. Alternatively, the transmitting device 100 can determine the coding rate by using information on the superposed band that is stored beforehand in the storage section 170 or received from the receiving device. Since the transmitting device 100 knows the frequency band used by the transmitting device itself, it can determine the non-superposed band a by eliminating the superposed band β from this used frequency band, and determines the coding rate under the conditions mentioned above. Additionally, a subcarrier number corresponding to a frequency band can be used instead of the frequency band.

The coder 110 outputs the systematic bits to the interleaver for systematic bits 120, and outputs the punctured parity bits to the interleaver for parity bits 130. It is noted that all the generated parity bits may be output to the interleaver for parity bits 130 without puncturing them.

Figure 4:
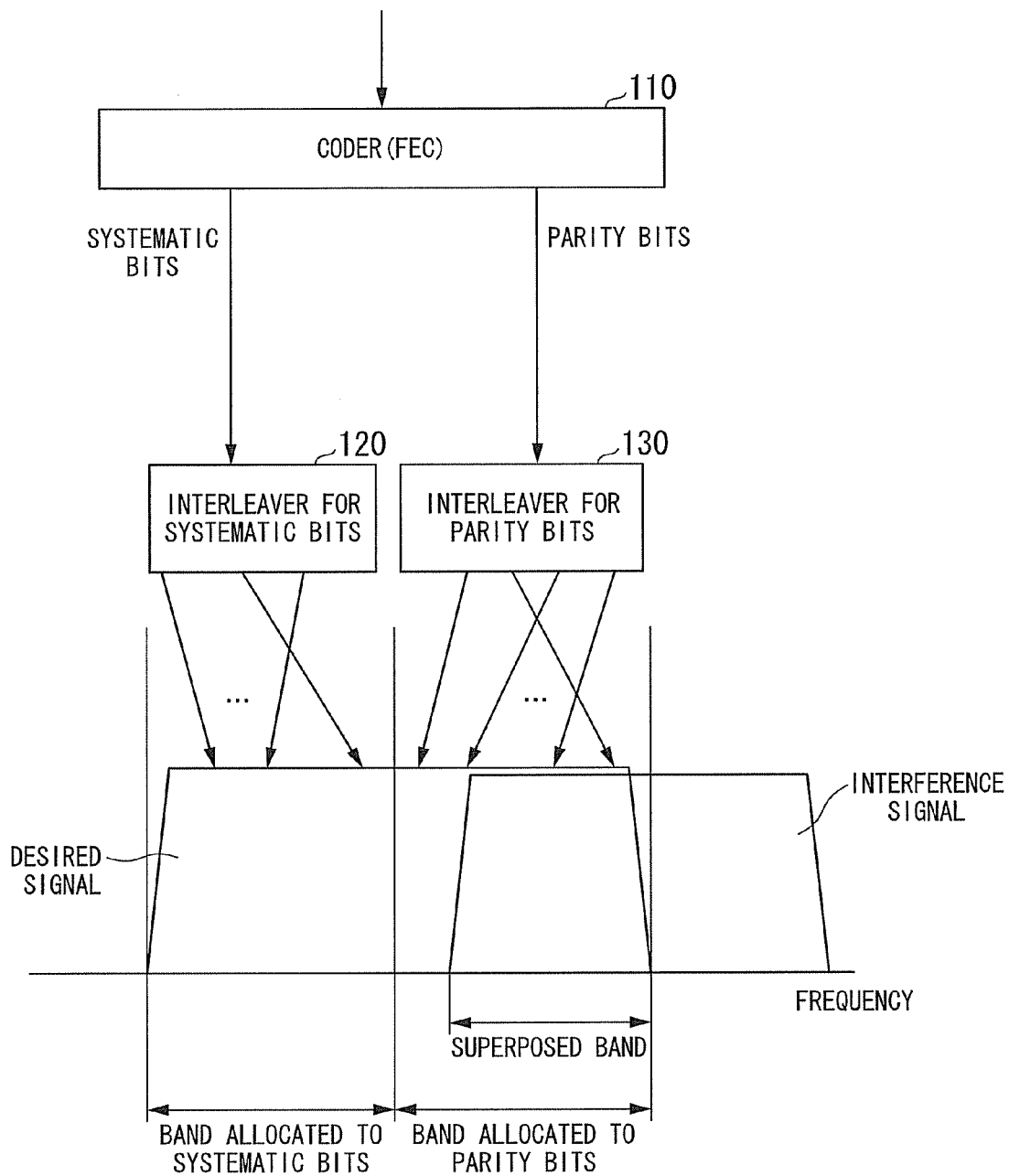
FIG. 4 is an explanatory diagram of interleaving in the transmitting device in accordance with the same embodiment.

FIG. 4 is an explanatory diagram of interleaving of systematic bits and parity bits. The interleaver for systematic bits 120 interleaves the systematic bits. Similarly, the interleaver for parity bits 130 interleaves the parity bits. Therefore, the systematic bits are interleaved in a frequency band that is allocated to the systematic bits by the data allocator 140 of the subsequent stage. Also, the parity bit sequence is interleaved in a frequency band that is allocated to the parity bits by the data allocator 140 of the subsequent stage.

Based on the frequencies of the superposed band or subcarrier numbers stored in the storage section 170, the data allocator 140 then determines frequencies (subcarriers) to which the systematic bits and the parity bits are allocated.

FIGS. 5A to 5D are explanatory diagrams of frequency allocations of systematic bits and parity bits.

Figure 5A:
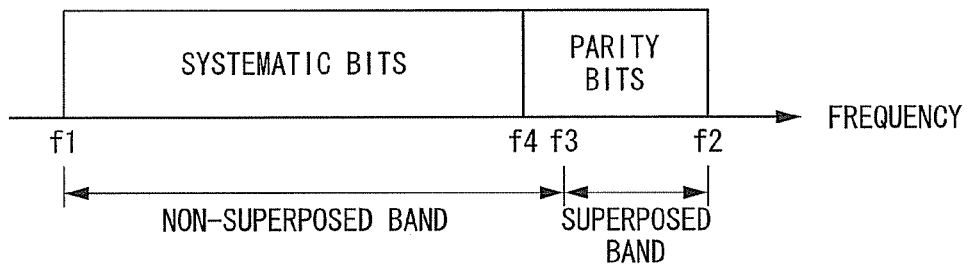
FIG. 5A is an explanatory diagram of frequency allocation of systematic bits and parity bits in the transmitting device in accordance with the same embodiment.

FIG. 5A is a diagram showing allocation in a case in which the superposed band is on the high frequency side in the used band of the transmitting device 100. When the superposed band is on the high frequency side of the used band as in this case, the data allocator 140 allocates the systematic bits from the low frequency side and allocates the parity bits to the remaining high frequency band. For example, when the used band is frequencies f1 to f2, the non-superposed band is frequencies f1 to f3, and the superposed band is frequencies f3 to f2, the data allocator 140 allocates the frequency band f1 to f4 to the systematic bits, and allocates the frequency band f4 to f2 to the parity bits (f1<f4<f3<f2).

Figure 5B:
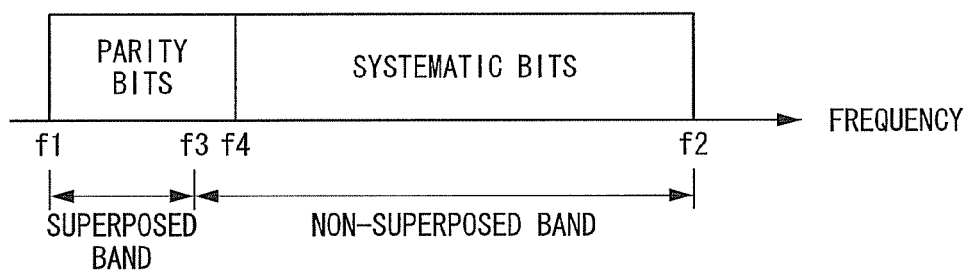
FIG. 5B is an explanatory diagram of frequency allocation of systematic bits and parity bits in the transmitting device in accordance with the same embodiment.

FIG. 5B is a diagram showing allocation in a case in which the superposed band is on the low frequency side of the used band of the transmitting device 100. When the superposed band is on the low frequency side of the used band as in this case, the data allocator 140 allocates the systematic bits from the high frequency side and allocates the parity bits to the remaining low frequency band. For example, when the used band is frequencies f1 to f2, the superposed band is frequencies f1 to f3, and the non-superposed band is frequencies f3 to f2, the data allocator 140 allocates the frequency band f4 to f2 to the systematic bits, and allocates the frequency band f1 to f4 to the parity bits (f1<f3<f4<f2).

Figure 5C:
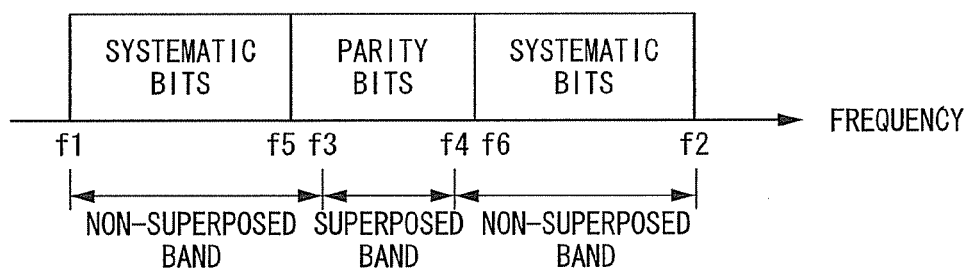
FIG. 5C is an explanatory diagram of frequency allocation of systematic bits and parity bits in the transmitting device in accordance with the same embodiment.

FIG. 5C is a diagram showing allocation in a case in which the superposed band is in the middle of the used band of the transmitting device 100. In this case, the data allocator 140 allocates the frequency band to the parity bits such that the center frequency of a band allocated to the parity bit becomes the center frequency of the superposed band, and allocates the remaining high frequency band and low frequency band to the systematic bits. For example, when the used band is frequencies f1 to f2 and the superposed band is frequencies f3 to f4, the data allocator 140 allocates the frequency band f5 to f6 to the parity bits, and allocates the frequency band f1 to f5 and the frequency band f6 to f2 to the systematic bits (f1<f5<f3<f4<f6<f2). It is assumed that the center frequency of the frequency band f5 to f6 allocated to the parity bits is the same as the center frequency of the frequencies f3 to f4 of the superposed band. However, when frequency f5 is lower than frequency f1, the allocation is the same as in FIG. 5B. Additionally, when frequency f6 is higher than frequency f2, the allocation is the same as in FIG. 5A.

Figure 5D:
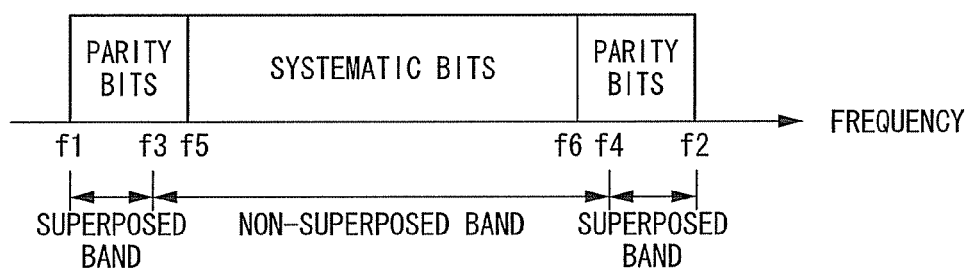
FIG. 5D is an explanatory diagram of frequency allocation of systematic bits and parity bits in the transmitting device in accordance with the same embodiment.

FIG. 5D is a diagram showing allocation when there are superposed bands on both sides of the used band of the transmitting device 100. In this case, the data allocator 140 allocates the frequency band to the systematic bits such that the center frequency of the band allocated to the systematic bits becomes the center frequency of the non-superposed band, and allocates the remaining high-frequency band and low-frequency band to the parity bits. For example, when the used band is frequencies f1 to f2, the superposed bands are frequencies f1 to f3 and frequencies f4 to f2, and the non-superposed band is frequencies f3 to f4, the data allocator 140 allocates the frequency band f5 to f6 to the systematic bits, and allocates the frequency band f1 to f5 and the frequency band f6 to f2 to the parity bits (f1<f3<f5<f6<f4<f2). However, it is assumed that the center frequency of the frequency band f5 to f6 allocated to the systematic bits is the same as the center frequency of the non-superposed band f3 to f4.

The data allocator 140 outputs the interleaved systematic bits, and information indicating the band(s) allocated to the systematic bits determined as described above, to the modulator 150-1, and outputs the interleaved parity bits and information indicating the band(s) allocated to the parity bits determined as described above, to the modulator 150-2.

The modulator 150-1 uses a predetermined modulation scheme such as, for example, 16 quadrature amplitude modulation (QAM), 64-QAM, or quadrature phase shift keying (QPSK) to modulate the data of the input systematic bits, maps each piece of modulated data to a subcarrier in the band allocated to the systematic bits, and outputs a parallel signal to the OFDM modulator 160. Specifically, a signal including an in-phase component (I component) and a quadrature component (Q component) for each subcarrier allocated to the data is output.

Similarly, the modulator 150-2 uses a predetermined modulation scheme to modulate the data of the input parity bits, maps each piece of modulated data to a subcarrier in the band allocated to the parity bits, and outputs a parallel signal to the OFDM modulator 160.

The OFDM modulator 160 subjects the parallel signals input from the modulators 150-1 and 150-2 to an inverse fast Fourier transform (IFFT), thereby converting transfer signals mapped to a frequency domain to signals in a time domain, and subjects the converted signals to a parallel/serial conversion to generate an OFDM signal. It is noted that information on the FEC block size and the coding rate is appended to the generated OFDM signal before it is transmitted.

Figure 6:
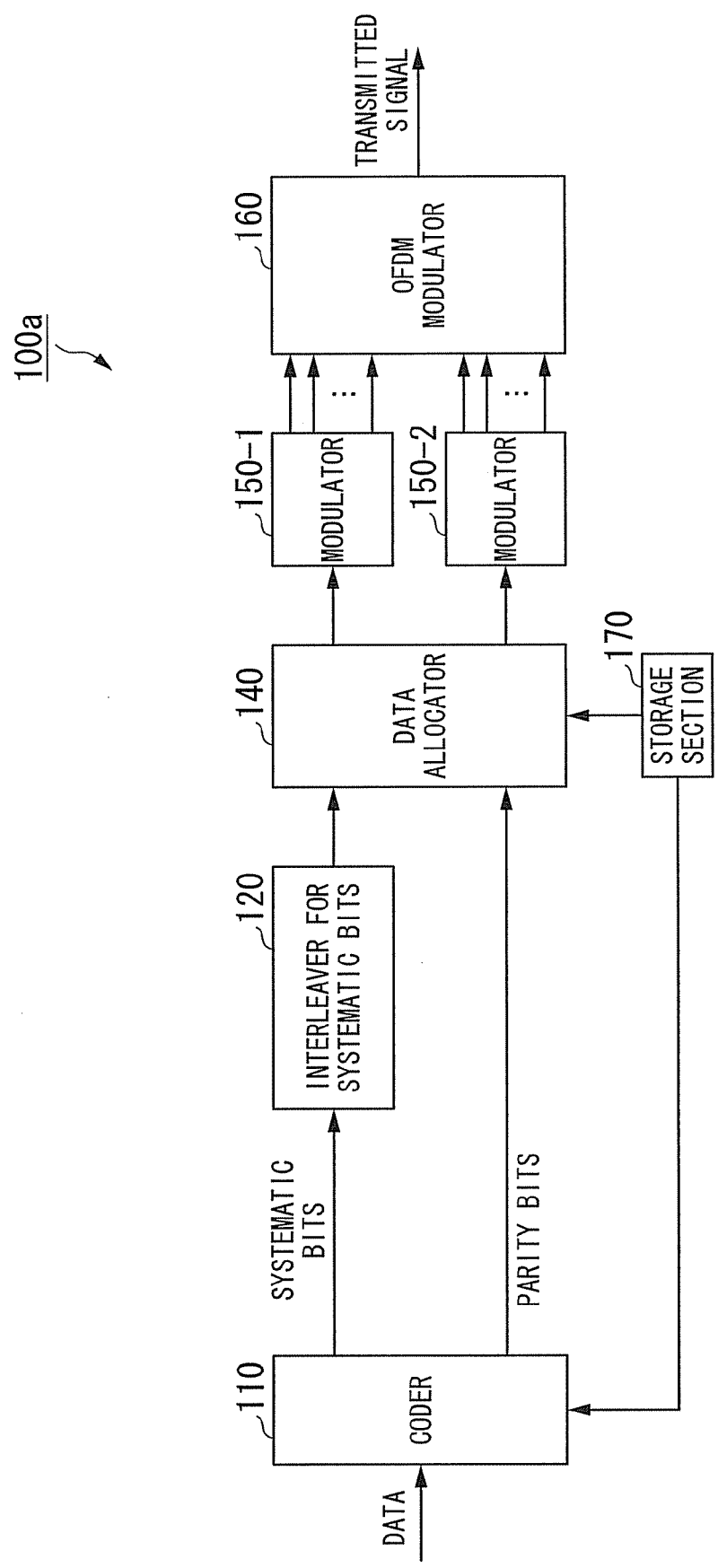
FIG. 6 is a block diagram showing the configuration of another transmitting device in accordance with the same embodiment.

It is noted that, in a conventional coder that performs coding using a turbo code, parity bits are interleaved and output. Accordingly, as shown in FIG. 6, the configuration that does not use interleaving for parity bits may be employed. In a transmitting device 100a shown in the figure differs from the configuration of the transmitting device 100 shown in FIG. 2 only in that it does not include the interleaver for parity bits 130; the other configurations are the same.

Figure 7:
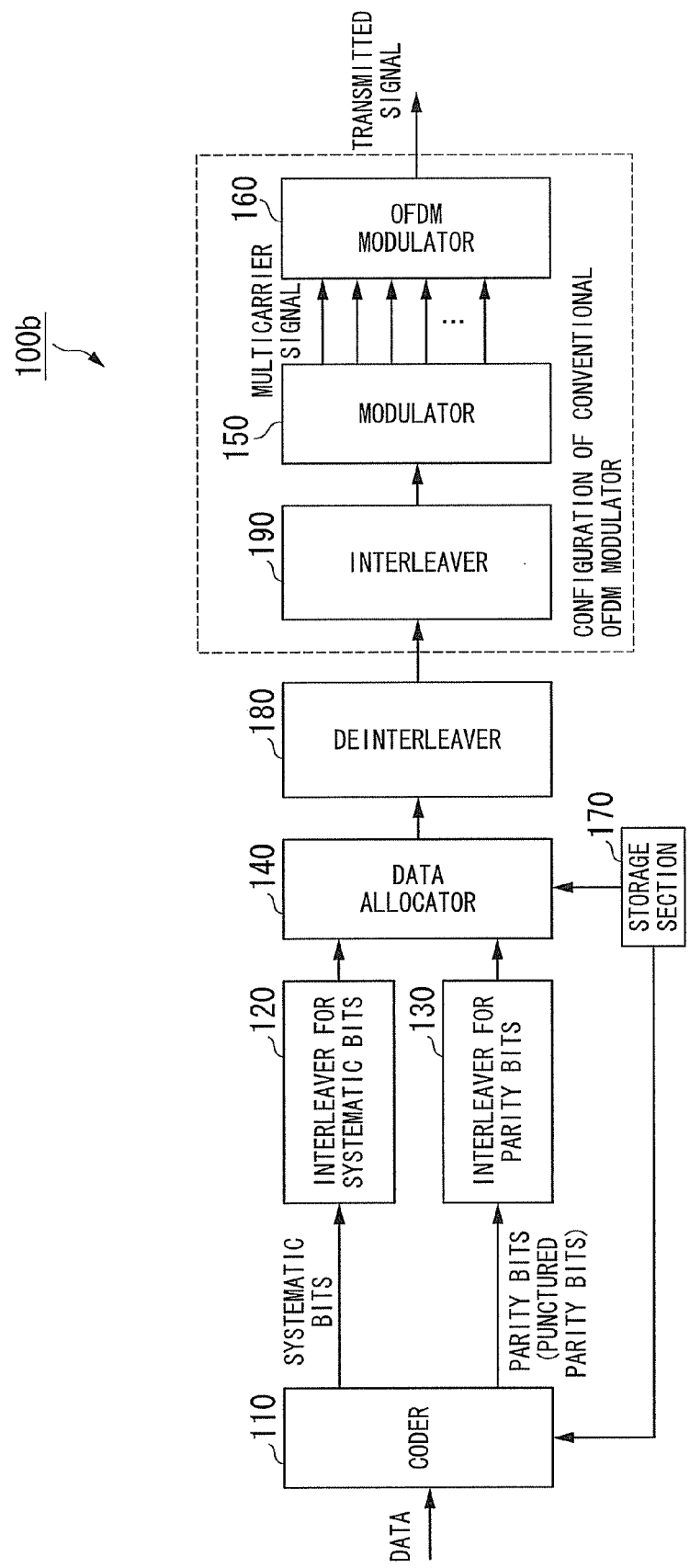
FIG. 7 is a block diagram showing the configuration of yet another transmitting device in accordance with the same embodiment.

FIG. 7 is a block diagram showing the configuration of a transmitting device 100b that can use an existing transmitting device, like parts to those of the transmitting device 100 shown in FIG. 2 being represented by like reference symbols and not repetitiously described. The transmitting device 100b shown in this figure differs from the transmitting device 100 in FIG. 2 in that a modulator 150 is provided instead of the modulators 150-1 and 150-2; also, a deinterleaver 180 and an interleaver 190 are provided between the data allocator 140 and the modulator 150. The modulator 150 has a function of modulating input bits into subcarriers in a frequency band allocated to those bits, and outputting them as a parallel signal of respective subcarriers to the OFDM modulator 160.

A conventional transmitting device has an OFDM modulator configured to include the interleaver 190, the modulator 150, and the OFDM modulator 160. Accordingly, if the deinterleaver 180 is inserted as the previous stage of the interleaver 190, the bit sequences interleaved by the interleaver for systematic bits 120 and the interleaver for parity bits 130 can be input to the modulator 150 without changing their arrangements. Therefore, the functions of the transmitting device of the present embodiment can be realized by adding a circuit to an existing transmitting device.

Figure 8:
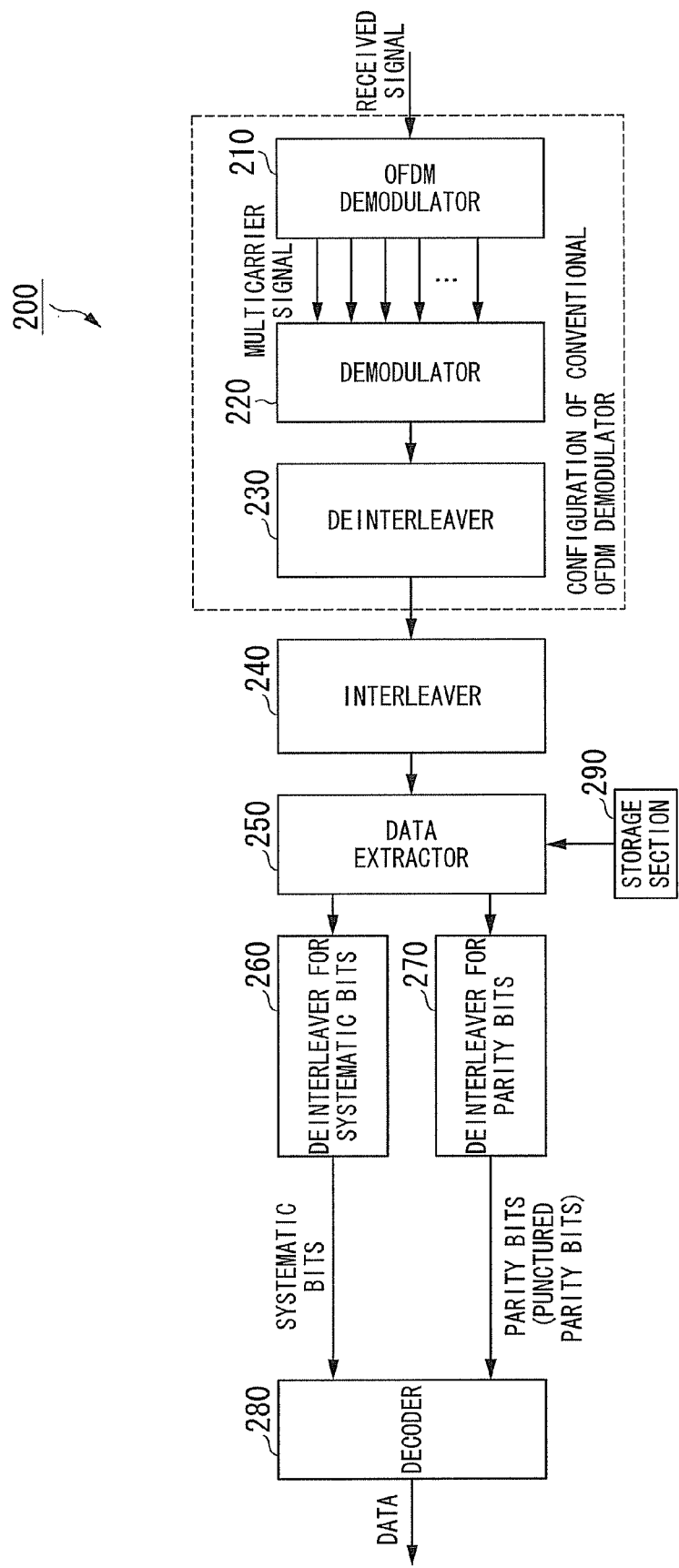
FIG. 8 is a block diagram showing the configuration of a receiving device in accordance with the same embodiment.

FIG. 8 is a block diagram showing the configuration of a receiving device 200 in accordance with the present embodiment.

An OFDM demodulator 210 divides a received OFDM signal into subcarrier signals and outputs them as serial signals to a demodulator 220. The demodulator 220 demodulates respective subcarrier signals input from the OFDM demodulator 210 by subjecting them to a Fourier transform. A deinterleaver 230 deinterleaves the received signal demodulated by the demodulator 220. An interleaver 240 interleaves the signal deinterleaved by the deinterleaver 230 to restore the bit sequence prior to being input to the deinterleaver 230.

Based on information on a superposed band stored in a storage section 290, a data extractor 250 obtains a band allocated to systematic bits and a band allocated to parity bits in accordance with the same method as the data allocator 140 of the transmitting device 100 shown in FIGS. 5A to 5D. Based on the obtained band allocated to the systematic bits and the obtained band allocated to the parity bits as well as the FEC block size and the coding rate described in a control information portion of the received signal, the data extractor 250 extracts the systematic bits from the non-superposed band. The data extractor 250 then extracts the head of the parity bits from the remaining non-superposed band, and extracts the remaining parity bits from the superposed band. The data extractor 250 outputs the extracted systematic bits to a deinterleaver for systematic bits 260, and outputs the extracted parity bits to a deinterleaver for parity bits 270. The information on the superposed band stored in the storage section 290 is set by a control section (not shown) of the receiving device 200 based on the reception state, or it is set beforehand.

The deinterleaver for systematic bits 260 deinterleaves the systematic bits input thereto, and outputs to a decoder 280. Additionally, the deinterleaver for parity bits 270 deinterleaves the parity bits input thereto, and outputs to the decoder 280. The decoder 280 outputs data subjected to error correction using the systematic bits and the parity bits respectively output from the deinterleaver for systematic bits 260 and the deinterleaver for parity bits 270.

An existing receiving device has an OFDM demodulator configured to include the OFDM demodulator 210, the demodulator 220, and the deinterleaver 230. Accordingly, if the interleaver 240 is inserted as the previous stage of the data extractor 250, the bit sequences demodulated by the demodulator 220 can be input to the data extractor 250 without changing their arrangements. Therefore, the functions of the receiving device of the present embodiment can be realized by adding a circuit to the existing receiving device.

It is noted that while in the receiving device 200 described above, decoding is performed using the parity bits received in the superposed band as they are, it is also acceptable to mask the parity bits received in the superposed band or to perform filtering on the parity bits received in the superposed band using a filter. An example of this type of receiving device will be described later.

Figure 9:
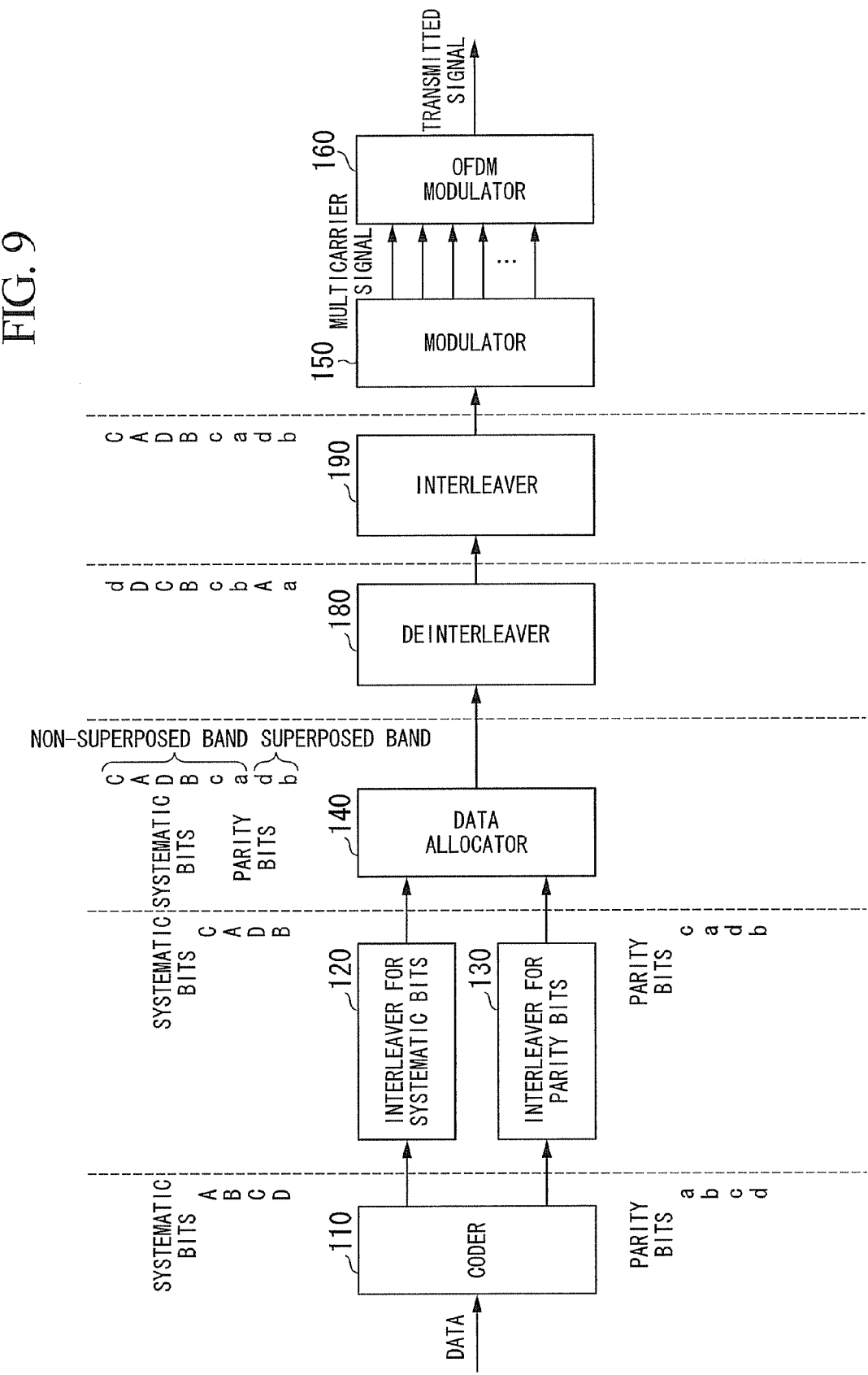
FIG. 9 is a diagram showing the flow of bits in the transmitting device shown in FIG. 7.
Figure 10:
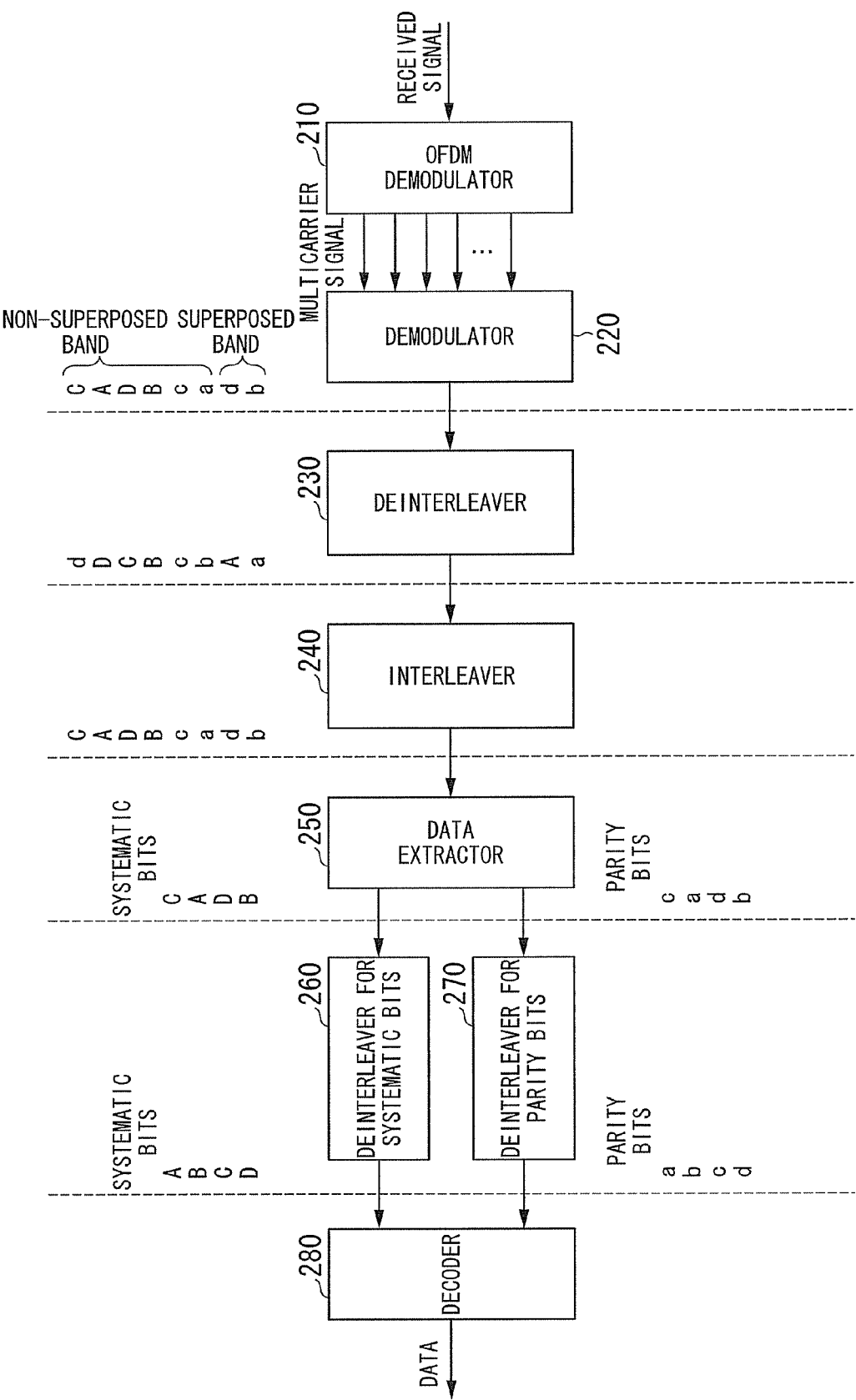
FIG. 10 is a diagram showing the flow of bits in the receiving device shown in FIG. 8.

FIG. 9 is a diagram showing the flow of arranging systematic bits and parity bits in the transmitting device 100b. Additionally, FIG. 10 is a diagram showing the flow until the arrangements of systematic bits and parity bits are restored in the receiving device 200.

In FIG. 9, the coder 110 of the transmitting device 100b codes transmission data, outputs a generated systematic bit sequence "A, B, C, D" to the interleaver for systematic bits 120, and outputs a parity bit (punctured parity bit) sequence "a, b, c, d" to the interleaver for parity bits 130.

The interleaver for systematic bits 120 interleaves the input systematic bit sequence "A, B, C, D" to rearrange it as "C, A, D, B", and outputs to the data allocator 140. The interleaver for parity bits 130 interleaves the parity bit sequence "a, b, c, d" to rearrange it as "c, a, d, b", and outputs to the data allocator 140.

The data allocator 140 allocates the systematic bit sequence "C, A, D, B" to the non-superposed band, then allocates the head of the parity bit sequence "c, a" to the remaining non-superposed band, allocates the remaining parity bit sequence "d, b" to the superposed band, and then outputs a bit sequence arranged in order of the allocated frequencies "C, A, D, B, c, a, d, b" to the deinterleaver 180.

The deinterleaver 180 deinterleaves the whole of the bit sequence "C, A, D, B, c, a, d, b" input from the data allocator 140 to rearrange it as "d, D, C, B, c, b, A, a", and outputs to the interleaver 190. The interleaver 190 interleaves the bit sequence input from the deinterleaver 180 to rearrange it as "C, A, D, B, c, a, d, b", and outputs to the modulator 150. In this way, since the deinterleaver 180 and the interleaver 190 rearrange the bit sequences in the reverse way, the bit sequence arranged in order of frequencies in the data allocator 140 can be input to the modulator 150 with the arrangement thereof unaltered. Therefore, as allocated to the data allocator 140, the bit sequence "C, A, D, B, c, a" including the systematic bits and the head of the parity bits is transmitted in the non-superposed band, and the remaining parity bit sequence "d, b" is transmitted in the superposed band.

In FIG. 10, the demodulator 220 of the receiving device 200 obtains a bit sequence "C, A, D, B, c, a, d, b" as a result of demodulation. The bit sequence "C, A, D, B, c, a" including the systematic bits and the head of the parity bits is received in the non-superposed band, and the remaining parity bit sequence "d, b" is received in the superposed band.

The deinterleaver 230 deinterleaves the whole of the bit sequence "C, A, D, B, c, a, d, b" input from the demodulator 220 to rearrange it as "d, D, C, B, c, b, A, a", and outputs to the interleaver 240. The interleaver 240 interleaves the bit sequence input from the deinterleaver 230 to rearrange it as "C, A, D, B, c, a, d, b", and outputs to the data extractor 250. In this way, since the deinterleaver 230 and the interleaver 240 rearrange the bit sequences in the reverse way, the bit sequence output from the demodulator 220 can be input to the data extractor 250 with the arrangement thereof unaltered.

The data extractor 250 obtains the non-superposed band from information on the superposed band read from the storage section 290. The data extractor 250 then determines the band including the systematic bit sequence extending from the head of the non-superposed band, from a coding rate included in a received signal. The data extractor 250 extracts the systematic bit sequence "C, A, D, B" from the bit sequence "C, A, D, B, c, a" received in the non-superposed band. The data extractor 250 also extracts the remaining bit sequence "c, a" as the head of the parity bit sequence, and extracts the bit sequence "d, b" received in the superposed band as the remainder of the parity bit sequence. The data extractor 250 outputs the extracted systematic bit sequence "C, A, D, B" to the deinterleaver for systematic bits 260, and outputs the parity bit sequence "c, a, d, b" to the deinterleaver for parity bits 270.

The deinterleaver for systematic bits 260 deinterleaves the input systematic bit sequence "C, A, D, B" to rearrange it as "A, B, C, D", and outputs to the decoder 280. The deinterleaver for parity bits 270 deinterleaves the parity bit sequence "c, a, d, b" to rearrange it as "a, b, c, d", and outputs to the decoder 280. The decoder 280 receives and decodes the correctly arranged systematic bit sequence and parity bit sequence.

Second Embodiment

An embodiment in which a non-superposed band and a superposed band are interleaved separately will now be described.

Figure 11:
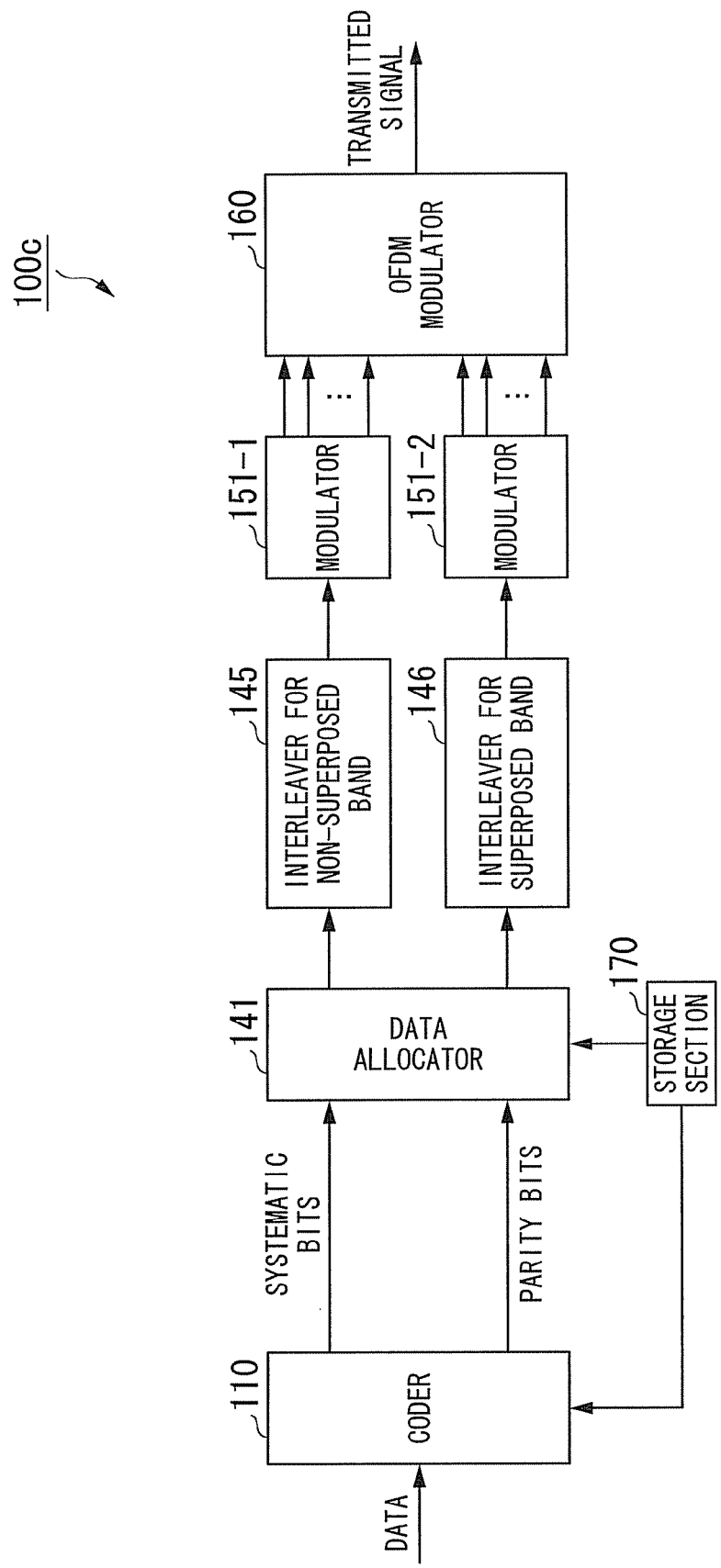
FIG. 11 is a block diagram showing the configuration of a transmitting device in accordance with a second embodiment.

FIG. 11 is a block diagram showing the configuration of a transmitting device 100c in accordance with a second embodiment, like parts to those of the first transmitting device 100 shown in FIG. 2 being designated with like reference symbols and not repetitiously described.

In the figure, in the same manner as the data allocator 140 of the transmitting device 100 in accordance with the first embodiment, a data allocator 141 determines a band allocated to systematic bits and a band allocated to parity bits, outputs the systematic bits and parity bits to which the non-superposed band is allocated to an interleaver for non-superposed band 145, and outputs the parity bits to which the superposed band is allocated to an interleaver for superposed band 146. The interleaver for non-superposed band 145 interleaves a bit sequence of the non-superposed band input from the data allocator 141, and outputs to a modulator 151-1. Additionally, the interleaver for superposed band 146 interleaves a bit sequence of the superposed band input from the data allocator 141, and outputs to a modulator 151-2.

The modulator 151-1 modulates the systematic bits and the parity bits input from the interleaver for non-superposed band 145 into subcarriers of the non-superposed band, and outputs a parallel signal of respective subcarriers to the OFDM modulator 160. The modulator 151-2 modulates the parity bits output from the interleaver for superposed band 146 into subcarriers of the superposed band, and outputs a parallel signal of respective subcarriers to the OFDM modulator 160.

Subsequently, an operation of the transmitting device 100c in accordance with the present embodiment will be described.

Figure 12:
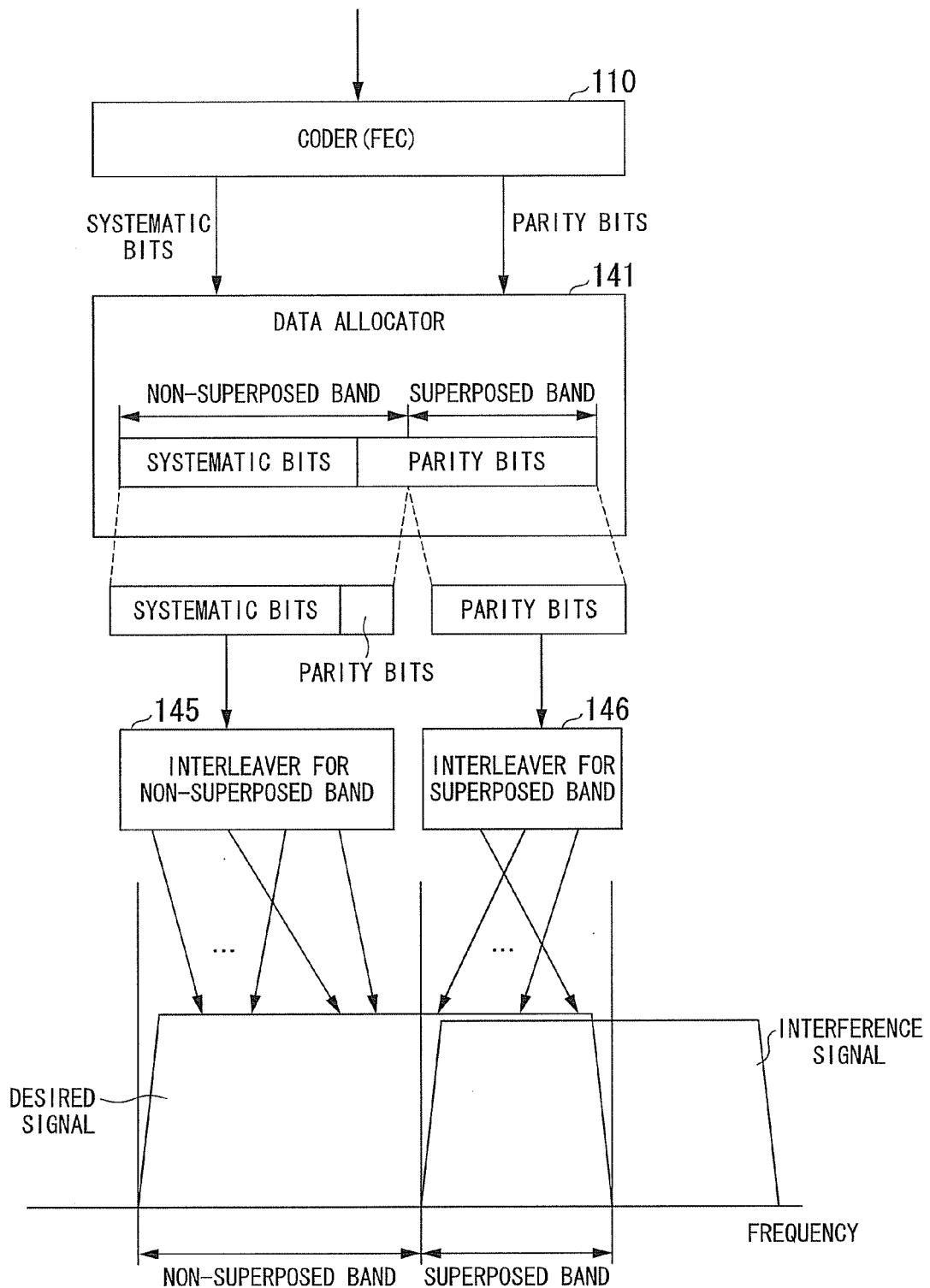
FIG. 12 is an explanatory diagram of an operation of the transmitting device shown in FIG. 11.

FIG. 12 is an explanatory diagram of an operation of the transmitting device 100c. In the figure, as in the first embodiment, the coder 110 of the transmitting device 100c codes transmission data using FEC to generate systematic bits and parity bits, and then performs puncturing of the parity bits in accordance with the present coding rate.

Subsequently, as in the first embodiment shown in FIGS. 5A to 5D, the data allocator 141 determines a band allocated to the systematic bits and a band allocated to the parity bits. The data allocator 141 outputs the systematic bits and the head of the parity bits allocated to the non-superposed band to the interleaver for non-superposed band 145, and outputs the remaining parity bits allocated to the superposed band to the interleaver for superposed band 146. Therefore, in the non-superposed band, the systematic bits and the parity bits are interleaved together. Additionally, the interleaver for superposed band 146 interleaves the remaining parity bits allocated to the superposed band.

The modulator 151-1 uses a predetermined modulation method such as, for example, 16QAM, 64QAM, or QPSK to modulate the data of the input systematic bits and parity bits, maps each piece of modulated data to a subcarrier of the non-superposed band, and outputs a parallel signal to the OFDM modulator 160. Similarly, the modulator 151-2 uses a predetermined modulation scheme to modulate the data of the input parity bits, maps each piece of modulated data to a subcarrier in the frequency band allocated to the parity bits, and outputs a parallel signal to the OFDM modulator 160.

As in the first embodiment, the OFDM modulator 160 generates and transmits an OFDM signal.

Figure 13:
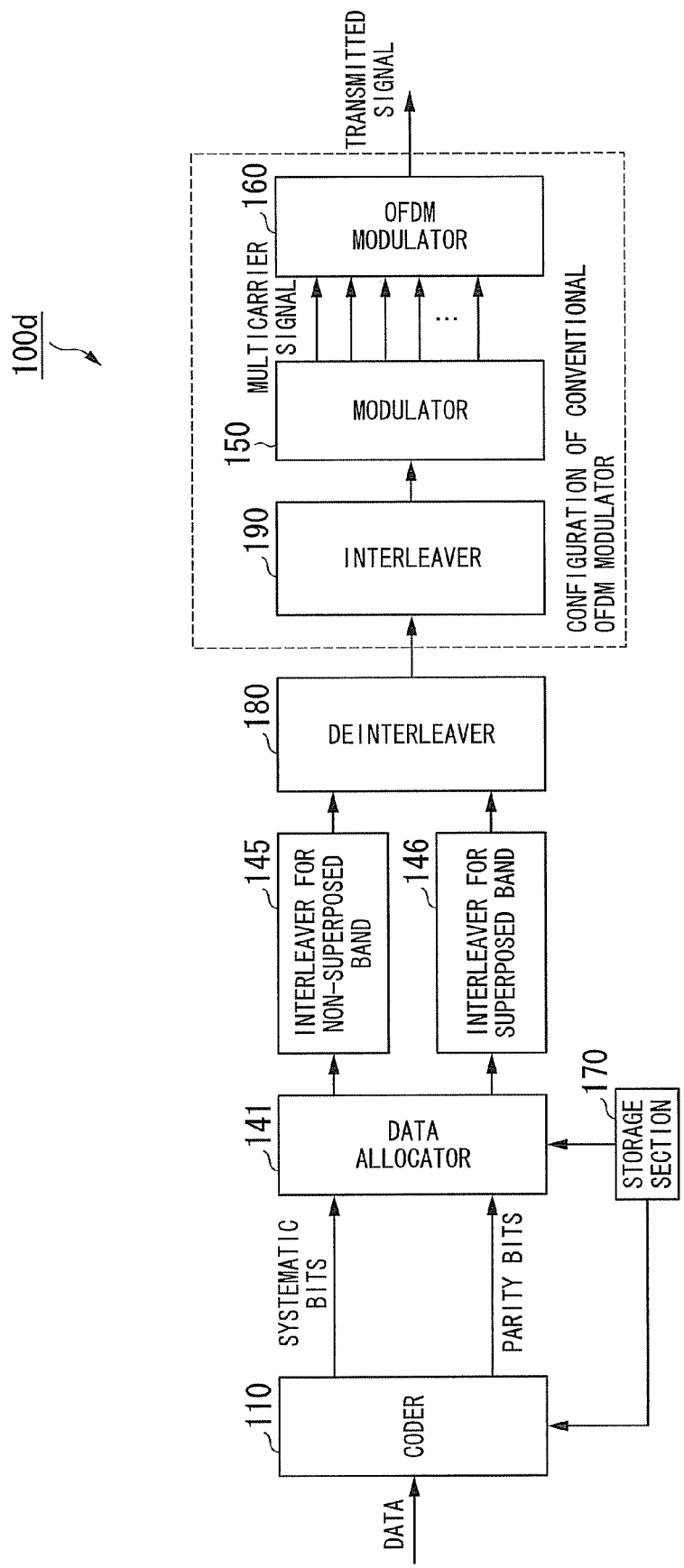
FIG. 13 is a block diagram showing the configuration of another transmitting device in accordance with the same embodiment.

FIG. 13 is block diagram showing the configuration of a transmitting device 100d that can use an existing transmitting device, like parts to those in the transmitting device 100b shown in FIG. 7 and the transmitting device 100c shown in FIG. 11 being designated with like reference symbols and not repetitiously described. The transmitting device 100d shown in this figure differs from the transmitting device 100c shown in FIG. 11 in that the modulator 150 is provided instead of the modulators 151-1 and 151-2, and the deinterleaver 180 and the interleaver 190 are provided between the interleaver for non-superposed band 145 and the interleaver for superposed band 146 and the modulator 150.

A conventional transmitting device has an OFDM modulator configured to include the interleaver 190, the modulator 150, and the OFDM modulator 160. Accordingly, if the deinterleaver 180 is inserted between the interleaver for non-superposed band 145 and the interleaver for superposed band 146 and the interleaver 190, the bit sequences interleaved by the interleaver for non-superposed band 145 and the interleaver for superposed band 146 can be input to the modulator 150 without changing their arrangements. Therefore, the functions of the transmitting device of the present embodiment can be realized by adding a circuit to an existing transmitting device.

Figure 14:
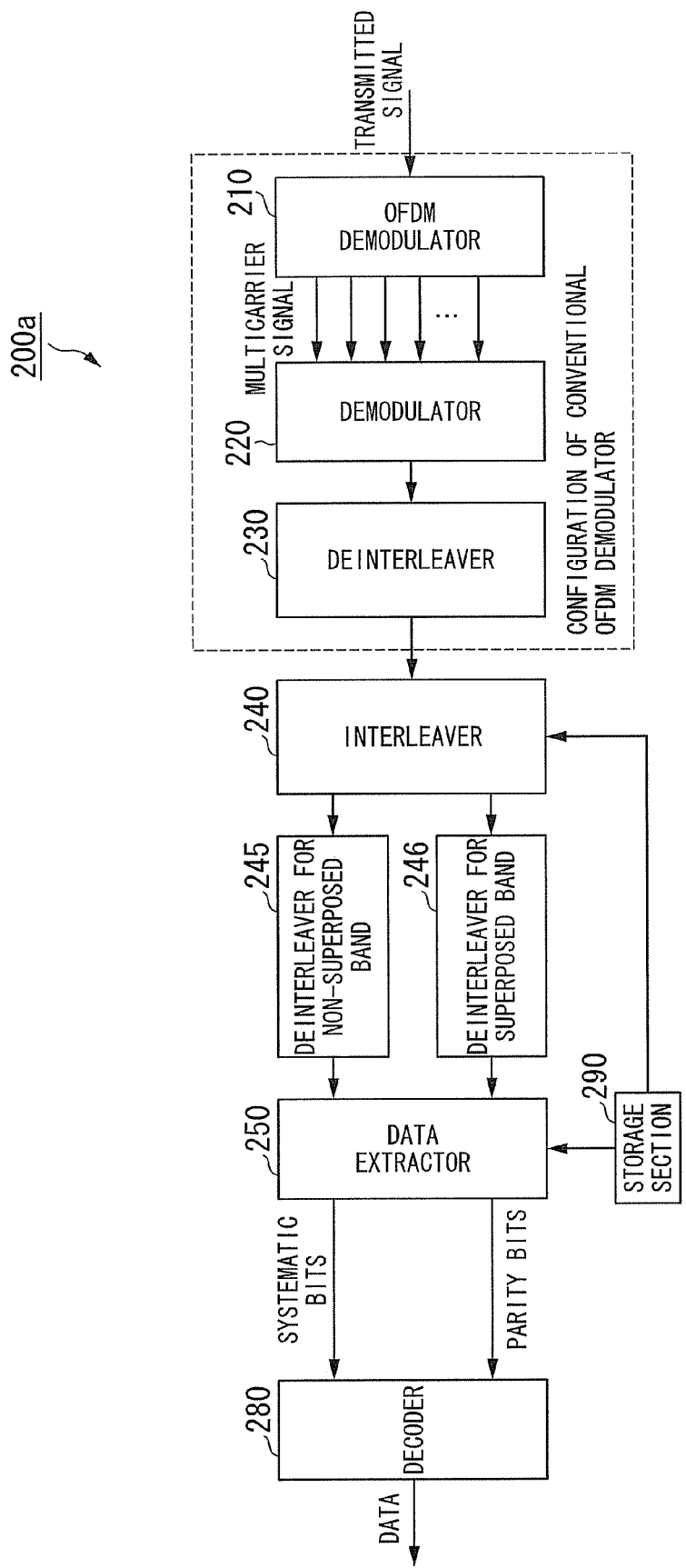
FIG. 14 is a block diagram showing the configuration of a receiving device in accordance with the same embodiment.

FIG. 14 is a block diagram showing the configuration of a receiving device 200a in accordance with the present embodiment, like parts to those of the receiving device 200 shown in FIG. 8 being designated with like reference symbols and not repetitiously described. The receiving device 200a of the present embodiment differs from the receiving device shown in FIG. 8 in that the deinterleaver for systematic bits 260 and the deinterleaver for parity bits 270 are not used, and there are provided a deinterleaver for non-superposed band 245 and a deinterleaver for superposed band 246 between the interleaver 240 and the data extractor 250.

The deinterleaver for non-superposed band 245 deinterleaves the systematic bits and the parity bits of the non-superposed band input from the interleaver 240. The deinterleaver for superposed band 246 deinterleaves the parity bits of the superposed band input from the interleaver 240.

An existing receiving device has an OFDM demodulator configured to include the OFDM demodulator 210, the demodulator 220, and the deinterleaver 230. Accordingly, if the interleaver 240 is inserted as the previous stage of the deinterleaver for non-superposed band 245 and the deinterleaver for superposed band 246, the bit sequences of the non-superposed band and the superposed band demodulated by the demodulator 220 can be input to the deinterleaver for non-superposed band 245 and the deinterleaver for superposed band 246 without changing their arrangements. Therefore, the functions of the receiving device of the present embodiment can be realized by adding a circuit to the existing receiving device.

Figure 15:
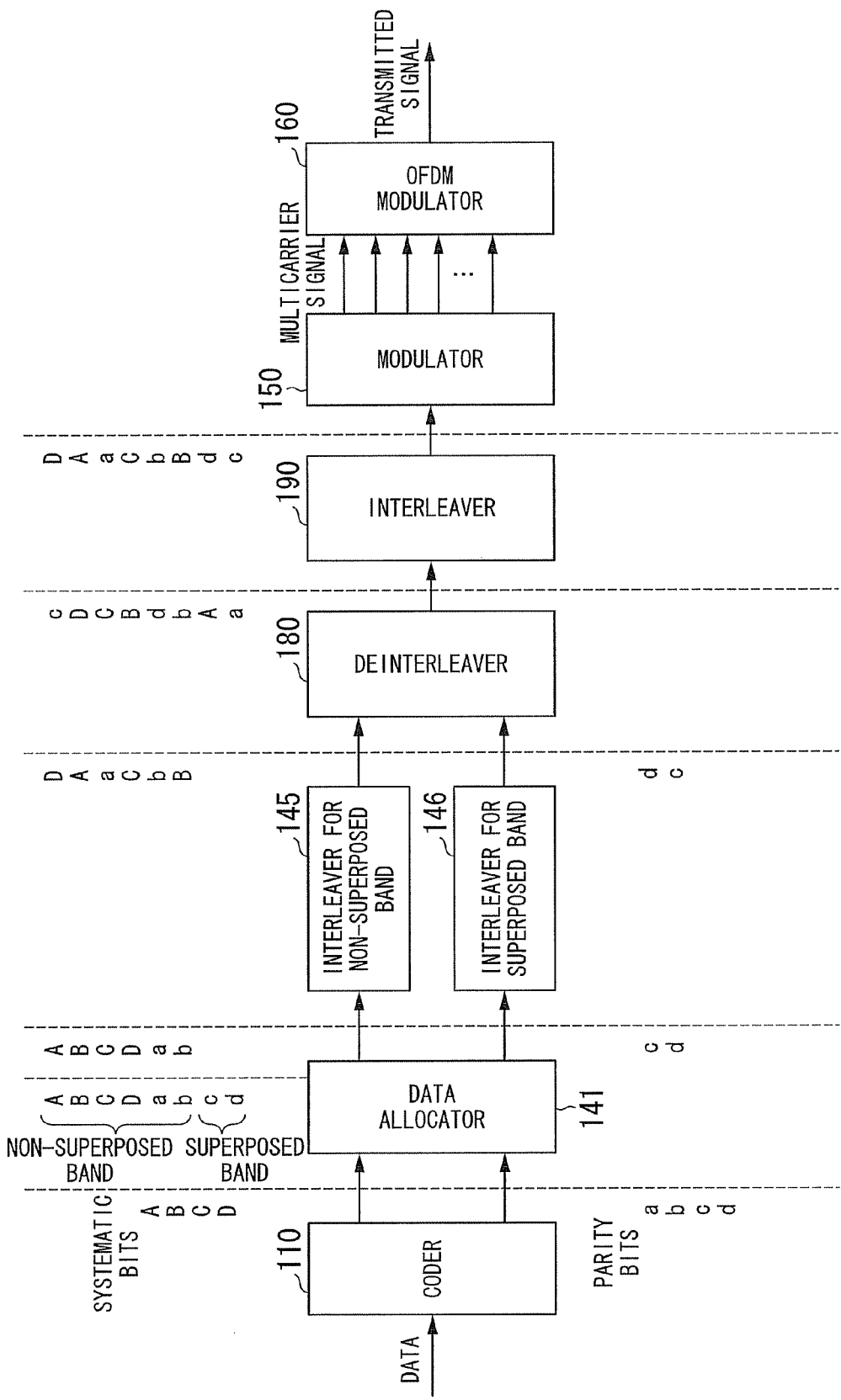
FIG. 15 is a diagram showing the flow of bits in the transmitting device shown in FIG. 13.
Figure 16:
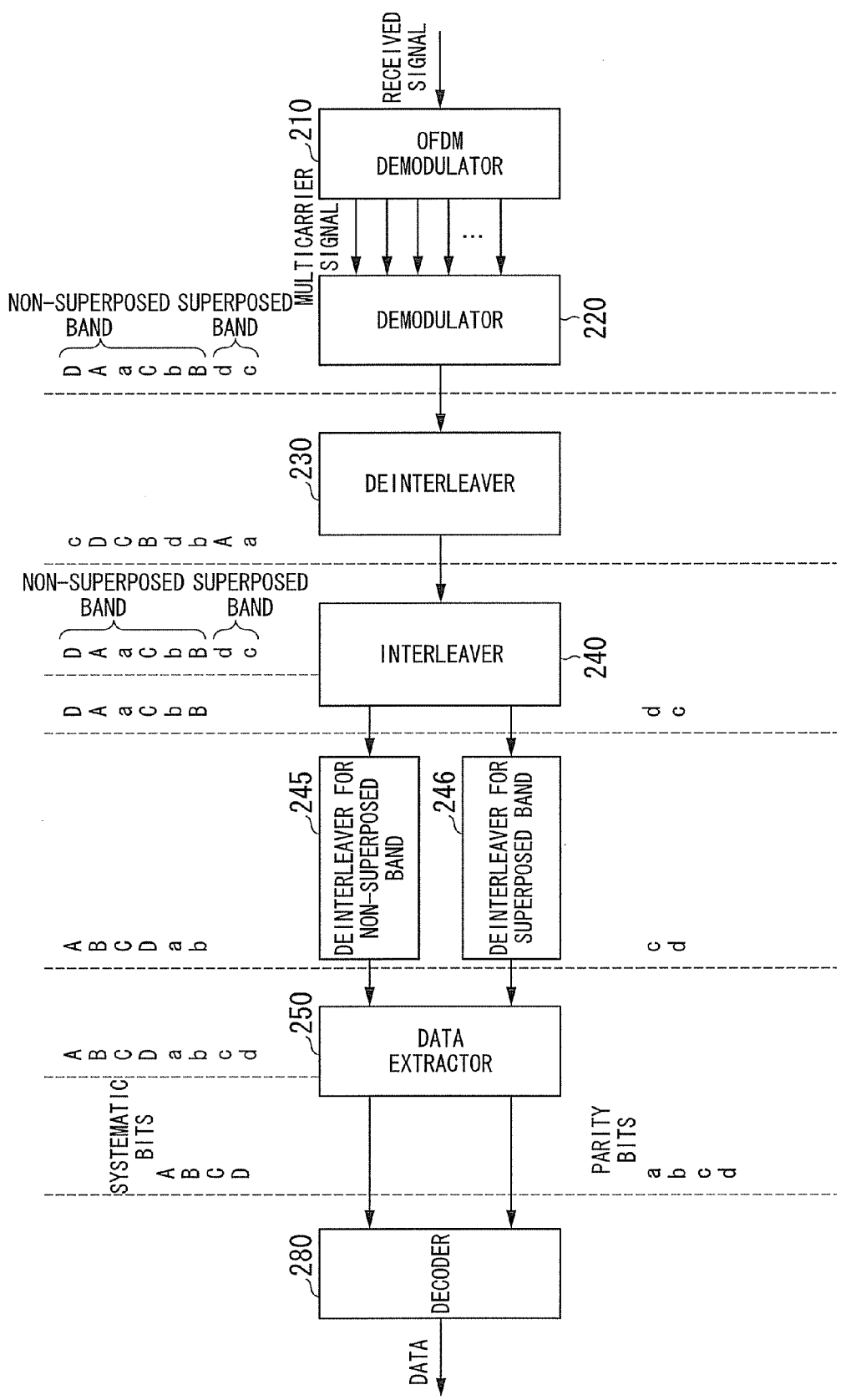
FIG. 16 is a diagram showing the flow of bits in the receiving device shown in FIG. 14.

FIG. 15 is a diagram showing the flow of arranging systematic bits and parity bits in the transmitting device 100d. Additionally, FIG. 16 is a diagram showing the flow until the arrangements of systematic bits and parity bits are restored in the receiving device 200a.

In FIG. 15, the coder 110 of the transmitting device 100d codes transmission data, and outputs a generated systematic bit sequence "A, B, C, D" and a parity bit (punctured parity bit) sequence "a, b, c, d" to the data allocator 141.

The data allocator 141 allocates the systematic bit sequence "A, B, C, D" to the non-superposed band, then allocates the head of a parity bit sequence "a, b" to the remaining non-superposed band, and allocates the remaining parity bit sequence "c, d" to the superposed band. The data allocator 141 outputs the bit sequence of the non-superposed band arranged in order of allocated frequencies "A, B, C, D, a, b" to the interleaver for non-superposed band 145, and outputs the bit sequence "c, d" of the superposed band arranged in order of allocated frequencies to the interleaver for superposed band 146.

The interleaver for non-superposed band 145 interleaves the input bit sequence of the non-superposed band "A, B, C, D, a, b" to rearrange it as "D, A, a, C, b, B", and outputs to the deinterleaver 180. The interleaver for superposed band 146 interleaves the input bit sequence of the superposed band "c, d" to rearrange it as "d, c", and outputs to the deinterleaver 180.

The deinterleaver 180 deinterleaves the whole of the bit sequence "D, A, a, C, b, B, d, c" obtained by combining both bit sequences input from the interleaver for non-superposed band 145 and the interleaver for superposed band 146 to rearrange it as "c, D, C, B, d, b, A, a", and outputs to the interleaver 190. The interleaver 190 interleaves the bit sequence input from the deinterleaver 180 to rearrange it as "D, A, a, C, b, B, d, c", and outputs to the modulator 150. In this way, since the deinterleaver 180 and the interleaver 190 rearrange the bit sequences in the reverse way, the interleaver for non-superposed band 145 and the interleaver for superposed band 146 can input the bit sequences arranged for the non-superposed band and the superposed band to the modulator 150 without changing their arrangements.

In FIG. 16, the demodulator 220 of the receiving device 200a obtains a bit sequence "D, A, a, C, b, B, d, c" as a result of demodulation. The bit sequence "D, A, a, C, b, B" including the systematic bits and the head of the parity bits is received in the non-superposed band, and the remaining parity bit sequence "d, c" is received in the superposed band.

The deinterleaver 230 deinterleaves the whole of the bit sequence "D, A, a, C, b, B, d, c" input from the demodulator 220 to rearrange it as "c, D, C, B, d, b, A, a", and outputs to the interleaver 240. The interleaver 240 interleaves the bit sequence input from the deinterleaver 230 to rearrange it as "D, A, a, C, b, B, d, c". In this way, since the deinterleaver 230 and the interleaver 240 rearrange the bit sequences in the reverse way, the arrangement of the bit sequence output from the demodulator 220 can be restored. Based on information on the superposed band read from the storage section 290, the interleaver 240 outputs, from among the bit sequence obtained by interleaving, the bit sequence of the non-superposed band "D, A, a, C, b, B" to the deinterleaver for non-superposed band 245, and outputs the bit sequence of the superposed band "d, c" to the deinterleaver for superposed band 246.

The deinterleaver for non-superposed band 245 deinterleaves the input bit sequence of the non-superposed band "D, A, a, C, b, B" to rearrange it as "A, B, C, D, a, b", and outputs to the data extractor 250. The deinterleaver for superposed band 246 deinterleaves the input bit sequence of the superposed band "d, c" to rearrange it as "c, d", and outputs to the data extractor 250.

The data extractor 250 obtains the non-superposed band from information on the superposed band read from the storage section 290. The data extractor 250 then determines the band including the systematic bit sequence extending from the head of the non-superposed band, from a coding rate included in a received signal. The data extractor 250 extracts a systematic bit sequence "A, B, C, D" from the bit sequence of a non-superposed band "A, B, C, D, a, b". The data extractor 250 also extracts the remaining bit sequence "a, b" as the head of the parity bit sequence, and extracts a bit sequence "c, d" received in the superposed band as the remainder of the parity bit sequence. The data extractor 250 outputs the extracted systematic bit sequence "A, B, C, D" and a parity bit sequence "a, b, c, d" to the decoder 280.

The decoder 280 receives and decodes the correctly arranged systematic bit sequence and parity bit sequence.

The second embodiment interleaves the systematic bits more deeply than the first embodiment. That is, in the first embodiment, only systematic bits are interleaved in the interleaver for systematic bits 120, whereas in the second embodiment, part of the parity bits are also interleaved together with the systematic bits. Due to this randomization effect, the probability that the systematic bits will be correctly received can be increased.

[Receiving Device that Masks Superposed Band]

A receiving device that masks a superposed band will be described below.

Figure 17:
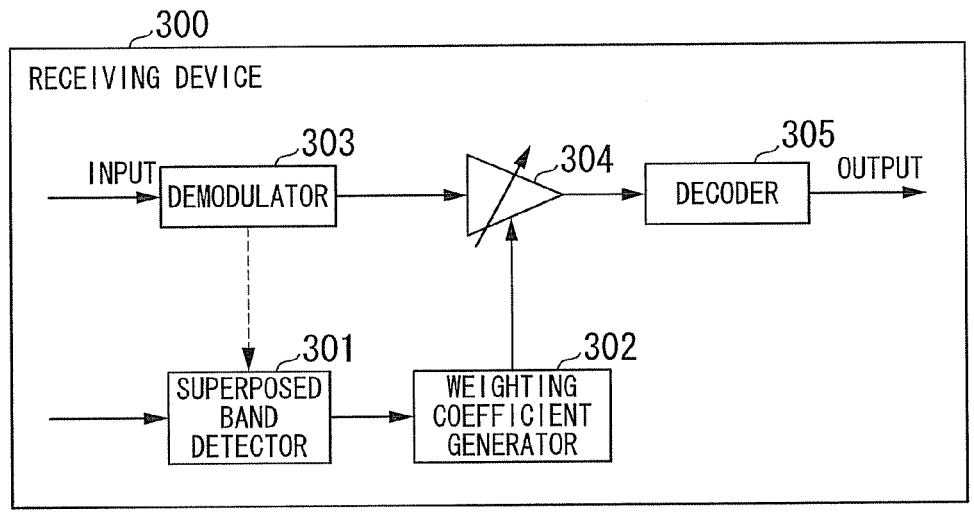
FIG. 17 is a block diagram showing the internal configuration of a receiving device that masks a superposed band.

FIG. 17 is a schematic block diagram showing a configuration of a receiving device 300 that masks the superposed band. It is noted that a connection between a superposed band detector 301 and a demodulator 303 is not essential.

The receiving device 300 is provided with a superposed band detector 301, a weighting coefficient generator 302, a demodulator 303, a weighting calculator 304, and a decoder 305, and extracts a signal included in a desired signal which has been subjected to error correction coding from a received signal including the desired signal and an interference signal. For example, when the station establishment of the receiving device 300 for fixed wireless access (FWA) or the like is performed, the superposed band detector 301 detects a frequency band in which interference occurs due to a radio signal transmitted from another system in a used frequency band of the desired signal of its own device. For example, the superposed band detector 301 transmits a request for stopping transmission of radio signals of the desired signal to a source wireless station of the desired signal, and detects the presence/absence of another radio signal, the signal strength, and the like for each subcarrier in the used frequency band of the desired signal in an environment where no desired signal is transmitted, thereby detecting a subcarrier in which interference occurs. For example, the superposed band detector 301 generates a sequence of specific subcarrier decision values as a sequence of superposed band decision values in which "1" is associated with a specific subcarrier, and "0" is associated with a subcarrier other than the specific subcarrier. The superposed band detector 301 outputs the detected result to the weighting coefficient generator 302.

The weighting coefficient generator 302 calculates a weighting coefficient for each subcarrier in accordance with a specific subcarrier decision value. The weighting coefficient calculated by the weighting coefficient generator 302 is a weighting coefficient for reducing the reliability of a subcarrier in which interference occurs detected by the superposed band detector 301, compared to those of the other subcarriers. The weighting coefficient generator 302 outputs a sequence in which the calculated weighting coefficients are arranged for respective subcarriers to the weighting calculator 304.

The demodulator 303 converts a received radio signal including a desired signal that has been subjected to error-correction coding into an electric signal for respective subcarriers, and outputs a demodulated value for each subcarrier to the weighting calculator 304.

The weighting calculator 304 performs weighting calculation processing on the demodulated value input from the demodulator 303 for each subcarrier based on the weighting coefficient input from the weighting coefficient generator 302, and outputs a sequence in which the calculated results are arranged for respective subcarriers to the decoder 305 as a likelihood data sequence.

The decoder 305 performs error correction processing and decoding processing based on the likelihood data sequence input from the weighting calculator 304, and acquires a signal of the desired signal.

Figure 18:
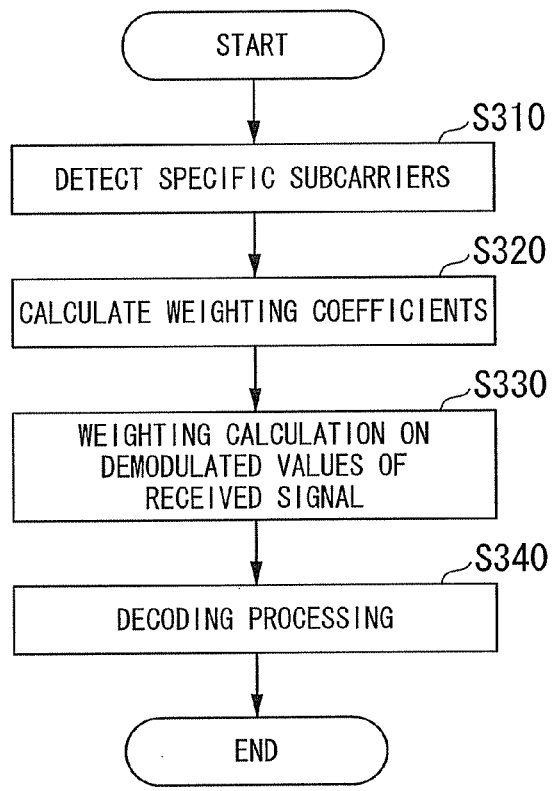
FIG. 18 is a diagram showing the operating flow of the receiving device shown in FIG. 17.

FIG. 18 is a diagram showing the processing flow of the receiving device 300.

When the station establishment of the receiving device 300 is performed, the superposed band detector 301 of the receiving device 300 acquires information on an interference signal by measuring and detecting a reception level, a frequency band, a center frequency, a band superposed on the desired signal, and the like of a radio signal in a frequency band of each subcarrier of the desired signal at a timing that the desired signal is absent, or in a frequency band of a subcarrier in which the desired signal is absent.

Moreover, the superposed band detector 301 selects (detects) a subcarrier in which an interference signal is present as a specific subcarrier based on the acquired information on the interference signal. For example, the superposed band detector 301 detects a subcarrier in a frequency band in which a signal having a reception level higher than or equal to a predetermined value is received as a specific subcarrier based on the value of the reception level.

Figure 19A:
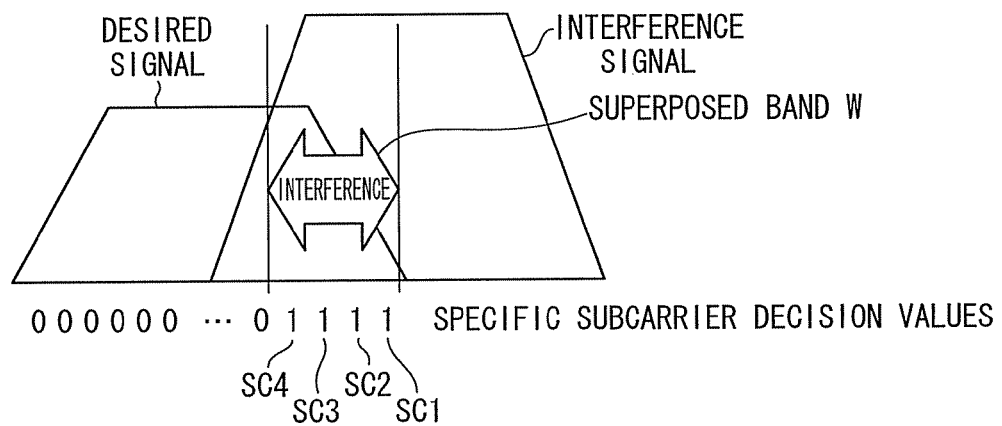
FIG. 19A is a conceptual diagram of an operation of the receiving device shown in FIG. 17.

FIGS. 19A to 19D are conceptual diagrams of the contents of the processing of the receiving device 300. In FIG. 19A, the superposed band detector 301 detects subcarriers SC1 to SC4 included in a superposed band W in which a desired signal overlaps an interference signal as specific subcarriers. The superposed band detector 301 generates a sequence of specific subcarrier decision values in which the subcarriers SC1 to SC4 are associated with "1" and the other subcarriers are associated with "0".

Referring again to FIG. 18, the superposed band detector 301 outputs the generated sequence of the specific subcarrier decision values to the weighting coefficient generator 302 (step S310).

The weighting coefficient generator 302 generates weighting coefficients for reducing the reliability of the specific subcarriers compared to the other subcarriers based on the specific subcarrier decision values generated by the superposed band detector 301. For example, these weighting coefficients are weighting coefficients for converting a demodulated value into a predetermined value, for example, "0", with respect to a subcarrier associated with "1" in the sequence of the specific subcarrier decision values.

The weighting coefficient generator 302 outputs the generated sequence of the weighting coefficients for the respective subcarriers to the weighting calculator 304 (step S320).

It is noted that the processing of steps S310 to S320 described above is performed before the receiving device 300 receives a signal. Subsequently, the processing of receiving a radio signal of a desired signal will be described. The demodulator 303 demodulates a radio signal in a frequency band of a desired signal for respective subcarriers, and outputs digital data of demodulated values for the respective subcarriers to the weighting calculator 304.

The weighting calculator 304 performs weighting calculation processing in accordance with a calculation method corresponding to a coding method of the desired signal based on the weighting coefficients for the respective subcarriers and the demodulated values for the respective subcarriers, and outputs a sequence of calculated results to the decoder 305 as a likelihood data sequence (step S330).

As one example of the weighting calculation method corresponding to the coding method, an example in which the coding method of the desired signal is a soft decision positive/negative multi-valued coding method will be described with reference to FIGS. 19B to 19D. In the decoding processing corresponding to the soft decision positive/negative multi-valued coding method, a demodulated value of a received signal is a positive/negative multi-valued output, and an absolute value thereof is determined as reliability (a value representing likelihood), a negative value is determined to be a value of "+1", and a positive value is determined to be a value of "−1".

Figure 19B:
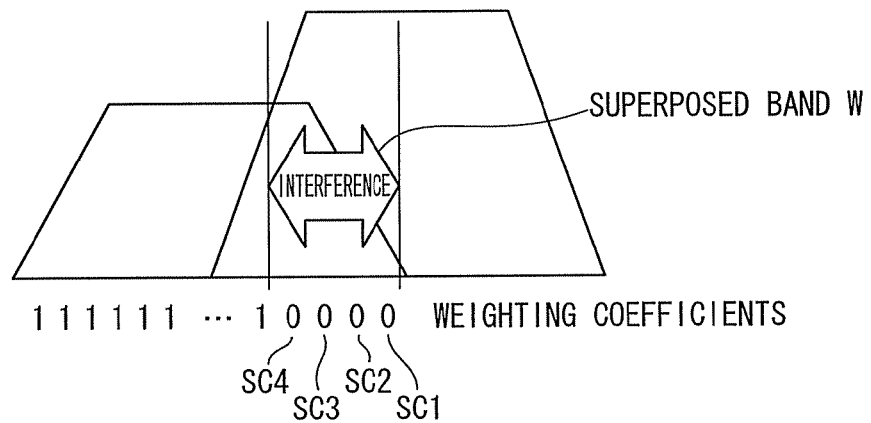
FIG. 19B is a conceptual diagram of an operation of the receiving device shown in FIG. 17.

FIG. 19B is a diagram showing weighting coefficients for respective subcarriers. In addition, FIG. 19C is a diagram showing demodulated values of a positive/negative multi-valued output for the respective subcarriers. In the figure, a subcarrier with the largest positive value of "+27.02" has the highest reliability that it is most likely to be "−1". On the other hand, a subcarrier with the smallest negative value of "−26.34" has the highest reliability that it is most likely to be "+1".

On the other hand, the most ambiguous one (low reliability) as to whether it is "+1" or "−1" is a subcarrier with the smallest absolute value, that is, a subcarrier with a demodulated value of 0.

Therefore, in step S320 of FIG. 18, the weighting calculator 304 performs weighting calculation processing of converting the demodulated values of the subcarriers SC1 to SC4, which are specific subcarriers, into "0" based on the weighting coefficients calculated by the weighting coefficient generator 302, thereby making it possible to reduce the reliability of the demodulated values of the subcarriers SC1 to SC4. Here, as shown in FIG. 19B, it is assumed that the weighting coefficient generator 302 generates a sequence of weighting coefficients in which values obtained by performing logical negation on the specific subcarrier decision values shown in FIG. 19A are associated with the respective subcarriers.

Figure 19C:
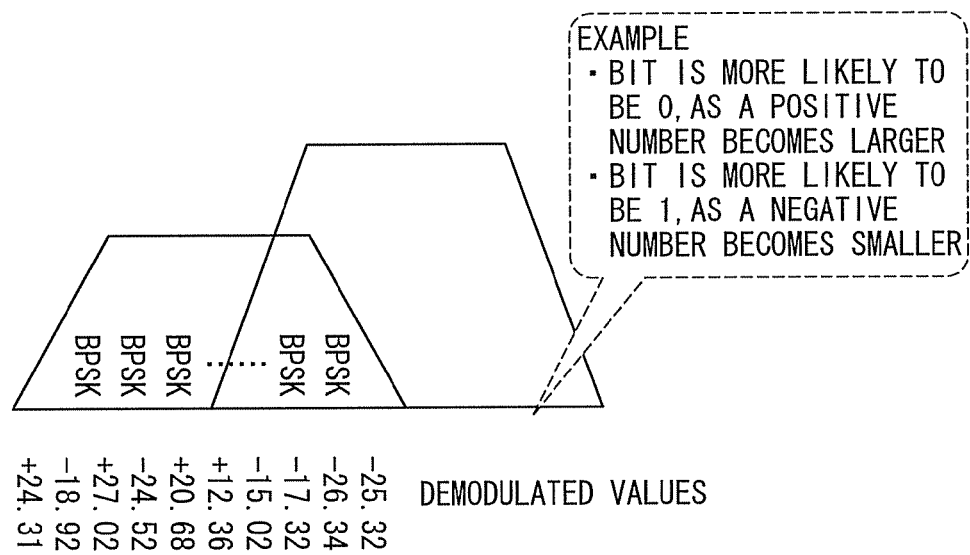
FIG. 19C is a conceptual diagram of an operation of the receiving device shown in FIG. 17.

As one example of the weighting calculation by the weighting calculator 304, the weighting calculator 304 multiplies weighting coefficients which are values obtained by performing logical negation on the specific subcarrier decision values as shown in FIG. 19B by demodulated values as shown in FIG. 19C for respective corresponding subcarriers. Specifically, the weighting calculator 304 multiplies a demodulated value of "−25.32" by a weighting coefficient of "0" for the subcarrier SC1, which is a specific subcarrier, and outputs a multiplied result "0" to the decoder 305 as a demodulated value subjected to the weighting calculation. Similarly, the weighting calculator 304 multiplies the demodulated values by a weighting coefficient of "1" for subcarriers other than the specific subcarriers. The weighting calculator 304 then outputs a sequence of multiplied results of all the subcarriers to the decoder 305 as a likelihood data sequence.

Figure 19D:
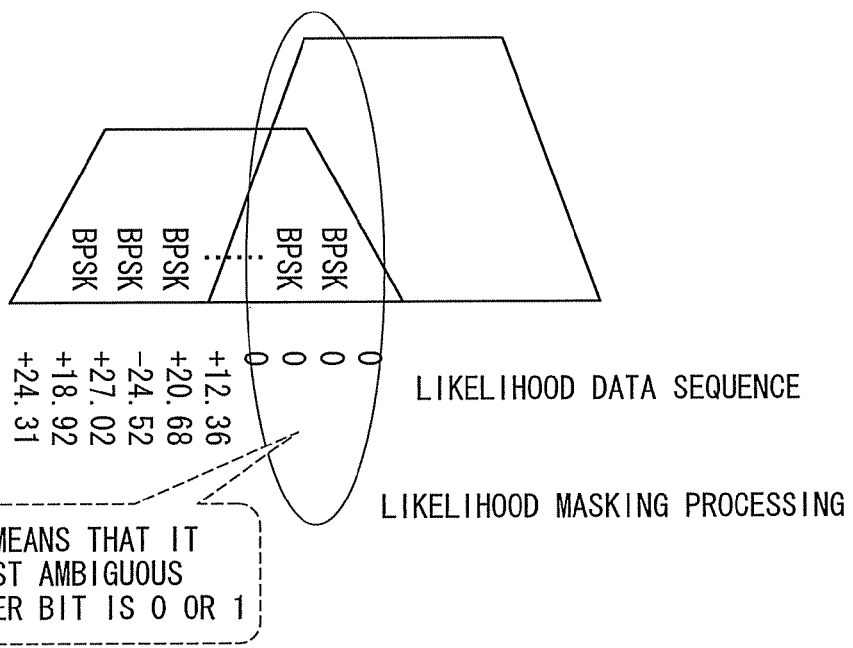
FIG. 19D is a conceptual diagram of an operation of the receiving device shown in FIG. 17.

FIG. 19D is a diagram showing a likelihood data sequence by the weighting calculator 304 which performs weighting calculation for the respective subcarriers using weighting coefficients and positive/negative multi-valued demodulated values. As shown in the figure, the values of likelihood data subjected to the weighting calculation corresponding to the subcarriers SC1 to SC4, which are specific subcarriers, have a value of "0" having the lowest reliability, and the other demodulated values are not changed.

Referring again to FIG. 18, the decoder 305 performs decoding processing corresponding to a coding method of a desired signal based on the likelihood data sequence input from the weighting calculator 304. As an example of a coding method for error correction applied to the desired signal, convolutional coding or a method in which iterative decoding and turbo coding are combined is applicable (step S340).

In the receiving device 300 described above, the superposed band detector 301 measures an interference signal in a frequency band of a desired signal upon station establishment, the weighting coefficient generator 302 calculates weighting coefficients for reducing the reliability of specific subcarriers of a received signal in which an interference signal is present based on this measurement result, and the weighting calculator 304 performs, on demodulated values of the received signal, processing of reducing the reliability of the specific subcarriers based on the weighting coefficients. In this way, the receiving device 300 performs a weighting calculation on demodulated values in accordance with the reliability of a received signal for respective subcarriers, masks specific subcarriers having low reliability, and decodes the received signal using the demodulated values of subcarriers having high reliability, thereby making it possible to improve the reception error correction performance.

It is noted that in the embodiment described above, the example has been described in which the weighting coefficients calculated by the weighting coefficient generator 302 are values obtained by performing logical negation on binary specific subcarrier decision values by the superposed band detector 301, that is, a bit mask. However, they are not limited to such values, and the following coefficients may be used.

Figure 20A:
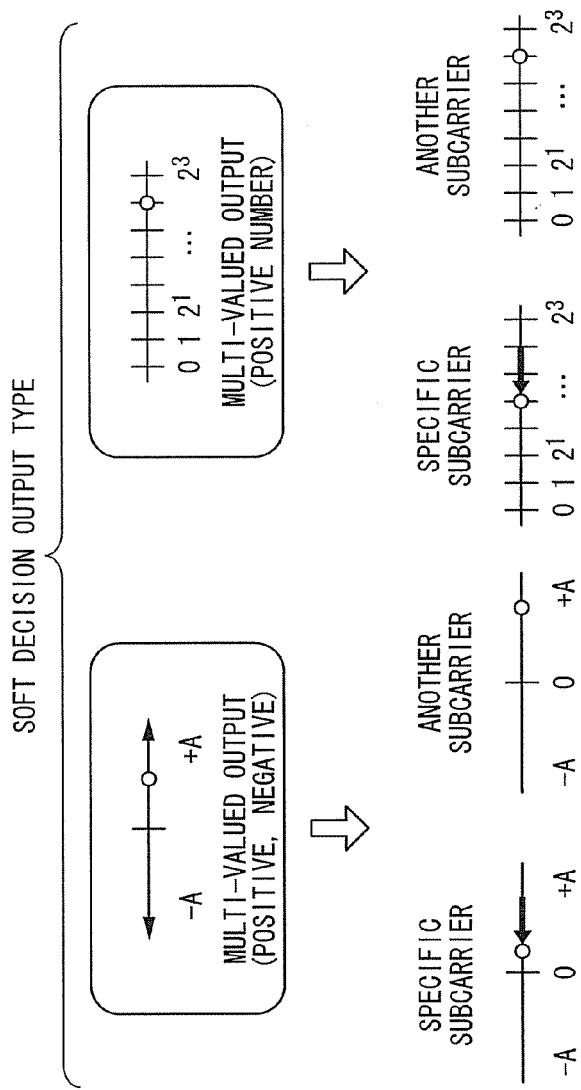
FIG. 20A is a diagram showing an example of another weighting.
Figure 20B:
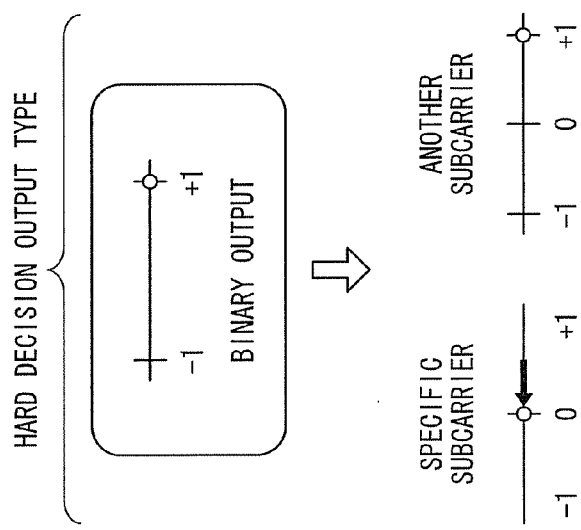
FIG. 20B is a diagram showing an example of another weighting.

FIGS. 20A and 20B are diagrams showing values before weighting and values after weighting in accordance with other examples of the weighting coefficients described above.

For example, with respect to a demodulated value of a positive/negative multi-valued output in a soft decision output type shown in FIG. 20A, the weighting coefficient generator 302 may calculate the weighting coefficients such that weighting coefficients of specific subcarriers are determined as a predetermined value α (where 0≤α≤1) and weighting coefficients of the other subcarriers are determined as 1.

The weighting calculator 304 converts the absolute value of a demodulated value of a specific subcarrier into a value closer to 0 by multiplying the demodulated value by a predetermined value a for the specific subcarrier, thereby reducing the reliability.

Additionally, in the case of a demodulated value of a positive number multi-valued output in the soft decision output type, a bit value is decoded as "−1" when the demodulated value is close to 0, and the bit value is decoded as "1" when the demodulated value is close to a maximum value. In such a case, the weighting coefficient generator 302 may calculate a weighting coefficient for replacing a demodulated value of a specific subcarrier with a median of the values of output candidates (e.g., a median 3 or 4 when the values of the output candidates are 0 to 7).

Moreover, in the case of a hard decision output type as shown in FIG. 20B, i.e., a type of outputting a binary value of "−1" or "+1", the weighting coefficient generator 302 may output a coefficient for replacing a binary demodulated value with "0" to the weighting calculator 304 as a weighting coefficient for a specific subcarrier.

In this way, in the case of a communication scheme which employs an error correction code such as block coding and which is capable of acquiring a desired signal based on demodulated values of other subcarriers even when demodulated values or the like of part of subcarriers are missing, it is possible to improve the reception error correction performance by performing weighting calculation processing on a demodulated value using a weighting coefficient for reducing the reliability with respect to a subcarrier having low reliability which may cause an error.

When the superposed band detector 301, the weighting coefficient generator 302, and the weighting calculator 304 of the receiving device 300 described above are added to the receiving devices 200 and 200a shown in FIG. 8 and FIG. 14, the demodulator 303 is substituted with the demodulator 220, and the decoder 305 is substituted with the decoder 280, and thus it becomes possible to mask the superposed band. It is noted that the weighting calculator 304 is provided between the demodulator 220 and the deinterleaver 230.

[Receiving Device that Filters the Superposed Band]

Subsequently, a receiving device that filters a superposed band will be described below.

Figure 21:
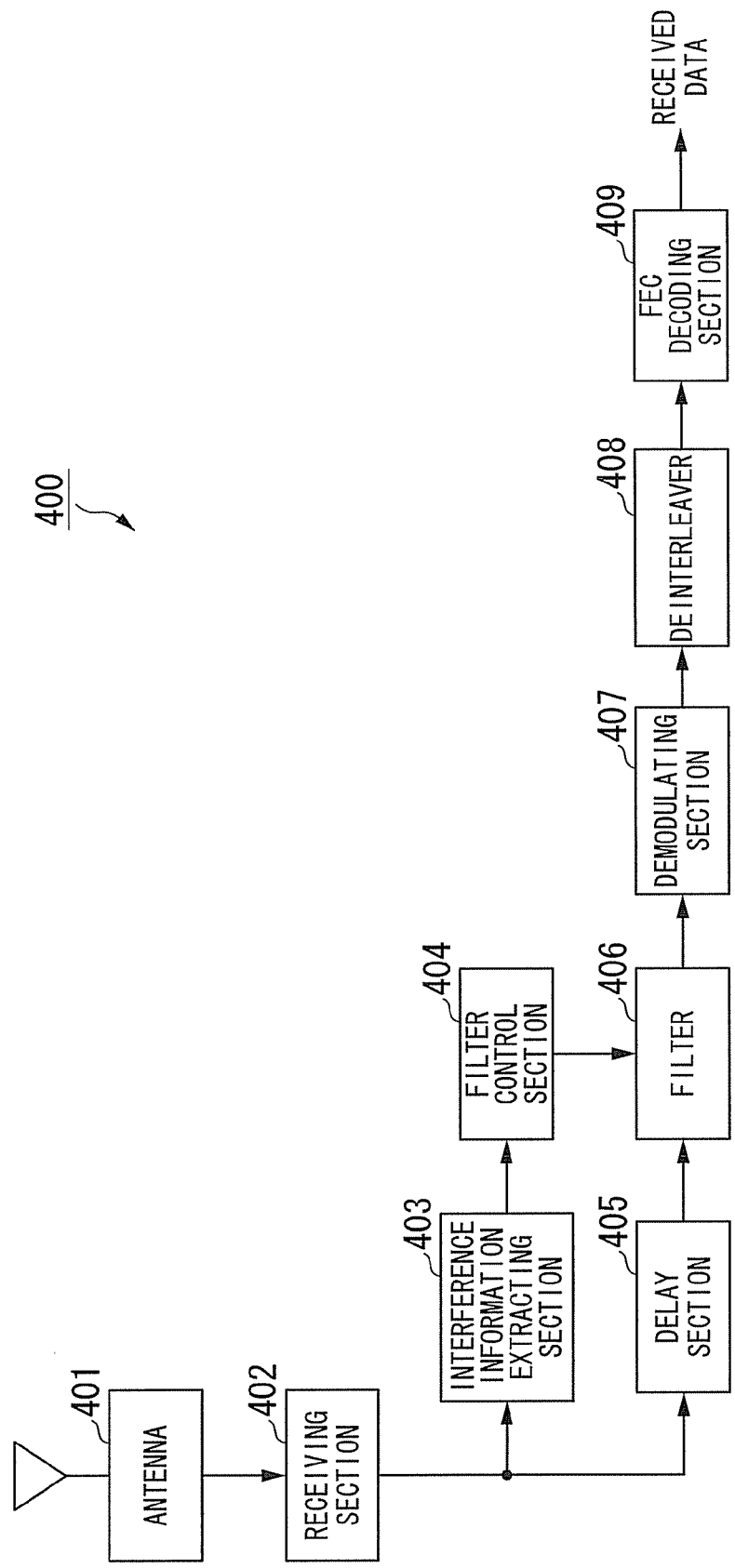
FIG. 21 is a block diagram showing the functional configuration of a receiving device that performs filtering.

FIG. 21 is a block diagram showing a functional configuration of a receiving device 400 that filters a superposed band. As shown in the figure, the receiving device 400 is provided with an antenna 401, a receiving section 402, an interference information extracting section 403, a filter control section 404, a delay section 405, a filter 406, a demodulating section 407, a deinterleaver 408, and an FEC decoding section 409.

The antenna 401 receives a signal in which a desired signal and an interference signal are combined.

The receiving section 402 down-converts the received signal and then performs analog/digital conversion.

The interference information extracting section 403 performs interference information extraction processing of extracting interference information including a central frequency of an interference signal and a frequency bandwidth of the interference signal from the received signal based on desired signal information determined at the initiation of communication with the transmitting device.

The interference information extraction processing can be realized by the existing technology. For example, the interference information extracting section 403 calculates a frequency spectrum of the received signal by performing a fast Fourier transform (FFT) on the received signal, estimates a frequency spectrum of the interference signal by calculating the difference between the calculated frequency spectrum of the received signal and the estimated result of a frequency spectrum of a desired signal obtained based on the desired signal information, and extracts the interference information based on a result of this estimation.

The filter control section 404 stores the desired signal information at the initiation of communication with the transmitting device, determines filter parameters satisfying the following two conditions based on the desired signal information and the interference information extracted by the interference information extracting section 403, and sets the determined parameters in the filter 406.

(1) A received signal in a frequency band in which no interference signal is present and only a desired signal is present is passed.

(2) A received signal in a frequency band in which an interference signal is present is attenuated.

It is noted that the filter parameters are configured by, for example, a filter type and a cutoff frequency.

The delay section 405 applies, to the received signal, a time delay corresponding to a time required for the interference information extracting section 403 and the filter control section 404 to complete their processing after the receiving section 402 has completed its processing, and outputs the delayed received signal to the filter 406. A delay amount applied to the received signal by the delay section 405 is preset by a designer.

The filter 406 filters the received signal to which the delay is applied by the delay section 405 based on a filter of which parameters are set by the filter control section 404. That is, the filter 406 filters the received signal, which is referred to by the filter control section 404 upon determination of the parameters, based on the filter of which parameters are set by the filter control section 404.

The demodulating section 407 generates a demodulated signal by removing a guard interval from the received signal filtered by the filter 406 and performing FFT and demodulation.

The deinterleaver 408 deinterleaves the demodulated signal generated by the demodulating section 407.

The FEC decoding section 409 decodes the demodulated signal deinterleaved by the deinterleaver 408 in accordance with FEC, generates a bit sequence in which an error bit has been corrected, and outputs received data.

Figure 22:
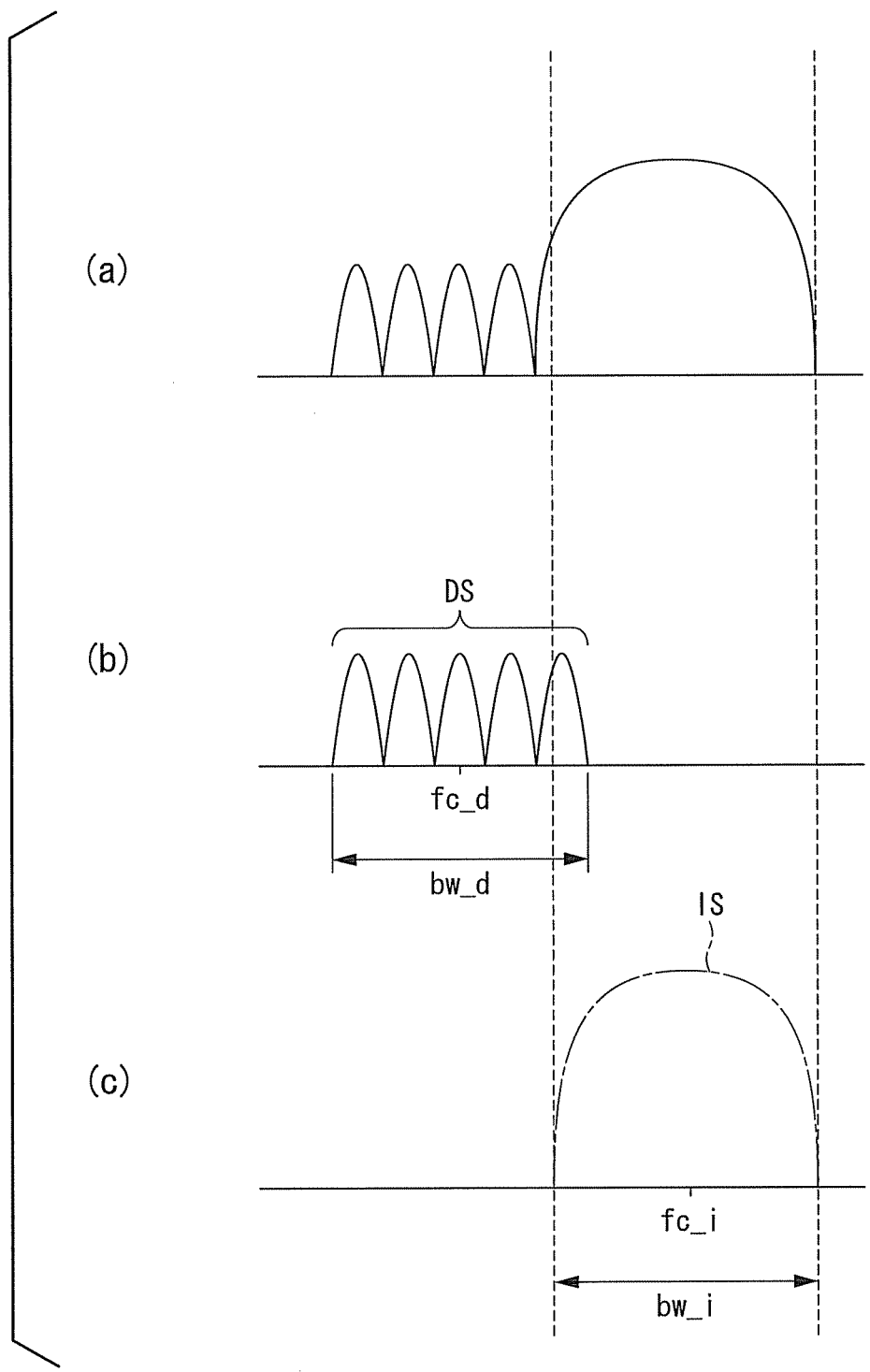
FIG. 22 is a conceptual diagram showing frequency spectra of a received signal, a desired signal, and an interference signal.

FIG. 22 is a conceptual diagram showing frequency spectra of a received signal, a desired signal, and an interference signal. In FIG. 22, the vertical axis represents power and the horizontal axis represents frequency. FIG. 22 (a) is a conceptual diagram showing the frequency spectrum of a signal received by the antenna 401. FIG. 22 (b) is a conceptual diagram showing the frequency spectrum of the desired signal included in the received signal of FIG. 22 (a). In FIG. 22 (b), a reference symbol DS denotes the frequency spectrum of the desired signal, fc_d denotes a center frequency of the desired signal, and bw_d denotes the frequency bandwidth of the desired signal. FIG. 22 (c) is a conceptual diagram showing the frequency spectrum of the interference signal included in the received signal of FIG. 22 (a). In FIG. 22 (c), a reference symbol IS denotes the frequency spectrum of the interference signal, fc_i denotes a center frequency of the interference signal, and bw_i denotes the frequency bandwidth of the interference signal.

Subsequently, the details of an operation of the filter control section 404 will be described. The filter control section 404 calculates a relative position between a desired signal and an interference signal based on the desired signal information and the interference information, and determines filter parameters to be applied to the filter 406 in accordance with the calculated result. Specifically, the filter control section 404 selects a filter type to be applied to the filter 406 from among a high-pass filter, a low-pass filter, and a notch filter based on desired signal information and interference information. Moreover, the filter control section 404 determines a cutoff frequency of the filter. The filter control section 404 then controls the filter 406 in accordance with the determined filter type and cutoff frequency.

Figure 23:
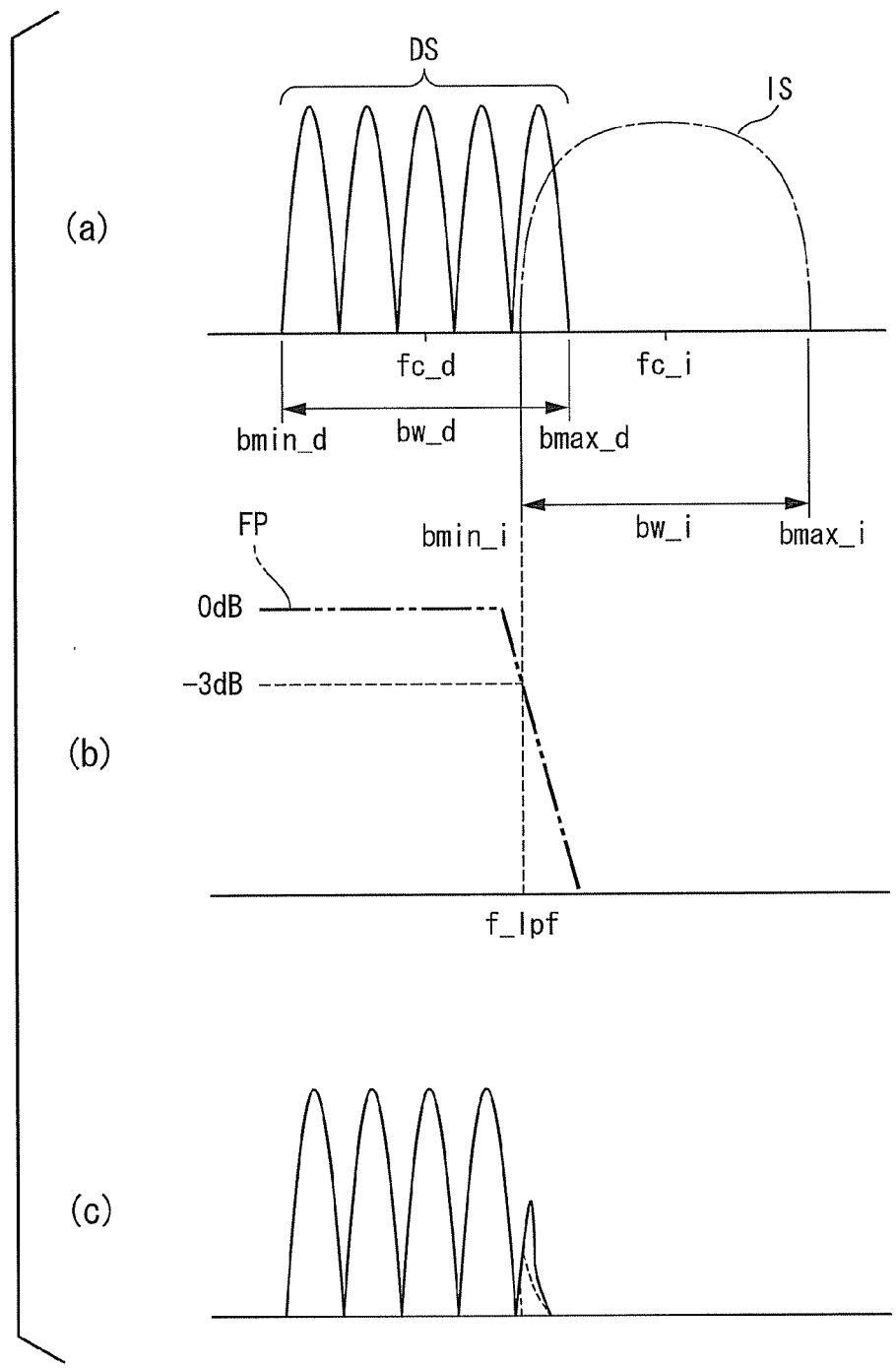
FIG. 23 is a schematic diagram showing an overview of filter control processing performed by the filter control section shown in FIG. 21.
Figure 24:
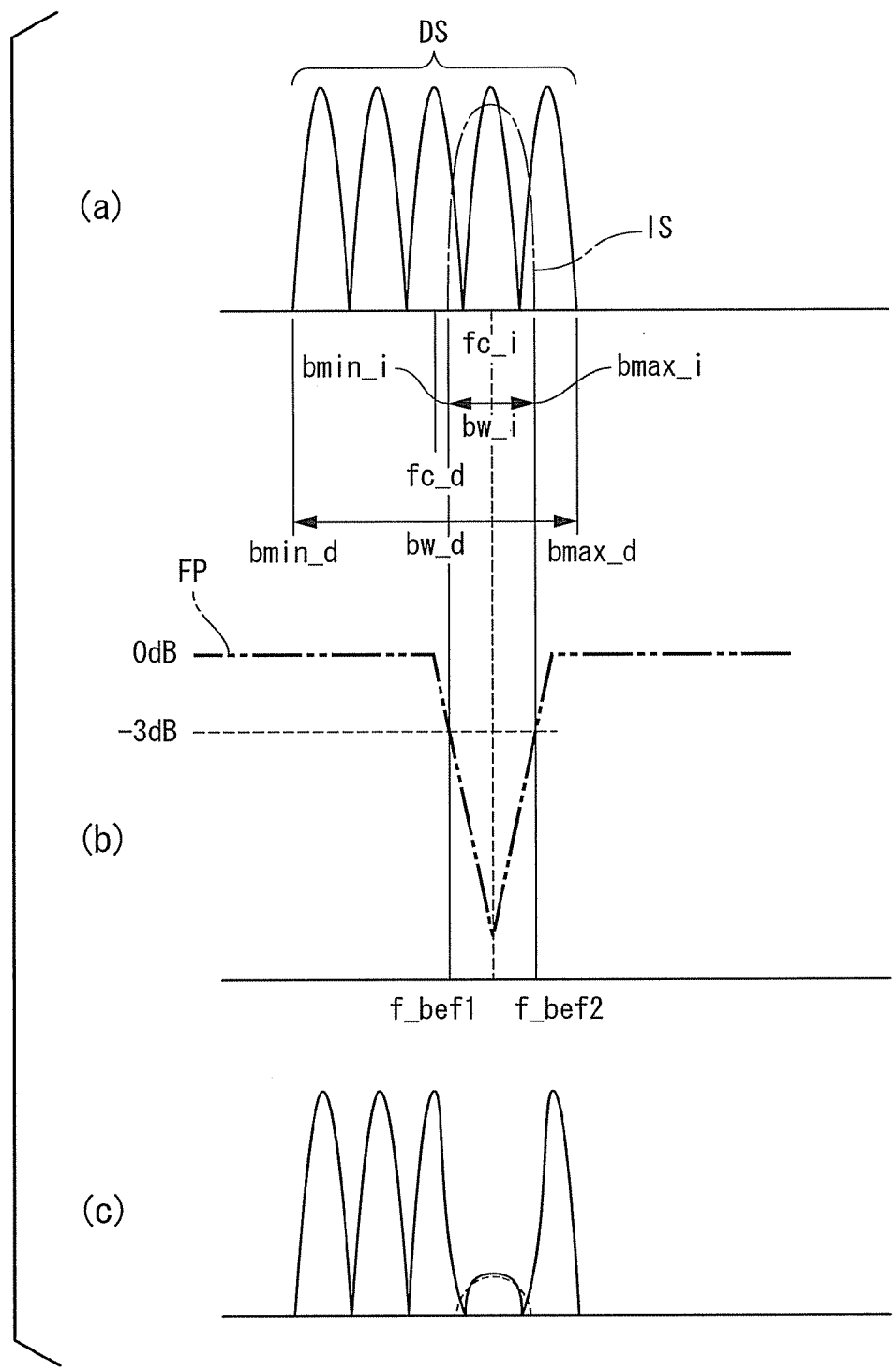
FIG. 24 is a schematic diagram showing an overview of filter control processing performed by the filter control section shown in FIG. 21.
Figure 25:
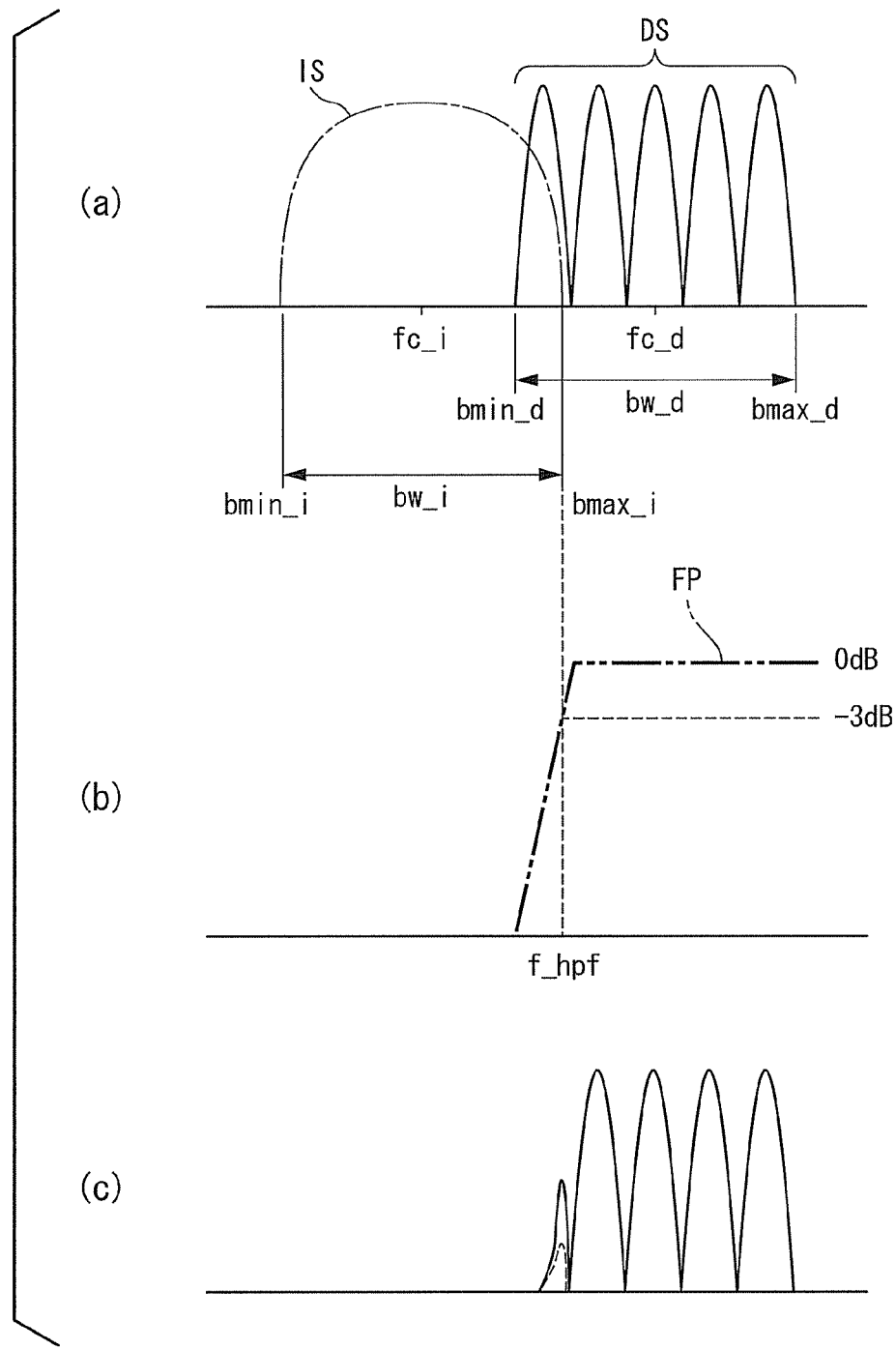
FIG. 25 is a schematic diagram showing an overview of filter control processing performed by the filter control section shown in FIG. 21.

FIGS. 23 to 25 are schematic diagrams showing an overview of filter control processing performed by the filter control section 404. Hereinafter, the details of the filter control processing will be described with reference to FIGS. 23 to 25.

FIG. 23 is a schematic diagram showing an overview of the filter control processing when the filter control section 404 sets a low-pass filter in the filter 406. FIG. 23 (*a*) is a schematic diagram showing a frequency spectrum of a signal received by the antenna 401 divided into a frequency spectrum of a desired signal and a spectrum of an interference signal. In FIG. 23 (*a*), the vertical axis represents power, the horizontal axis represents frequency, a reference symbol DS denotes the frequency spectrum of the desired signal, and a reference symbol IS denotes the frequency spectrum of the interference signal. The filter control section 404 calculates a maximum value (bmax_i) of a frequency band of the interference signal based on a center frequency (fc_i) and a frequency bandwidth (bw_i) of the interference signal, calculates a maximum value (bmax_d) of a frequency band of the desired signal based on a center frequency (fc_d) and a frequency bandwidth (bw_d) of the desired signal, and applies the low-pass filter to the filter 406 if bmax_i is higher than bmax_d (FIG. 23 (*a*)).

FIG. 23 (*b*) is a schematic diagram showing an overview of the low-pass filter applied to the filter 406 by the filter control section 404. In FIG. 23 (*b*), the vertical axis represents gain (in units of dB) and the horizontal axis represents frequency (in units of Hz). In this case, the filter control section 404 calculates a minimum value (bmin_i) of the frequency band of the interference signal based on the center frequency (fc_i) and the frequency bandwidth (bw_i) of the interference signal, and determines the value of a cutoff frequency (a frequency at which a gain of the low-pass filter becomes −3 dB) f_lpf of the low-pass filter as bmin_i. The filter control section 404 then sets parameters in which the filter type is the low-pass filter and the cutoff frequency f_lpf is bmin_i, as indicated by a reference symbol FP, in the filter 406.

FIG. 23 (*c*) is a schematic diagram showing a frequency spectrum after a received signal shown in FIG. 23 (*a*) is filtered by the filter 406 in which the low-pass filter shown in FIG. 23 (*b*) is set. As shown in the figure, the filter 406 attenuates the power of a signal having a frequency that is higher than the minimum value (bmin_i) of the frequency band of the interference signal, regardless of whether the signal is a desired signal or an interference signal.

FIG. 24 is a schematic diagram showing an overview of the filter control processing when the filter control section 404 sets a notch filter in the filter 406. FIG. 24 (*a*) is a schematic diagram showing a frequency spectrum of a signal received by the antenna 401 divided into a frequency spectrum of a desired signal and a spectrum of an interference signal. In FIG. 24 (*a*), the vertical axis represents power, the horizontal axis represents frequency, a reference symbol DS denotes the frequency spectrum of the desired signal, and a reference symbol IS denotes the frequency spectrum of the interference signal. The filter control section 404 calculates a maximum value (bmax_i) and a minimum value (bmin_i) of a frequency band of the interference signal based on a center frequency (fc_i) and a frequency bandwidth (bw_i) of the interference signal, calculates a maximum value (bmax_d) and a minimum value (bmin_d) of a frequency band of the desired signal based on a center frequency (fc_d) and a frequency bandwidth (bw_d) of the desired signal, and applies the notch filter to the filter 406 if bmax_i is lower than bmax_d and bmin_i is higher than bmin_d (FIG. 24 (*a*)).

FIG. 24 (*b*) is a schematic diagram showing an overview of the notch filter to be applied to the filter 406 by the filter control section 404. In FIG. 24 (*b*), the vertical axis represents gain (in units of dB) and the horizontal axis represents frequency (in units of Hz). In this case, the filter control section 404 calculates a minimum value (bmin_i) and a maximum value (bmax_i) of a frequency band of the interference signal based on a center frequency (fc_i) and a frequency bandwidth (bw_i) of the interference signal, and determines the values of two cutoff frequencies (two frequencies at which a gain of the notch filter becomes −3 dB) f_bef1 and f_bef2 of the notch filter as bmin_i and bmax_i. The filter control section 404 then sets parameters in which the filter type is the notch filter and the two cutoff frequencies f_bef1 and f_bef2 are bmin_i and bmax_i, as indicated by a reference symbol FP, in the filter 406.

FIG. 24 (*c*) is a schematic diagram showing a frequency spectrum after the received signal shown in FIG. 24 (*a*) is filtered by the filter 406 in which the notch filter shown in FIG. 24 (*b*) is set. As shown in the figure, the filter 406 attenuates the power of a signal having a frequency between the minimum value (bmin_i) and the maximum value (bmax_i) of the frequency band of the interference signal, regardless of whether the signal is a desired signal or an interference signal.

FIG. 25 is a schematic diagram showing an overview of the filter control processing when the filter control section 404 sets a high-pass filter in the filter 406. FIG. 25 (*a*) is a schematic diagram showing a frequency spectrum of a signal received by the antenna 401 divided into a frequency spectrum of a desired signal and a spectrum of an interference signal. In FIG. 25 (*a*), the vertical axis represents power, the horizontal axis represents frequency, a reference symbol DS denotes the frequency spectrum of the desired signal, and a reference symbol IS denotes the frequency spectrum of the interference signal. The filter control section 404 calculates a minimum value (bmin_i) of a frequency band of the interference signal based on a center frequency (fc_i) and a frequency bandwidth (bw_i) of the interference signal, calculates a minimum value (bmin_d) of a frequency band of the desired signal based on a center frequency (fc_d) and a frequency bandwidth (bw_d) of the desired signal, and applies the high-pass filter to the filter 406 if bmin_i is lower than bmin_d (FIG. 25 (*a*)).

FIG. 25 (*b*) is a schematic diagram showing an overview of the high-pass filter applied to the filter 406 by the filter control section 404. In FIG. 25 (*b*), the vertical axis represents gain (in units of dB) and the horizontal axis represents frequency (in units of Hz). In this case, the filter control section 404 calculates a maximum value (bmax_i) of a frequency band of the interference signal based on a center frequency (fc_i) and a frequency bandwidth (bw_i) of the interference signal, and determines the value of a cutoff frequency (a frequency at which a gain of the high-pass filter becomes −3 dB) f_hpf of the high-pass filter as bmax_i. The filter control section 404 then sets parameters in which the filter type is the high-pass filter and the cutoff frequency f_hpf is bmax_i, as indicated by a reference symbol FP, in the filter 406.

FIG. 25 (c) is a schematic diagram showing a frequency spectrum after the received signal shown in FIG. 25 (a) is filtered by the filter 406 in which the high-pass filter shown in FIG. 25 (b) is set. As shown in the figure, the filter 406 attenuates the power of a signal having a frequency that is lower than the maximum value (bmax_i) of the frequency band of the interference signal, regardless of whether the signal is a desired signal or an interference signal.

Subsequently, an operation and a processing procedure of the receiving device 400 will be described.

Figure 26:
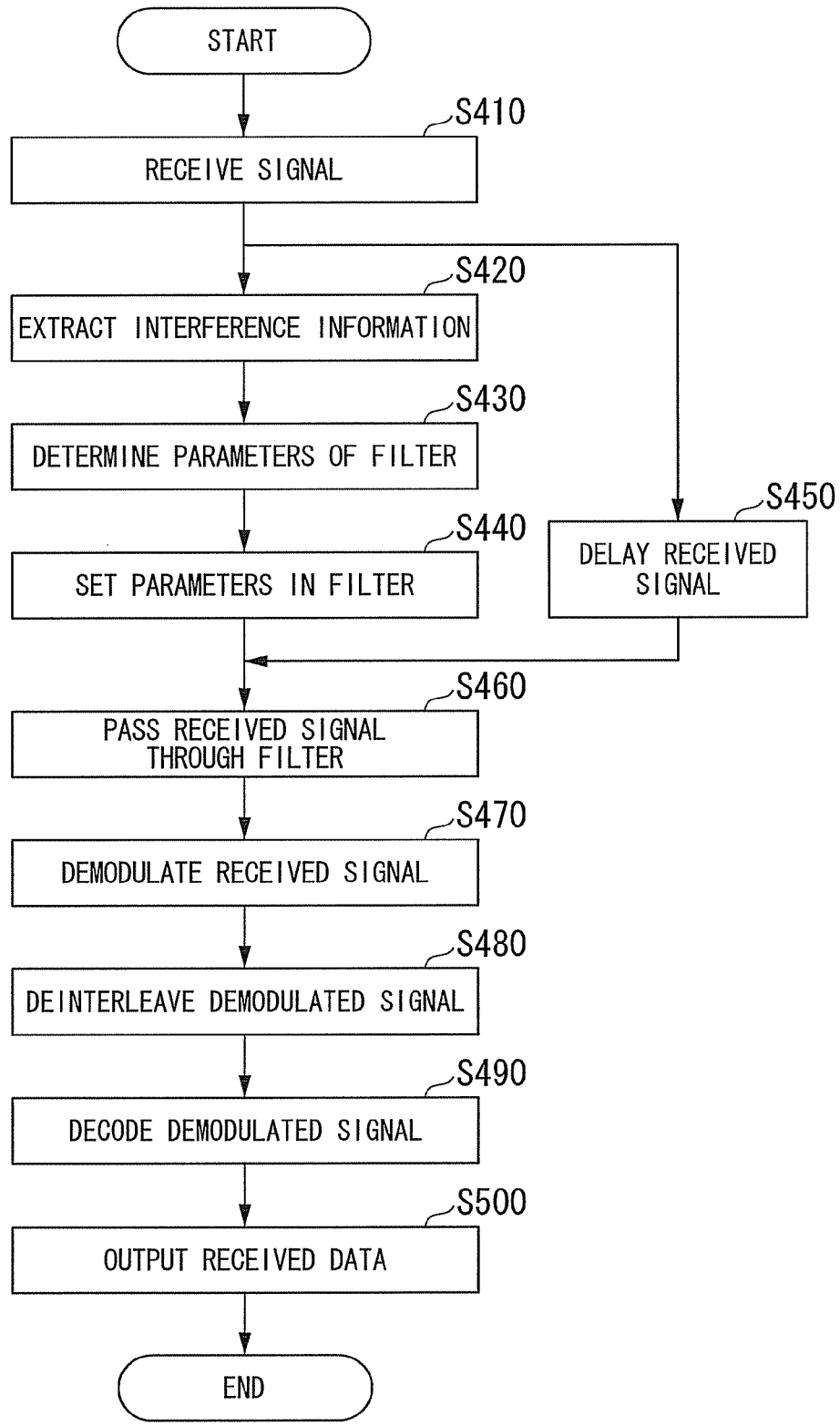
FIG. 26 is a flowchart showing a filter control procedure of the receiving device shown in FIG. 21.

FIG. 26 is a flowchart showing the processing procedure when the receiving device 400 controls a filter.

First, as shown in FIG. 26, the antenna 401 receives a signal, and the receiving section 402 performs a down-conversion and an analog/digital conversion on the received signal (step S410). The interference information extracting section 403 then extracts interference information from the received signal processed by the receiving section 402 (step S420). Subsequently, the filter control section 404 determines a filter type to be applied to the filter 406 and a cutoff frequency of a filter as described above based on the interference information extracted by the interference information extracting section 403 and desired signal information stored in the filter control section 404 (step S430). The filter control section 404 then sets the determined filter type and the determined cutoff frequency of the filter in the filter 406 (step S440).

In parallel with the processing of steps S420 to S440, the delay section 405 delays the received signal (step S450). Subsequently, the filter 406 forms a filter in accordance with the parameters set in the processing of step S440, and attenuates the power of a frequency band in which an interference signal is present in the received signal by filtering the delayed received signal (step S460). The demodulating section 407 then demodulates the received signal that has passed the filter 406 to generate a demodulated signal (step S470). The deinterleaver 408 then deinterleaves the demodulated signal (step S480). The FEC decoding section 409 then performs FEC-decoding on the deinterleaved demodulated signal (step S490), outputs decoded received data (step S500), and ends the processing of the whole flowchart.

In this way, in the receiving device 400, the interference information extracting section 403 extracts interference information and the filter control section 404 sets parameters of a filter for attenuating a signal in a frequency band in which an interference signal is present in the filter 406. The filter 406 then filters the received signal to attenuate the signal in the frequency band in which the interference signal is present among signals included in the received signal. Thus, it is possible to mitigate the influence by the interference signal in the received signal.

When the receiving section 402, the interference information extracting section 403, the filter control section 404, the delay section 405, and the filter 406 of the receiving device 400 described above are added to the receiving devices 200 and 200a shown in FIGS. 8 and 14, received signals from antennas (not shown) of the receiving devices 200 and 200a are output to the receiving section 402, and the output of the filter 406 is input to the OFDM demodulator 210, filtering on the superposed band can be performed.

Third Embodiment

Figure 27:
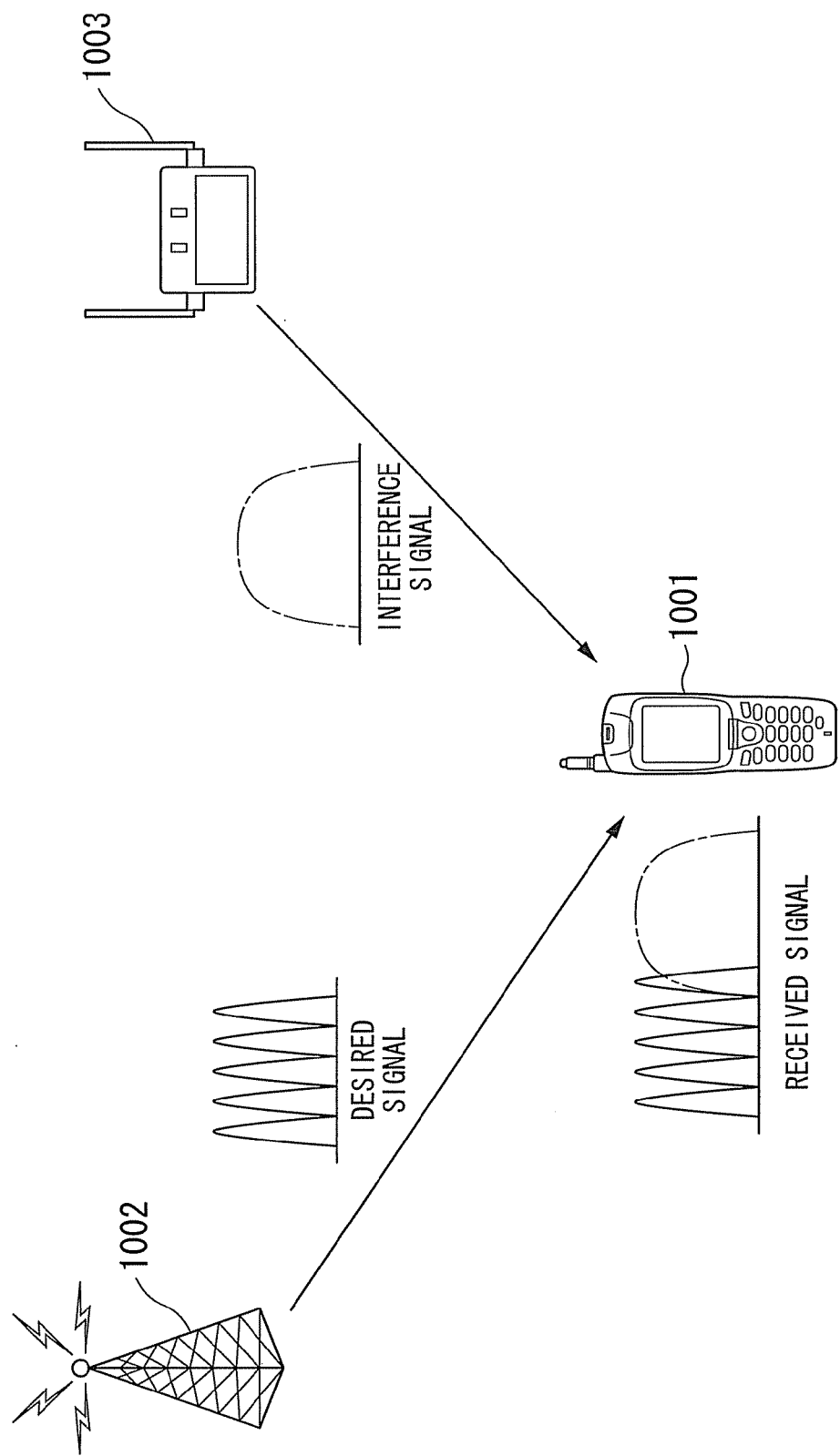
FIG. 27 is a schematic diagram showing an overview of a network environment in which a receiving device and a transmitting device that transmit and receive signals using multicarrier transmission are arranged.

FIG. 27 is a schematic diagram showing an overview of a network environment in which a receiving device and a transmitting device that transmit and receive signals with multicarrier transmission are arranged. As shown in the figure, a receiving device 1001 receives a signal (hereinafter referred to as "a received signal") in which a desired signal transmitted from a transmitting device 1002 with multicarrier transmission and an interference signal transmitted from an interference source 1003 are combined. It is noted that while in FIG. 27 the receiving device 1001 is a wireless communication terminal and the transmitting device 1002 is a base station device, they can be reversed, with the receiving device 1001 being a base station device and the transmitting device 1002 being a wireless communication terminal. The wireless communication terminal is a terminal device which performs wireless communication with the base station device, and it is a device such as, for example, a mobile phone, a wireless local area network (LAN) terminal, or a worldwide interoperability for microwave access (WiMAX) terminal. The base station device is a device which performs wireless communication with a plurality of wireless communication terminals, and it is a device such as, for example, a base station device in a mobile telephone network, a wireless LAN router, or a WiMAX base station.

The functional configuration of the receiving device 1001 will be described.

Figure 28:
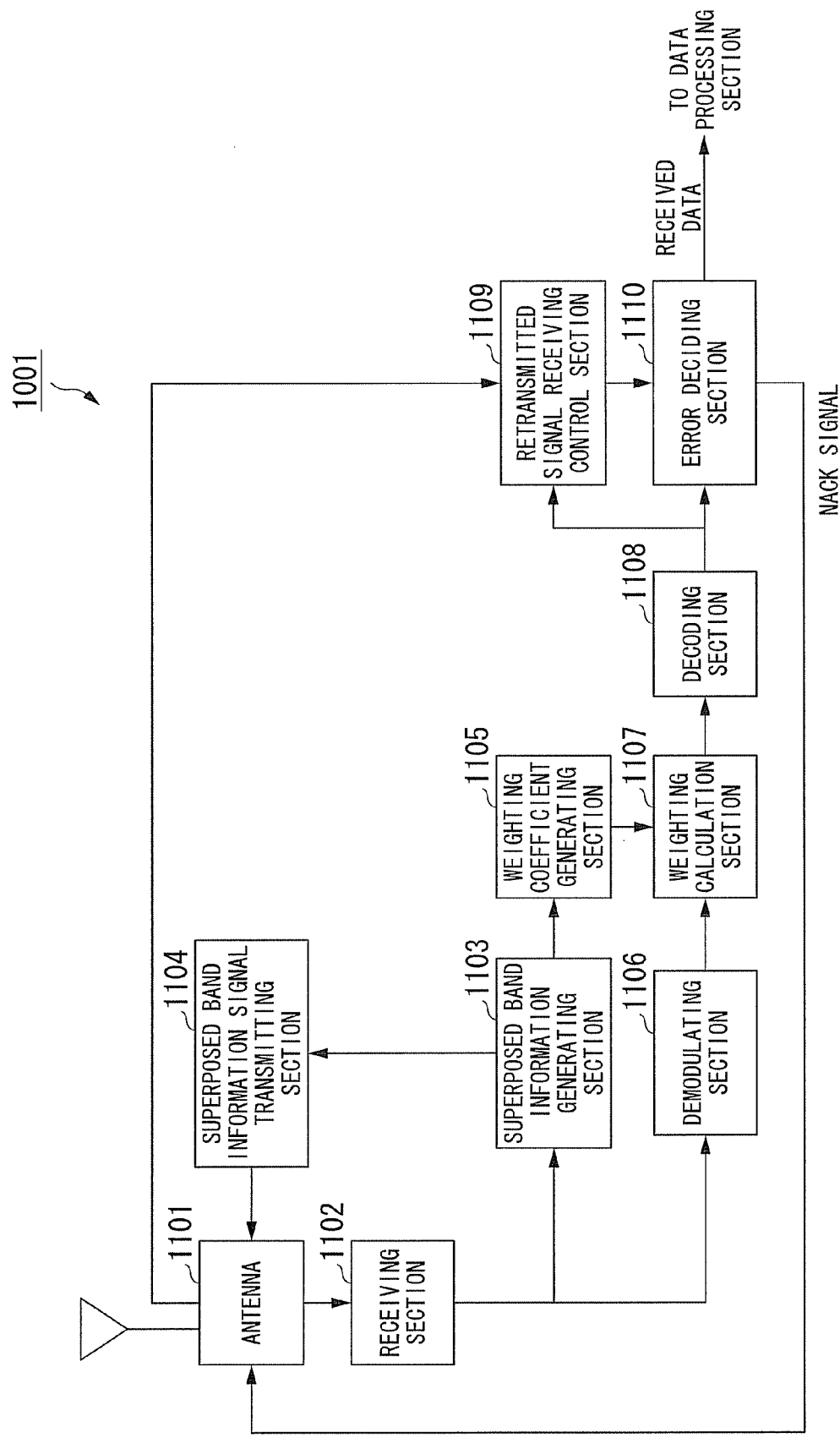
FIG. 28 is a block diagram showing the functional configuration of a receiving device.

FIG. 28 is a block diagram showing the functional configuration of the receiving device 1001. As shown in the figure, the receiving device 1001 is provided with an antenna 1101, a receiving section 1102, a superposed band information generating section 1103, a superposed band information signal transmitting section 1104, a weighting coefficient generating section 1105, a demodulating section 1106, a weighting calculation section 1107, a decoding section 1108, a retransmitted signal receiving control section 1109, and an error deciding section 1110.

The antenna 1101 receives a signal in which a desired signal and an interference signal are combined. Additionally, the antenna 1101 outputs a superposed band information signal and a NACK signal to the transmitting device 1002.

The receiving section 1102 down-converts the received signal, and performs an analog/digital conversion.

The superposed band information generating section 1103 executes superposed band information generation processing, and determines whether or not interference is occurring in each subcarrier of the desired signal, i.e., whether or not the frequency band thereof is overlapping with an interference signal. The superposed band information generating section 1103 then generates superposed band information as a sequence of superposed band decision values in which, for example, subcarriers in which interference is occurring (hereinafter referred to as "specific subcarriers") are associated with "1" and subcarriers of the desired signal other than the specific subcarriers are associated with "0". That is, the superposed band information represents subcarriers that are suffering interference during wireless communication between the transmitting device 1002 and the receiving device 1001.

The superposed band information generation processing can be realized by the existing technology. For example, the superposed band information generating section 1103 calculates the frequency spectrum of the received signal by performing a fast Fourier transform (FFT) on the received signal, estimates the frequency spectrum of the interference signal by calculating the difference between the calculated frequency spectrum of the received signal and an estimated result of the frequency spectrum of the desired signal, and generates the superposed band information based on this estimated result. Additionally, when, for example, the position of the interference source 1003 is known, the receiving device 1001 may be provided with an auxiliary antenna with directivity of receiving interference signals coming from the direction of the information source 1003, and the superposed band information generating section 1103 may generate the superposed band information from the interference signals received by this auxiliary antenna. Also, for example, the superposed band information generating section 1103 may generate the superposed band information based on the frequency spectrum in a pilot signal transmitted from the transmitting device 1002 at a predetermined timing (e.g. a signal in which electrical power is not allocated to a subcarrier).

The superposed band information signal transmitting section 1104 generates a radio signal (a superposed band information signal) by executing processing such as coding processing, modulation processing, digital/analog conversion processing, up-conversion processing, and the like, on the superposed band information, and transmits it via the antenna 1101 to the transmitting device 1002.

The weighting coefficient generating section 1105 calculates a weighting coefficient for each subcarrier based on the superposed band information. The weighting coefficient is a coefficient for reducing the likelihood of a specific subcarrier detected by the superposed band information generating section 1103 compared to the other subcarriers. Likelihood is a value used in the process of the decoding section 1108, and the details thereof will be described below. The weighting coefficient generating section 1105 outputs a sequence in which calculated weighting coefficients are arranged for respective subcarriers to the weight calculating section 1107.

The demodulating section 1106 performs demodulation processing to generate and output a demodulated value of each subcarrier of the received signal.

The weight calculating section 1107 performs weighting calculation processing on the demodulated value of each subcarrier based on the weighting coefficients, and outputs a sequence in which calculated results are arranged for the respective subcarriers as a likelihood data sequence.

The decoding section 1108 performs error correction processing and decoding processing based on the likelihood data sequence to generate a bit sequence, and outputs a bit sequence (reception data) of the desired signal. The error correction processing is executed in accordance with a technique such as, for example, forward error correction (FEC).

When receiving a retransmission of the desired signal from the transmitting device 1002, the retransmitted signal receiving control section 1109 receives a retransmission control signal via the antenna 1101. The retransmitted signal receiving control section 1109 then generates reception data using the received retransmitted signal based on retransmission control information included in the retransmission control signal.

The error deciding section 1110 performs error detection processing on the reception data generated by the decoding section 1108 or the retransmitted signal receiving control section 1109. When no error has been detected, the error deciding section 1110 then outputs the reception data as it is to a data processing section (not shown); when an error has been detected, the error deciding section 1110 generates information (retransmission command information) indicating the data in which the error has been detected. The retransmission command information uses, for example, a packet number to indicate the data in which the error has been detected. The error deciding section 1110 then generates a NACK signal including the retransmission command information, and transmits the NACK signal via the antenna 1101 to the transmitting device 1002.

The contents of the processing of the receiving device 1001 are as shown in FIGS. 19A to 19D and FIGS. 20A to 20B referred to in the embodiment described earlier. FIG. 19A is a diagram showing an example of a received signal in the receiving device 1001. The superposed band information generating section 1103 detects subcarriers SC1 to SC4 included in a superposed band W in which a desired signal and an interference signal overlap in FIG. 19A as specific subcarriers. The superposed band information generating section 1103 then generates superposed band information in which the subcarriers SC1 to SC4 are associated with "1" and the other subcarriers are associated with "0".

FIGS. 19B to 19D are diagrams showing examples of weighting calculation processing corresponding to a coding method using FEC. An example will be described in which a coding method of the desired signal is a soft decision positive/negative multi-valued coding method. In decoding processing in this soft decision positive/negative multi-valued coding method, the demodulated value of the reception signal is a positive/negative multi-valued output. In this case, the decoding section 1108 uses the size of the absolute value of the demodulated value as likelihood (a value indicating likeliness, reliability) in the decision, and performs decoding processing of determining "+1" when the demodulated value is a negative value, and "−1" when the demodulated value is a positive value.

FIG. 19B is a diagram showing weighting coefficients for the respective subcarriers. The weighting coefficient generating section 1105 allocates, for example, "0" to specific subcarriers and allocates, for example, "1" to the other subcarriers, as weighting coefficients. FIG. 19C is a diagram showing demodulated values of the positive/negative multi-valued output for the respective subcarriers. In FIG. 19C, the subcarrier having the highest likelihood that it is most likely to be "−1" is the subcarrier having the largest positive demodulated value of "+27.02". On the other hand, the subcarrier having the highest likelihood that it is most likely to be "+1" is the subcarrier having the smallest negative demodulated value of "−26.34". Additionally, the subcarrier having the most ambiguity (low likelihood) as to whether it is "+1" or "−1" is the subcarrier having the smallest absolute value, that is, a subcarrier with a demodulated value of "0".

FIG. 19D is a diagram showing an overview of the processing of the weight calculating section 1107. The weight calculating section 1107 multiplies the demodulated value of each subcarrier by the weighting coefficient based on the weighting coefficients calculated by the weighting coefficient generating section 1105. In the case of FIG. 19D, the weight calculating section 1107 multiplies the demodulated values of the specific subcarriers (subcarriers SC1 to SC4) by a weighting coefficient of "0", thereby reducing the likelihood of the demodulated values of the specific subcarriers. On the other than, the weight calculating section 1107 multiplies the demodulated values of the other subcarriers with a weighting coefficient of "1", thereby maintaining the demodulated values. The weight calculating section 1107 then outputs a sequence in which calculated results are arranged for the respective subcarriers as a likelihood data sequence to the decoding section 1108.

FIG. 20A and FIG. 20B are diagrams showing other examples of weighting coefficients. The weighting coefficient that the weighting coefficient generating section 1105 allocates to the specific subcarriers is not limited to "0", and need only be a value that the absolute value of the demodulated value gets smaller, such as "0.1" or "0.2" (FIG. 20A). Moreover, the weighting coefficient that the weighting coefficient generating section 1105 allocates to the other subcarriers is not limited to "1", and need only be larger than the weighting coefficient allocated to the specific subcarriers, such as "0.99" or "0.9", the closer to "1" the better. Also, the weighting coefficients allocated to the other subcarriers may be values larger than "1".

Additionally, in the soft decision output type, in the case of demodulated values of a positive/negative multi-valued output, the decoding section 1108 decodes a bit value with a demodulated value nearer to "0" as "4", and decodes a bit value with a demodulated value nearer to a maximum value ("7" in FIG. 20A) as "1". In this case, the weighting coefficient generating section 1105 generates weighting coefficients such that the demodulated value of a specific subcarrier becomes a median of the values of output candidates (e.g., when the values of the output candidates are 0 to 7, the median "3" or "4"). In this case, the weight calculating section 1107 may be configured such that the demodulated values of the respective subcarriers are not multiplied by the weighting coefficients; instead, the demodulated values of the specific subcarriers are replaced with the median, while outputting the demodulated values of the other subcarriers as they are (FIG. 20A).

Additionally, in the case of a hard decision output type as shown in FIG. 20B, i.e., a type of outputting a binary value of "−1" or "+1", the weighting coefficient generating section 1105 may be configured to output a coefficient for replacing a binary demodulated value with "0" to the weight calculating section 1107 as a weighting coefficient for a specific subcarrier.

The receiving device 1001 employs an error correction code (in this case, FEC), and thus the desired signal can be obtained based on the demodulated values of the other subcarriers even when the demodulated values of part of the subcarriers are missing. Moreover, the receiving device 1001 performs calculation processing using weighting coefficients on subcarriers with interference (specific subcarriers), thereby reducing their likelihood and enhancing the reception error correction performance.

Subsequently, the functional configuration of the transmitting device 1002 will be described.

Figure 29:
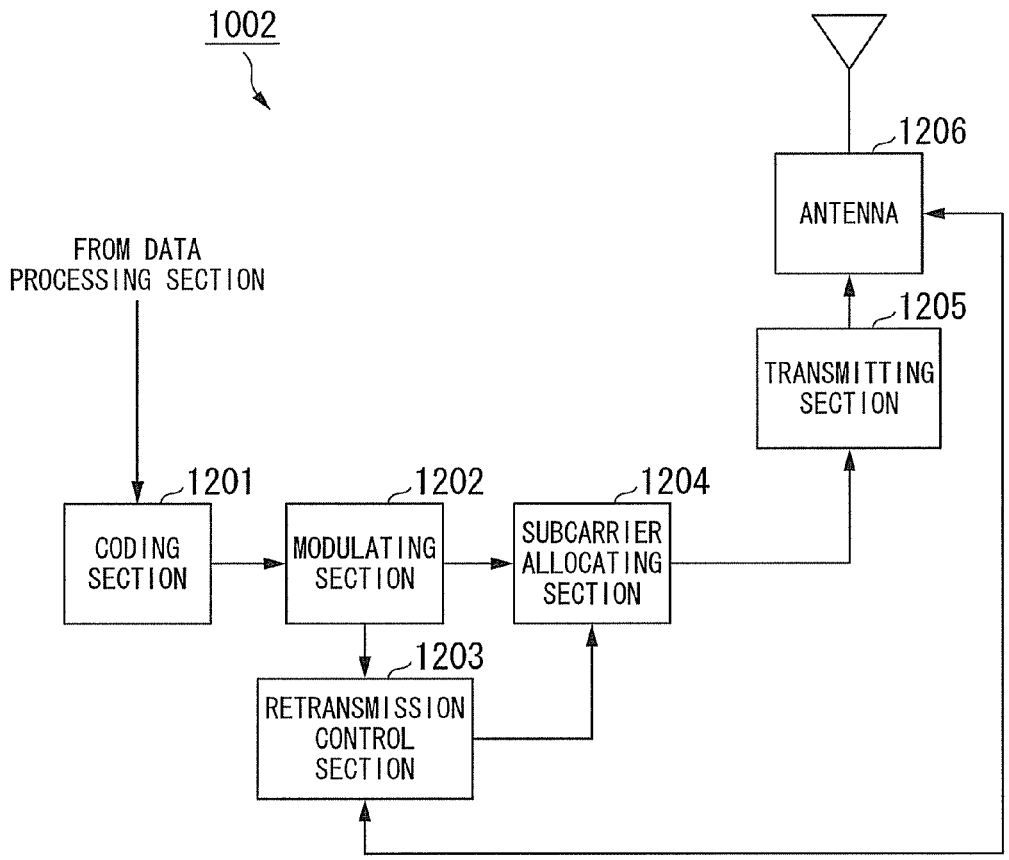
FIG. 29 is a block diagram showing the functional configuration of a transmitting device.

FIG. 29 is a block diagram showing the functional configuration of the transmitting device 1002. As shown in the figure, the transmitting device 1002 is provided with a coding section 1201, a modulating section 1202, a retransmission control section 1203, a subcarrier allocating section 1204, a transmitting section 1205, and an antenna 1206.

The coding section 1201 adds an error detection code to a bit sequence of transmission data supplied from a data processing section (not shown), performs coding using error correction coding processing, and generates coded bits. An error detection technique such as, for example, cyclic redundancy check (CRC) can be employed in the error detection coding.

The modulating section 1202 modulates the coded bits and generates a plurality of modulated symbols.

The retransmission control section 1203 temporarily stores the plurality of modulated symbols modulated by the modulating section 1202. This temporary storage is performed, for example, until information (e.g., an acknowledgement (ACK) signal) indicating that a packet constituted by the respective modulated symbols has been received normally is received, or until a predetermined time elapses after the respective modulated symbols have been transmitted; thereafter, the values of the respective modulated symbols are discarded.

Additionally, the retransmission control section 1203 receives a NACK signal from the receiving device 1001, and obtains retransmission command information from the NACK signal. The retransmission control section 1203 also executes processing, such as down-conversion processing, analog/digital conversion processing, demodulation processing, and decoding processing, on a superposed band information signal received by the antenna 1206 described below, and obtains superposed band information from the superposed band information signal. The retransmission control section 1203 then identifies subcarriers with no interference (hereinafter referred to as "non-interference subcarriers") based on the superposed band information, arranges the respective modulated symbols constituting a packet that is commanded to be retransmitted in accordance with the retransmission command information in the non-interference subcarriers, and retransmits them.

The subcarrier allocating section 1204 generates a modulated signal by arranging the plurality of modulated symbols in the respective subcarriers. At this time, when there is no retransmission command from the retransmission control section 1203, the subcarrier allocating section 1204 arranges the plurality of modulated symbols output from the modulating section 1202 at a fixed ratio in subcarriers with interference and subcarriers with no interference, and generates a modulated signal. On the other hand, when there is a retransmission command from the retransmission control section 1203, the subcarrier allocating section 1204 arranges the modulated symbols in the subcarriers in accordance with that command, and generates a modulated signal.

The transmitting section 1205 performs processing such as a digital/analog conversion and an up-conversion on the modulated signal generated by the subcarrier allocating section 1204, and generates a transmission signal.

The antenna 1206 wirelessly transmits the transmission signal generated by the transmitting section 1205, and receives radio signals (particularly the superposed band information signal).

Figure 30:
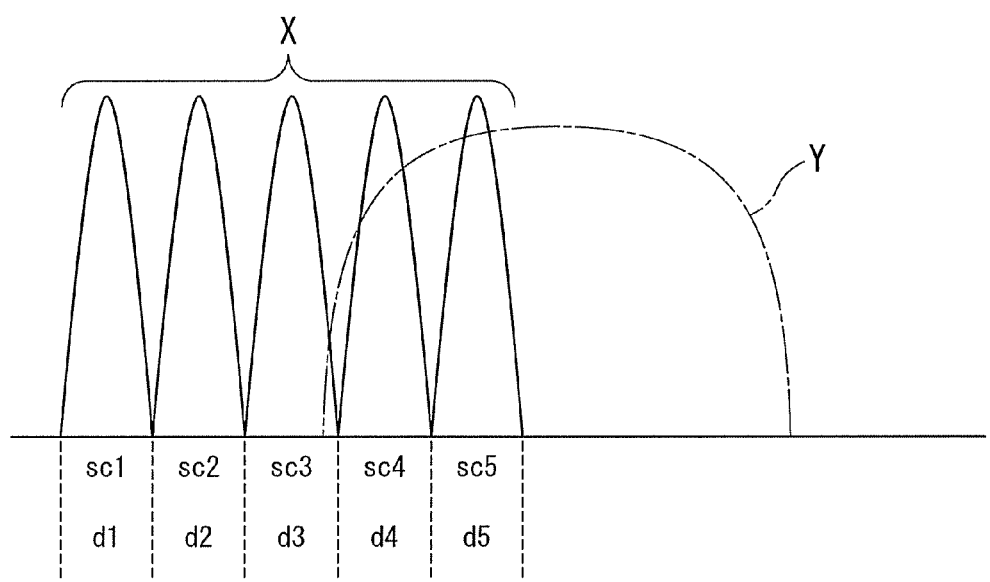
FIG. 30 is an overview of a desired signal and an interference signal received by a receiving device.
Figure 31:
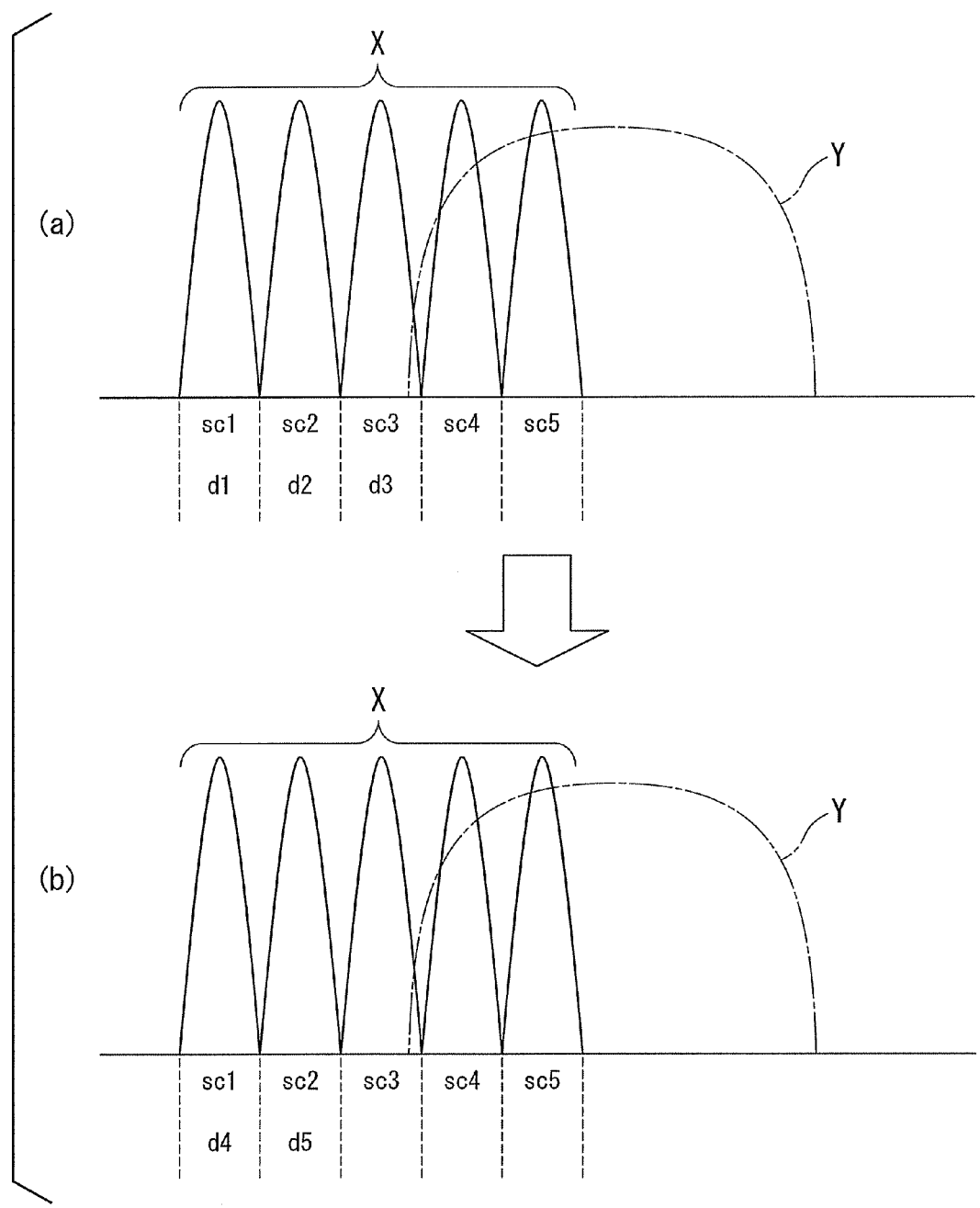
FIG. 31 is an overview of a desired signal and an interference signal received by a receiving device.

FIGS. 30 and 31 show overviews of a desired signal and an interference signal received by the receiving device 1001. In FIG. 30, a reference symbol X represents the desired signal, and a reference symbol Y represents the interference signal. Additionally, in FIG. 30, the horizontal axis represents frequency. As shown in the figure, the desired signal is constituted by five subcarriers sc1 to sc5, and two subcarriers sc4 and sc5 among the subcarriers of the desired signal overlap with the interference signal Y.

Hereinafter, processing of the retransmitted signal receiving control section 1109, the error deciding section 1110, and the retransmission control section 1203 will be described with reference to FIGS. 30 and 31. FIG. 30 is a specific example of a desired signal transmitted before being retransmitted. In this case, modulated symbols d1 to d5 are arranged in the subcarriers sc1 to sc5 respectively. As mentioned above, however, since there is interference on the subcarriers sc4 and sc5, it is impossible to restore the transmitted data correctly, even with error correction. Consequently, the error deciding section 1110 detects an error in the received data generated by the decoding section 1108 based on the desired signal. In this case, the error deciding section 1110 generates retransmission command information for the received data, and generates and transmits a NACK including this retransmission command information.

FIG. 31 is a specific example of a desired signal at the time of retransmission, generated in accordance with retransmission control by the retransmission control section 1203. Upon receipt of the NACK, the retransmission control section 1203 identifies a packet to be retransmitted based on the retransmission command information, and identifies respective modulated symbols constituting the packet. The retransmission control section 1203 also identifies non-interference subcarriers in which no interference is occurring based on the superposed band information. The retransmission control section 1203 then reads the values of the modulated symbols to be retransmitted from among the plurality of modulated symbols being temporarily stored, and commands the subcarrier allocating section 1204 to arrange these modulated symbols in the non-interference subcarriers. In accordance with this command, the subcarrier allocating section 1204 allocates the modulated symbols to the non-interference subcarriers as commanded, and generates a modulated signal. The retransmission control section 1203 then generates information indicating subcarriers to which a signal of the packet to be retransmitted are allocated (e.g., information indicating the frequencies and timeslots of the subcarriers) as retransmission control information, and transmits it via the antenna 1206 to the receiving device 1001.

When the number of modulated symbols to be retransmitted is larger than the number of non-interference subcarriers, the retransmission control section 1203 performs retransmission repeatedly until retransmission of all the modulated symbols have been completed. That is, first, the retransmission control section 1203 allocates part of the modulated symbols to be retransmitted to subcarriers with no interference. In FIG. 31 (*a*), the retransmission control section 1203 allocates part (d1 to d3) of the modulated symbols to be retransmitted d1 to d5 to non-interference subcarriers sc1 to sc3 respectively. The retransmission control section 1203 then allocates modulated symbols that have not yet been retransmitted among the modulated symbols to be retransmitted to subcarriers with no interference. In FIG. 31 (*b*), the modulated symbols d4 and d5 that have not yet been transmitted are allocated to the non-interference subcarriers sc1 and sc2 respectively. The retransmission control section 1203 repeatedly executes this processing to retransmit all the modulated symbols to be retransmitted. The retransmission control section 1203 then generates information indicating subcarriers to which a signal of the packet to be retransmitted are allocated (e.g., information indicating the frequencies and timeslots of the subcarriers) as retransmission control information, and transmits it via the antenna 1206 to the receiving device 1001. In this case, the retransmission control information may be configured to indicate the number of division of one packet into a plurality of desired signals, or to indicate the size of data obtained by dividing one packet.

Upon receipt of the retransmission control information, the retransmitted signal receiving control section 1109 generates received data from the retransmitted signal based on the retransmission control information. For example, when desired signals that are targets for retransmission are transmitted in a plurality of divided transmissions as shown in FIG. 31, the received data (decoded bits) output from the decoding section 1108 is buffered based on the retransmission control information until all the desired signals have been received, and combining processing is performed after all the decoded bits are obtained, thereby generating one piece of received data. The retransmitted signal receiving control section 1109 then outputs the generated received data to the error deciding section 1110.

Subsequently, an operation and a processing procedure of the receiving device 1001 will be described.

Figure 32:
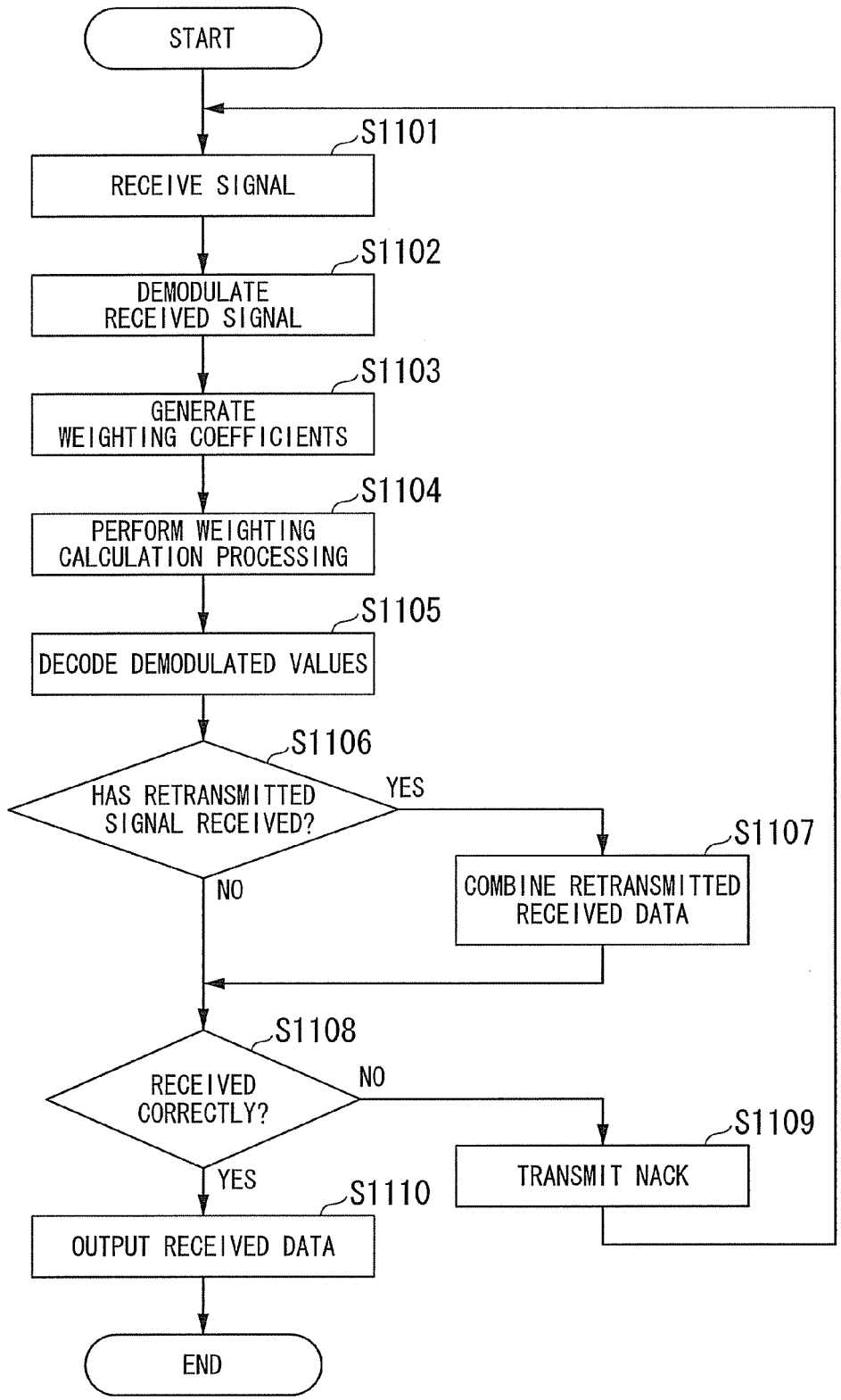
FIG. 32 is a flowchart showing a processing procedure of a receiving device.

FIG. 32 is a flowchart showing a processing procedure of the receiving device 1001. First, the antenna 1101 receives a signal, and the receiving section 1102 performs a down-conversion and an analog/digital conversion on the received signal (step S1101). Subsequently, the demodulating section 1106 demodulates the received signal to generate a demodulated value (step S1102). Additionally, the superposed band information generating section 1103 generates superposed band information by executing superposed band information generation processing. Based on the superposed band information, the weighting coefficient generating section 1105 then generates a weighting coefficient for each subcarrier (step S1103). The weight calculating section 1107 then performs weight calculating processing based on the weighting coefficient, thereby manipulating the demodulated value of each subcarrier. For example, the weight calculating section 1107 multiplies the demodulated value of each subcarrier by the weighting coefficient corresponding thereto (step S1104). The decoding section 1108 then decodes each demodulated value after being multiplied by the weighting coefficient (step S1105), and generates decoded received data.

Subsequently, the retransmitted signal receiving control section 1109 determines whether or not the received data generated by the decoding section 1108 is that of a retransmitted signal based on whether or not retransmission control information has been received. If a retransmitted signal has been received (step S1106-YES), the retransmitted signal receiving control section 1109 buffers this received data, and, when all the received data have been obtained, combines and outputs the retransmitted received data (step S1107). On the other hand, if a retransmitted signal has not been received (step S1106-NO), this fact is reported to the error deciding section 1110. When the retransmitted signal has not been received, the error deciding section 1110 uses CRC or the like to perform error detection on the received data generated by the decoding section 1108; when the retransmitted signal has been received, it uses CRC or the like to perform error detection on the received data generated by the retransmitted signal receiving control section 1109 (step S1108). When an error has been detected (step S1108-NO), the error deciding section 1110 generates and transmits a NACK (step S1109). On the other hand, when no error has been detected, the error deciding section 1110 outputs the received data to the data processing section (step S1110), whereby all the processing of this flowchart end.

Subsequently, an operation and a processing procedure of the transmitting device 1002 will be described.

Figure 33:
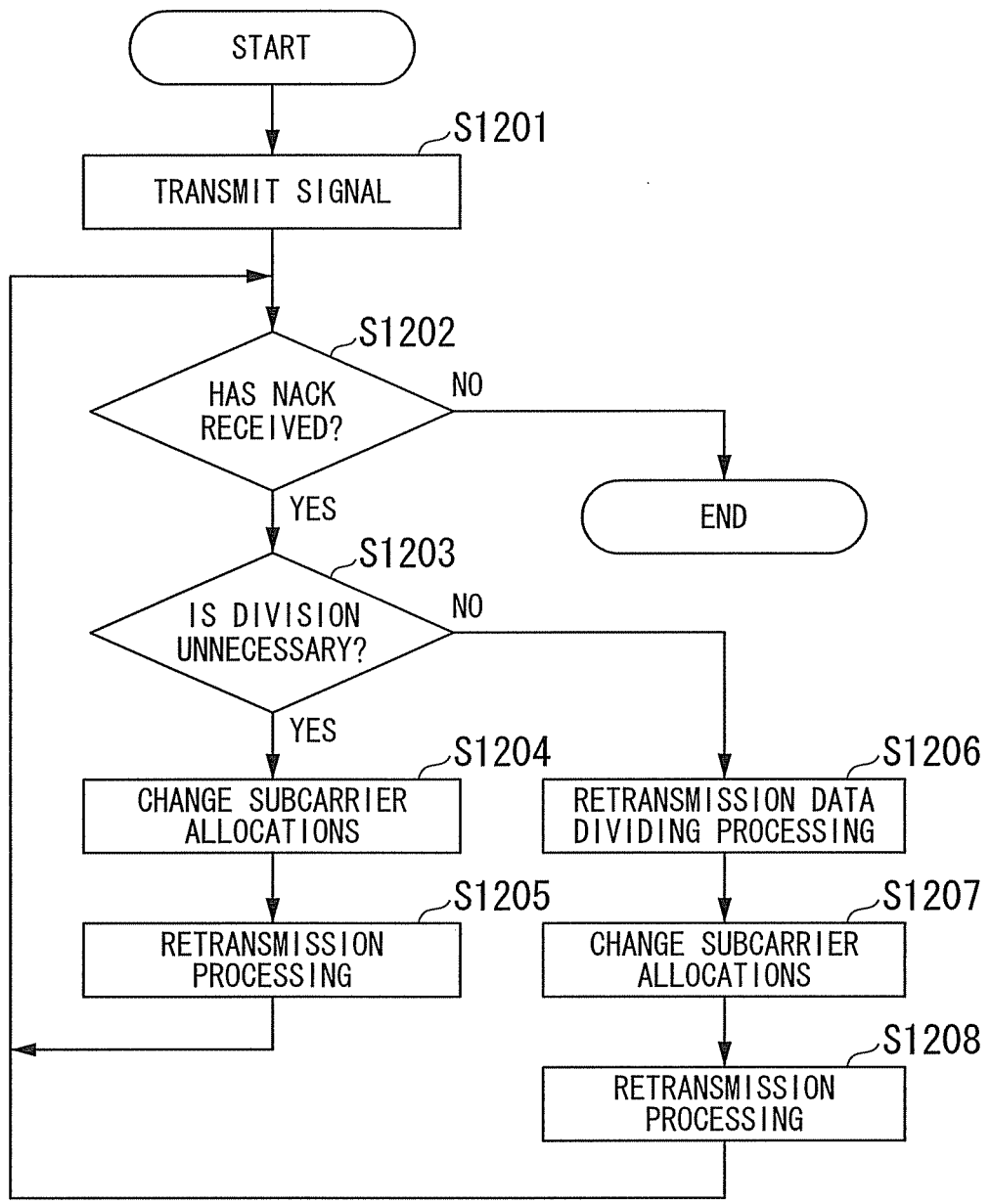
FIG. 33 is a flowchart showing a processing procedure of retransmission control of a transmitting device.

FIG. 33 is a flowchart showing a processing procedure of retransmission control in the transmitting device 1002. As shown in FIG. 33, when the transmitting section 1205 transmits a desired signal via the antenna 1206 (step S1201), the transmitting device 1002 waits to receive retransmission command information generated by the retransmitted signal receiving control section 1109. It is noted that in the process of generating the desired signal, the retransmission control section 1203 temporarily stores the values of respective modulated symbols included in the desired signal.

When no retransmission command information is received after a predetermined time elapses, or when information (e.g., ACK) indicating the normal reception is received (step S1202-NO), the retransmission control processing of this desired signal ends without the retransmission control section 1203 having performed the retransmission processing.

On the other hand, when a NACK is received, or when information indicating the normal reception is not received within the predetermined time (step S1202-YES), the retransmission control section 1203 determines whether or not the number of modulated symbols included in a packet to be retransmitted is greater than the number of non-interference subcarriers (step S1203).

If the number of modulated symbols included in the packet to be retransmitted is smaller than the number of non-interference subcarriers, i.e., when it is not necessary to divide the packet, (step S1203-YES), the retransmission control section 1203 reallocates the modulated symbols to be retransmitted to the non-interference subcarriers (step S1204). The subcarrier allocating section 1204 then generates a modulated signal of the retransmission signal in accordance with this allocation, and transmits the retransmission signal and retransmission control information via the transmitting section 1205 and the antenna 1206 (step S1205).

On the other hand, if the number of modulated symbols included in the packet to be retransmitted is greater than the number of non-interference subcarriers, i.e., when it is necessary to divide the packet (step S1203-NO), the retransmission control section 1203 divides the packet to be retransmitted in accordance with the number of non-interference subcarriers (step S1206). The retransmission control section 1203 then reallocates the modulated symbols to be retransmitted over a plurality of timeslots to the non-interference subcarriers (step S1207). The subcarrier allocating section 1204 then generates modulated signals of a plurality of retransmission signals in accordance with this allocation, and transmits the retransmission signals and retransmission control information via the transmitting section 1205 and the antenna 1206 (step S1208).

After the processing of step S1205 and step S1208, the retransmission control section 1203 returns to the decision processing of step S1202 again and waits to determine whether or not a NACK is received again.

In accordance with a wireless communication system including the receiving device 1001 and the transmitting device 1002 thus configured, when a NACK is being neither transmitted nor received, the plurality of modulated symbols output from the modulating section 1202 are arranged at fixed ratios in the subcarriers with interference and subcarriers without interference respectively, and superposed multicarrier transmission is thus realized. Therefore, the utilization efficiency of the frequency band can be increased.

On the other hand, when an error occurs in the reception of the packet due to interference in the superposed multicarrier transmission, the receiving device 1001 transmits a NACK, and retransmission is accomplished using non-interference subcarriers. Therefore, even in an environment in which interference is liable to occur, such as superposed multicarrier transmission, the transmission processing can be completed normally, and the error occurrence probability during retransmission can be reduced, thereby enhancing the reception quality.

[Modifications]

The superposed band information generating section 1103 of the receiving device 1001 may be configured to generate superposed band information for every received signal, or it may be configured to regularly generate superposed band information. Similarly, the superposed band information signal transmitting section 1104 of the receiving device 1001 may be configured to transmit a superposed band information signal for every received signal, or it may be configured to regularly transmit a superposed band information signal.

Additionally, the subcarrier arrangement scheme employed in the wireless communication system including the receiving device 1001 and the transmitting device 1002 may be distributed type or continuous type.

Moreover, while in the wireless communication system described above, the receiving device 1001 and the transmitting device 1002 control retransmission by transmitting and receiving a NACK, it may be configured to control retransmission by transmitting and receiving an ACK. In that case, when reception has been made correctly in the receiving device 1001 (FIG. 32: step S1108-YES), the receiving device 1001 transmits an ACK to the transmitting device 1002, and outputs the received data in step S1110. On the other hand, when reception has not been made correctly in the receiving device 1001 (FIG. 32: step S1108-NO), the receiving device 1001 does not transmit a NACK (step S1109) and returns to the processing of step S1101. Moreover, after transmitting the signal in step S1201 of FIG. 33, the transmitting device 1002 thus configured determines whether or not an ACK has been received within a fixed time in step S1202 after the transmission. If the transmitting device 1002 has not received an ACK within the fixed time after the transmission, it proceeds to the processing of step S1203; conversely, when it has received an ACK within the fixed time after the transmission, it ends processing.

Fourth Embodiment

Figure 34:
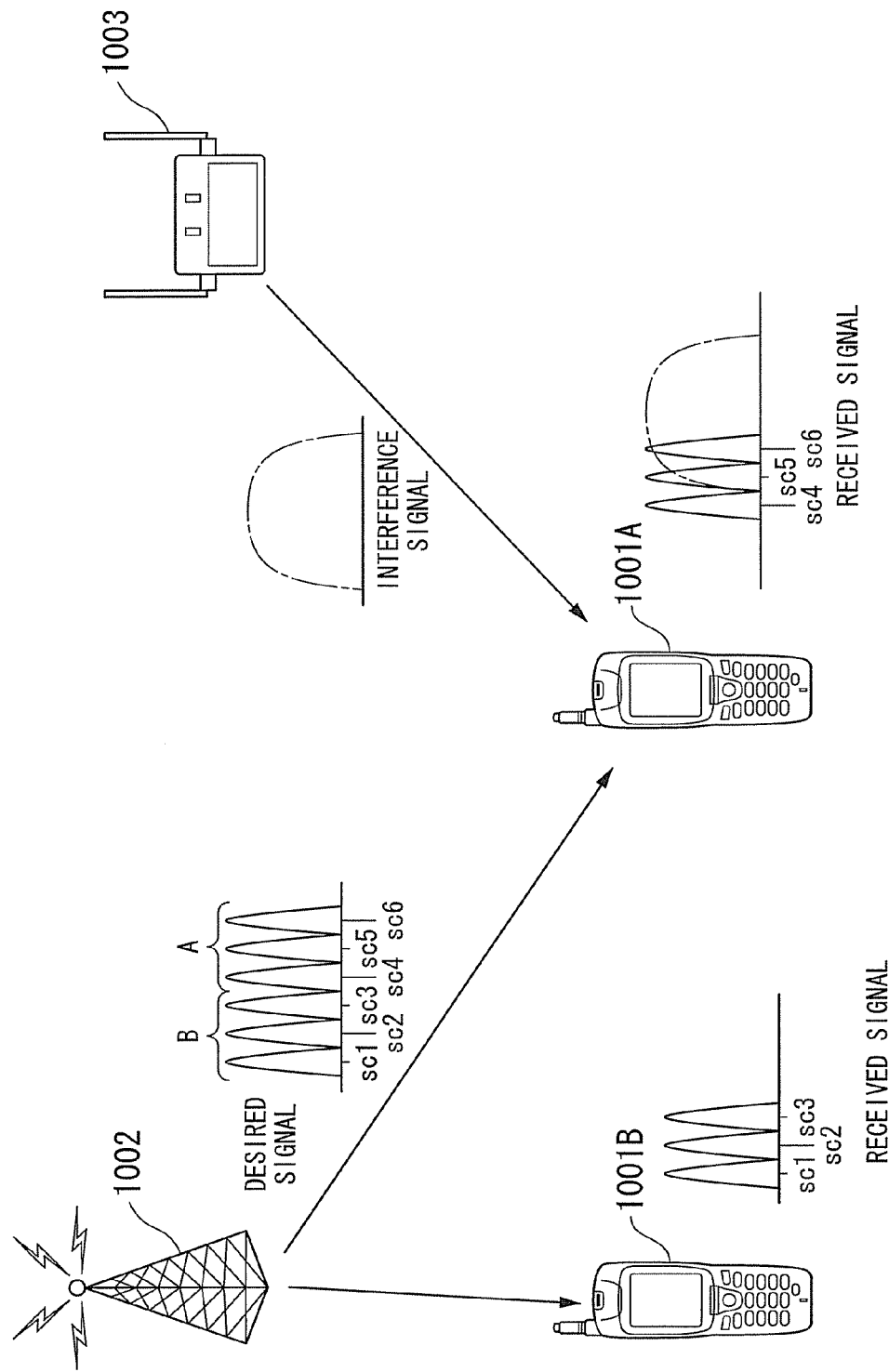
FIG. 34 is a schematic diagram showing an overview of a network environment in which a transmitting device in accordance with a fifth embodiment of the present invention is arranged.

FIG. 34 is a schematic diagram showing an overview of a network environment in which a transmitting device 1002 in accordance with the present embodiment is arranged. It is noted that the configuration of the transmitting device 1002 in accordance with the present embodiment is similar to that of the transmitting device shown in FIG. 29, with an exception that the operation of the retransmission control section 1203 differs as follows. The transmitting device 1002 distributes subcarriers of available frequency bands to a plurality of receiving devices (in the example of FIG. 34, two devices: a receiving device 1001A and a receiving device 1001B) to transmit a desired signal. In the case of FIG. 34, six subcarriers sc1 to sc6 are available to the transmitting device 1002, three subcarriers sc1 to sc3 are allocated to the receiving device 1001B, and the remaining three subcarriers sc4 to sc6 are allocated to the receiving device 1001A.

Even in receiving devices which receive a desired signal transmitted from the single transmitting device 1002, if there are differences in their reception environments, the presence/absence of interference differs from each other. For example, in FIG. 34, since the receiving device 1001A is in an environment that receives an interference signal from the interference source 1003, it cannot correctly receive subcarriers sc5 and sc6 in the received desired signal. On the other hand, since the receiving device 1001B is sufficiently distant from the interference source 1003, the reception strength of the received interference signal is weak, and thus it correctly receives signals even in the frequency bands of the subcarriers sc4 to sc6.

Accordingly, when the retransmission control section 1203 of the transmitting device 1002 in the present embodiment receives retransmission command information from a receiving device (here, it is assumed that it is the receiving device 1001A), the retransmission control section 1203 selects non-interference subcarriers to be used in retransmission from all subcarriers of frequency bands available to the transmitting device 1002, that is, from among all the subcarriers which are not allocated to the receiving device 1001A at that moment (subcarriers sc1 to sc3 in FIG. 34) and all the subcarriers which are already allocated to the receiving device 1001A (subcarriers sc4 to sc6) based on the superposed band information of the receiving device 1001A that has transmitted the retransmission command information.

Figure 35:
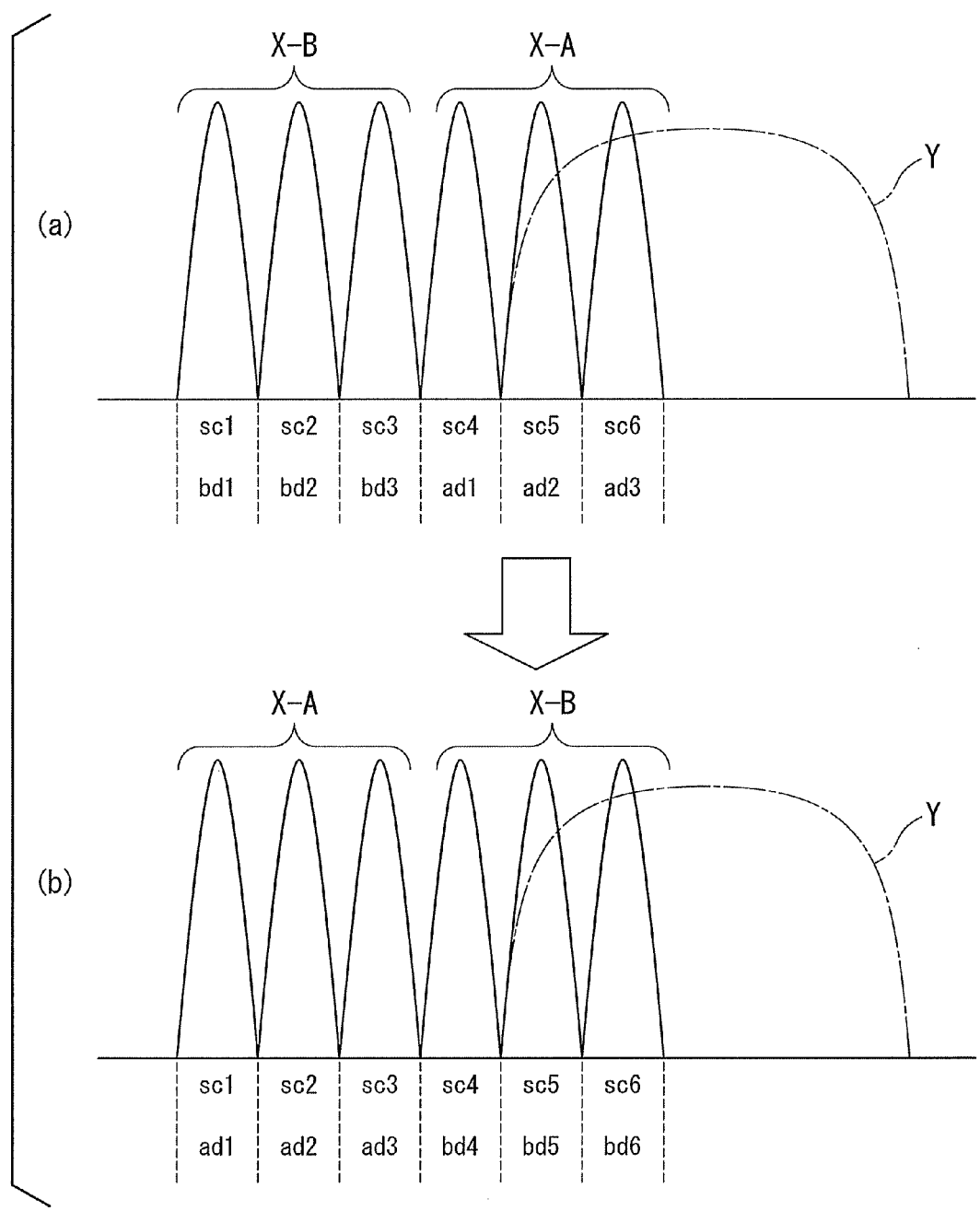
FIG. 35 is a diagram showing an overview of a desired signal and an interference signal in the network environment of FIG. 34.
Figure 36:
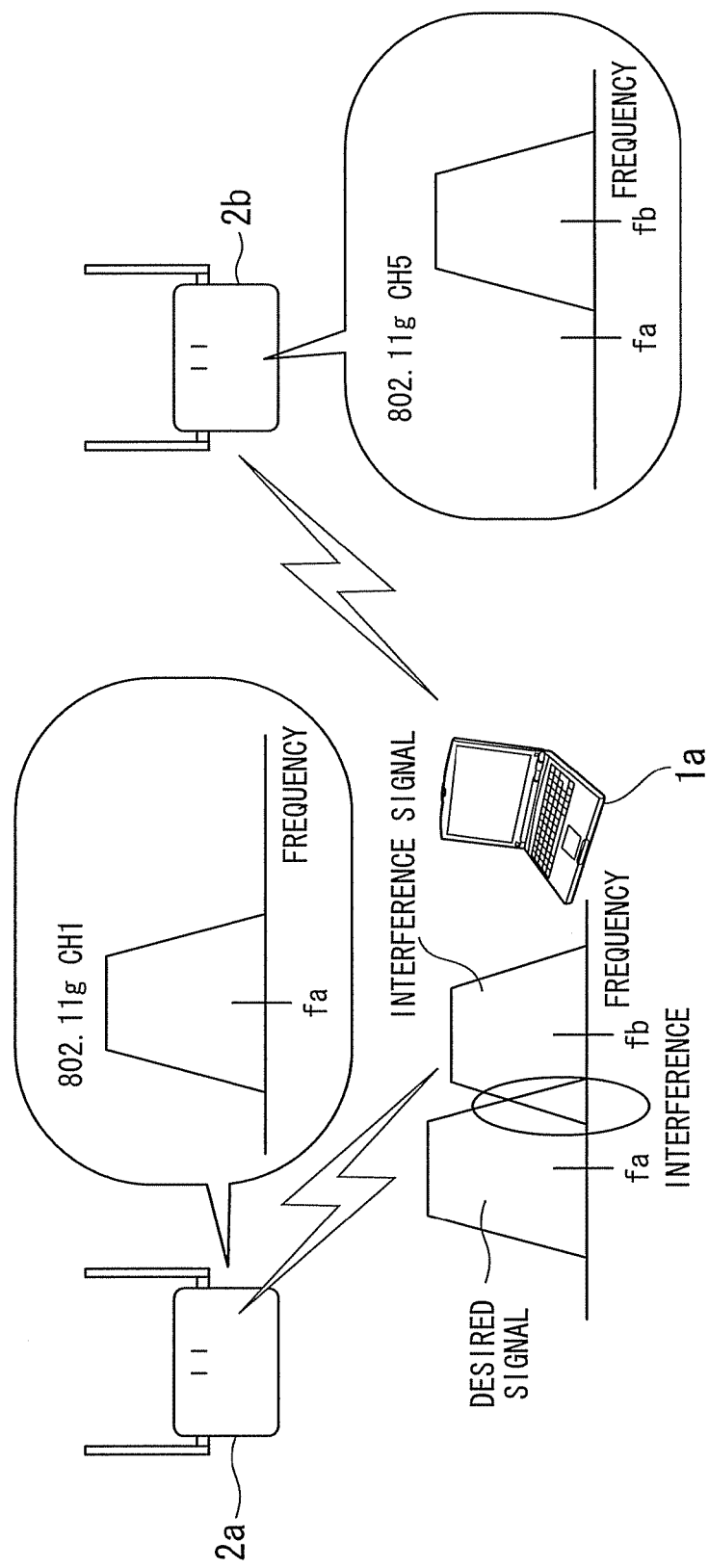
FIG. 36 is a diagram showing interference in two wireless communication systems having different frequency channels.

FIG. 35 is a diagram showing an overview of a desired signal and an interference signal in the network environment of FIG. 34. In FIG. 35 (a), subcarriers sc1 to sc3 represented by a reference symbol X-B represent a desired signal transmitted to the receiving device 1001B before retransmission, and modulated symbols bd1 to bd3 are respectively arranged in the respective subcarriers. In FIG. 35 (a), subcarriers sc4 to sc6 represented by a reference symbol X-A represent a desired signal transmitted to the receiving device 1001A before retransmission, and modulated symbols ad1 to ad3 are respectively arranged in the respective subcarriers.

FIG. 35 (b) shows a specific example of a desired signal at the time of retransmission generated under retransmission control by the retransmission control section 1203 in the present embodiment. Upon receipt of a NACK, the retransmission control section 1203 identifies a packet to be retransmitted based on the retransmission command information, and identifies respective modulated symbols that constitute this packet. Additionally, based on superposed band information, the retransmission control section 1203 identifies non-interference subcarriers with no interference at the receiving device 1001A from among all the available subcarriers, irrespective of whether they are allocated to the receiving device 1001A that has transmitted the NACK. For example, the retransmission control section 1203 selects, as subcarriers used in retransmission, subcarriers that are furthest in the frequency domain from the subcarriers sc5 and sc6 in which interference signals have been detected. In the case of FIG. 35 (b), the retransmission control section 1203 selects the subcarriers sc1 to sc3. The retransmission control section 1203 then reads the values of the modulated symbols to be retransmitted ad1 to ad3 from the plurality of modulated symbols being temporarily stored, and commands the subcarrier allocating section 1204 to arrange these modulated symbols in the selected non-interference subcarriers. The retransmission control section 1203 also commands the subcarrier allocating section 1204 to allocate the remaining subcarriers sc4 to sc6 to the other receiving device 1001B, and to arrange modulated symbols bd4 to bd6 to be newly transmitted to these subcarriers sc4 to sc6. In accordance with these commands, the subcarrier allocating section 1204 allocates the modulated symbols to the non-interference subcarriers as commanded, and generates a modulated signal. The retransmission control section 1203 then generates information indicating the subcarriers to which the signal of the packet to be retransmitted is allocated (e.g. information indicating the frequencies and the timeslots of the subcarriers) as retransmission control information for each receiving device, and transmits it via the antenna 1206 to the respective receiving devices 1001A and 1001B.

In accordance with the transmitting device 1002 in the present embodiment thus configured, the selection of the non-interference subcarriers is not limited to that from the subcarriers of frequency bands allocated to the respective receiving devices before retransmission, and they are selected from subcarriers of all frequency bands available to the transmitting device 1002. Therefore, the flexibility in selecting the non-interference subcarriers used in the retransmission processing is enhanced, whereby the transmission speed and transmission quality at the time of retransmission can be increased.

While embodiments of the present invention have been described with reference to the drawings, the specific configurations are not limited to these embodiments, and design and the like that do not depart from the gist of the present invention (additions, omissions, substitutions, and other modifications of the structure) is also included. The present invention is not limited by the foregoing description, and is limited only by the appended claims.

INDUSTRIAL APPLICABILITY

The present invention can be used in, for example, wireless communication using a multicarrier transmission scheme in a wireless communication environment in which interference signals are present. In accordance with the present invention, the reception quality can be enhanced in a multicarrier wireless communication system employing error correction that generates systematic bits and parity bits. Additionally, in accordance with the present invention, even in an environment in which interference is liable to occur, such as superposed multicarrier transmission, the transmission processing can be completed normally, and the error occurrence probability during retransmission can be reduced, thereby improving the reception quality.

DESCRIPTION OF REFERENCE SYMBOLS 100, 100a, 100b, 100c, 110d transmitting device
110 coder
120 interleaver for systematic bits
130 interleaver for parity bits
140, 141 data allocator
145 interleaver for non-superposed band
146 interleaver for superposed band
150, 150-1, 150-2, 151-1, 151-2 modulator
160 OFDM modulator
170 storage section
180 deinterleaver
190 interleaver
200, 200a receiving device
210 OFDM demodulator
220 demodulator
230 deinterleaver
240 interleaver
245 deinterleaver for non-superposed band
246 deinterleaver for superposed band
250 data extractor
260 deinterleaver for systematic bits
270 deinterleaver for parity bits
280 decoder
290 storage section
300 receiving device
301 superposed band detector
302 weighting coefficient generator
303 demodulator
304 weighting calculator
305 decoder
400 receiving device
401 antenna
402 receiving section
403 interference information extracting section
404 filter control section
405 delay section
406 filter
407 demodulating section
408 deinterleaver
409 FEC decoding section
1001, 1001A, 1001B receiving device
1101 antenna
1102 receiving section
1103 superposed band information generating section
1104 superposed band information signal transmitting section
1105 weighting coefficient generating section
1106 demodulating section
1107 weight calculating section
1108 decoding section
1109 retransmitted signal receiving control section
1110 error deciding section
1002 transmitting device
1201 coding section 1202 modulating section
1203 retransmission control section
1204 subcarrier allocating section
1205 transmitting section
1206 antenna

The invention claimed is:

1. A communication system which superposes and transfers a wireless multicarrier signal comprising a plurality of subcarriers, comprising:
a transmitting device which comprises a coding section which applies error correction coding with a coding rate by which a ratio of a bit sequence of parity bits to a bit sequence of systematic bits is larger than a ratio of a superposed band which is a frequency band in which an interference signal is present to a non-superposed band which is a frequency band in which no interference signal is present, the transmitting device performing allocation of predetermined data generated from transmission data to both the non-superposed band and the superposed band, or to the non-superposed band while giving a higher priority to the non-superposed band, and generating and transmitting the multicarrier signal based on the allocation; and
a receiving device which receives the multicarrier signal transmitted from the transmitting device.

2. The communication system according to claim 1, wherein
the coding section applies the error correction coding to generate the systematic bits and the parity bits from the transmission data,
the transmitting device comprises:
a data allocating section which, based on information on the superposed band in a used frequency band of the multicarrier signal, preferentially allocates the systematic bits generated by the coding section to the non-superposed band in the used frequency band, and preferentially allocates the parity bits generated by the coding section to the superposed band;
a modulating section which modulates the systematic bits and the parity bits into subcarriers in a frequency band allocated by the data allocating section; and
a multicarrier signal modulating section which generates the multicarrier signal from a signal modulated into the respective subcarriers by the modulating section,
the receiving device comprises:
a multicarrier signal demodulating section which demodulates the multicarrier signal received from the transmitting device for the respective subcarriers;
a demodulating section which demodulates received signals of the respective subcarriers demodulated by the multicarrier signal demodulating section;
a data extracting section which, based on the information on the superposed band in the used frequency band of the multicarrier signal, obtains used frequency bands of the systematic bits and the parity bits, and, based on the used frequency bands thus obtained, extracts the parity bits and the systematic bits from the received signal of the respective subcarriers demodulated by the demodulating section; and
a decoding section which decodes the transmission data using the systematic bits and the parity bits extracted by the data extracting section, and
the predetermined data is the systematic bits.

3. The communication system according to claim 2, wherein
the transmitting device further comprises an interleaver for systematic bits which interleaves the systematic bits generated by the coding section, and outputs to the modulating section, and
the receiving device further comprises a deinterleaver for systematic bits which deinterleaves the systematic bits extracted by the data extracting section, and outputs to the decoding section.

4. The communication system according to claim 3, wherein
the transmitting device further comprises an interleaver for parity bits which interleaves the parity bits generated by the coding section, and outputs to the modulating section, and
the receiving device further comprises a deinterleaver for parity bits which deinterleaves the parity bits extracted by the data extracting section, and outputs to the decoding section.

5. The communication system according to claim 2, wherein
the transmitting device further comprises an interleaver for non-superposed band which interleaves the systematic bits and the parity bits allocated to the non-superposed band by the data allocating section, and outputs to the modulating section, and
the receiving device further comprises a deinterleaver for non-superposed band which deinterleaves a received signal demodulated from subcarriers of the non-superposed band by the demodulating section, and outputs to the data extracting section.

6. The communication system according to claim 5, wherein
the transmitting device further comprises an interleaver for superposed band which interleaves the parity bits allocated to the superposed band by the data allocating section, and outputs to the modulating section, and
the receiving device further comprises a deinterleaver for superposed band which deinterleaves a received signal demodulated from subcarriers of the superposed band by the demodulating section, and outputs to the data extracting section.

7. A communication system which superposes and transfers a wireless multicarrier signal comprising a plurality of subcarriers, comprising:
a transmitting device which performs allocation of predetermined data generated from transmission data to both a non-superposed band which is a frequency band in which no interference signal is present and a superposed band which is a frequency band in which the interference signal is present, or to the non-superposed band while giving a higher priority to the non-superposed band, and generates and transmits the multicarrier signal based on the allocation; and
a receiving device which receives the multicarrier signal transmitted from the transmitting device,
wherein the communication system is a multicarrier wireless communication system which applies error correction coding and transfers the wireless multicarrier signal,
the receiving device comprises:
a demodulating section which demodulates the received multicarrier signal for the respective subcarriers;
a superposed band information generating section which generates superposed band information indicating the superposed band in the received multicarrier signal;

a superposed band information signal transmitting section which transmits the superposed band information to the transmitting device;

a weighting coefficient generating section which generates a weighting coefficient for each subcarrier which reduce the reliability in the error correction coding of subcarriers with interference among the plurality of subcarriers, as compared to the reliability of other subcarriers;

a weighting calculation section which performs weighting calculation processing of applying the weighting coefficient to a demodulated value of a subcarrier of the multicarrier signal demodulated by the demodulating section;

a decoding section which performs error correction processing and decoding processing using a value calculated by the weighting calculation section for each subcarrier;

an error deciding section which detects whether or not an error has occurred in a bit sequence decoded by the decoding section based on an error detection code, and, if an error has occurred, transmits retransmission command information to the transmitting device; and a retransmitted signal receiving control section which, when the error deciding section has transmitted the retransmission command information, generates a retransmitted bit sequence based on the bit sequence relating to a signal retransmitted from the transmitting device, the transmitting device comprises:

a coding section which adds the error detection code to the transmission data, performs error correction coding, and generates coded bits;

a modulating section which modulates the coded bits to generate a plurality of modulated symbols;

a subcarrier allocating section which arranges the respective modulated symbols in respective subcarriers to generate a demodulated signal;

a transmitting section which generates a transmission signal from the modulated signal, and performs transmission; and a retransmission control section which temporarily stores the modulated symbols, receives the retransmission command information and the superposed band information, and, when retransmission is commanded, selects subcarriers with no interference based on the superposed band information, and commands the subcarrier allocating section to arrange modulated symbols to be retransmitted among the modulated symbols being temporarily stored, in the selected subcarriers, and to perform retransmission and the predetermined data is the modulated symbols to be retransmitted.

8. The communication system according to claim 7, wherein, when the number of the modulated symbols to be retransmitted is larger than the number of the subcarriers with no interference, the retransmission control section transmits all of the modulated symbols to be retransmitted by performing a plurality of retransmissions using only the subcarriers with no interference, and additionally transmits retransmission control information indicating that the modulated symbols to be retransmitted are transmitted in the plurality of transmissions, and, the retransmitted signal receiving control section combines respective bit sequences transmitted in the plurality of transmissions based on the retransmission control information, to generate a retransmitted bit sequence.

9. The communication system according to claim 7, wherein the transmitting device performs wireless communication with a plurality of receiving devices by allocating a plurality of subcarriers included in an available frequency band to the plurality of receiving devices, and the retransmission control section selects the subcarriers with no interference for use in the retransmission from among all subcarriers included in the available frequency band.

10. The communication system according to claim 9, wherein the retransmission control section selects a plurality of subcarriers which are furthest in a frequency domain from the subcarriers with interference from among all subcarriers included in the available frequency band.

11. A transmitting device in a communication system which superposes and transfers a wireless multicarrier signal comprising a plurality of subcarriers, comprising:

a coding section which applies error correction coding with a coding rate by which a ratio of a bit sequence of parity bits to a bit sequence of systematic bits is larger than a ratio of a superposed band which is a frequency band in which an interference signal is present to a non-superposed band which is a frequency band in which no interference signal is present;

a data allocating section which performs an allocation of predetermined data generated from transmission data to both the non-superposed band and the superposed band, or to the non-superposed band while giving a higher priority to the non-superposed band, wherein the transmitting device generates and transmits the multicarrier signal based on the allocation.

12. The transmitting device according to claim 11, wherein the coding section applies the error correction coding to generate the systematic bits and the parity bits from the transmission data, based on information on the superposed band in a used frequency band of the multicarrier signal, the data allocating section preferentially allocates the systematic bits generated by the coding section to the non-superposed band in the used frequency band, and preferentially allocates the parity bits generated by the coding section to the superposed band, the transmitting device further comprises:

a modulating section which modulates the systematic bits and the parity bits into subcarriers in a frequency band allocated by the data allocating section; and a multicarrier signal modulating section which generates the multicarrier signal from a signal modulated into the respective subcarriers by the modulating section, and the predetermined data is the systematic bits.

13. A receiving device which receives a wireless multicarrier signal comprising a plurality of subcarriers, comprising:

a multicarrier signal demodulating section which demodulates the multicarrier signal received from a transmitting device for the respective subcarriers;

a demodulating section which demodulates received signals of the respective subcarriers demodulated by the multicarrier signal demodulating section;

a weighting coefficient generating section which generates a weighting coefficient for each subcarrier which reduces the reliability in error correction coding of subcarriers with interference among the plurality of subcarriers, as compared to the reliability of other subcarriers;

a weighting calculation section which performs weighting calculation processing of applying the weighting coefficient to a demodulated value of a subcarrier of the multicarrier signal demodulated by the demodulating section;

a data extracting section which, based on information on a superposed band in a used frequency band of the multicarrier signal, obtains used frequency bands of systematic bits and parity bits, and extracts the parity bits and the systematic bits from the received signal of the respective subcarriers demodulated by the demodulating section based on the used frequency band thus obtained; and a decoding section which decodes transmission data by performing error correction processing and decoding processing using the systematic bits and the parity bits extracted by the data extracting section as well as a value calculated by the weighting calculation section for each subcarrier.

14. A communication method used in a communication system which superposes and transfers a wireless multicarrier signal comprising a plurality of subcarriers, comprising:

a coding step in which a transmitting device applies error correction coding with a coding rate by which a ratio of a bit sequence of parity bits to a bit sequence of systematic bits is larger than a ratio of a superposed band which is a frequency band in which an interference signal is present to a non-superposed band which is a frequency band in which no interference signal is present;

a data allocating step in which the transmitting device performs an allocation of predetermined data generated from transmission data to both the non-superposed band and the superposed band, or to the non-superposed band, while giving a higher priority to the non-superposed band;

a step in which the transmitting device generates and transmits the multicarrier signal based on the allocation; and a step in which a receiving device receives the transmitted multicarrier signal.

15. The communication method according to claim 14, wherein in the coding step, the transmitting device applies the error correction coding to generate the systematic bits and the parity bits from the transmission data, in the data allocating step, based on information on the superposed band in a used frequency band of the multicarrier signal, the transmitting device preferentially allocates the systematic bits generated in the coding step to the non-superposed band in the used frequency band, and preferentially allocates the parity bits generated in the coding step to the superposed band;

the method further comprises:

a modulating step in which the transmitting device modulates the systematic bits and the parity bits into subcarriers in a frequency band allocated in the data allocating step;

a multicarrier signal modulating step in which the transmitting device generates the multicarrier signal from a signal modulated into the respective subcarriers in the modulating step;

a multicarrier signal demodulating step in which the receiving device demodulates the multicarrier signal received from the transmitting device for the respective subcarriers;

a demodulating step in which the receiving device demodulates received signals of the respective subcarriers demodulated in the multicarrier signal demodulating step;

a data extracting step in which the receiving device, based on the information on the superposed band in the used frequency band of the multicarrier signal, obtains used frequency bands of the systematic bits and the parity bits, and, based on the used frequency bands thus obtained, extracts the parity bits and the systematic bits from the received signal of the respective subcarriers demodulated in the demodulating step; and a decoding step in which the receiving device decodes the transmission data using the systematic bits and the parity bits extracted in the data extracting step, wherein the predetermined data is the systematic bits.

16. A communication method used in a communication system which superposes and transfers a wireless multicarrier signal comprising a plurality of subcarriers, comprising:

a data allocating step in which a transmitting device performs an allocation of predetermined data generated from transmission data to both a non-superposed band which is a frequency band in which no interference signal is present and a superposed band which is a frequency band in which the interference signal is present, or to the non-superposed band, while giving a higher priority to the non-superposed band;

a step in which the transmitting device generates and transmits the multicarrier signal based on the allocation; and a step in which a receiving device receives the transmitted multicarrier signal, wherein the communication method is a multicarrier wireless communication method which applies error correction coding and transfers the wireless multicarrier signal, further comprising:

a demodulating step in which the receiving device demodulates the received multicarrier signal for the respective subcarriers;

a superposed band information generating step in which the receiving device generates superposed band information indicating the superposed band in the received multicarrier signal;

a superposed band information signal transmitting step in which the receiving device transmits the superposed band information to the transmitting device;

a weighting coefficient generating step in which the receiving device generates a weighting coefficient for each subcarrier which reduces the reliability in the error correction coding of subcarriers with interference among the plurality of subcarriers, as compared to the reliability of other subcarriers;

a weighting calculation step in which the receiving device performs weighting calculation processing of applying the weighting coefficient to a demodulated value of a subcarrier of the multicarrier signal demodulated in the demodulating step;

a decoding step in which the receiving device performs error correction processing and decoding processing using a value of each subcarrier calculated in the weighting calculation step;

an error deciding step in which the receiving device detects whether or not an error has occurred in a bit sequence decoded in the decoding step based on an error detection code, and, if an error has occurred, transmits a retransmission command information to the transmitting device;

a retransmitted signal receiving control step in which, when the error deciding step has transmitted the retransmission command information, the receiving device generates a retransmitted bit sequence based on the bit sequence relating to a signal retransmitted from the transmitting device;

a coding step in which the transmitting device adds the error detection code to the transmission data, performs error correction coding, and generates coded bits;

a modulating step in which the transmitting device modulates the coded bits and generates a plurality of modulated symbols;

a subcarrier allocating step in which the transmitting device arranges the respective modulated symbols into the respective subcarriers, and generates a modulated signal;

a transmitting step in which the transmitting device generates a transmission signal from the modulated signal, and performs transmission; and a step in which the transmitting device temporarily stores the modulated symbols, receives the retransmission command information and the superposed band information, and, when retransmission is commanded, selects subcarriers with no interference based on the superposed band information, arranges modulated symbols to be retransmitted among the modulated symbols being temporarily stored, in the selected subcarriers, and performs retransmission, wherein the predetermined data is the modulated symbols to be retransmitted.

17. A transmission method used in a communication system which superposes and transmits a wireless multicarrier signal comprising a plurality of subcarriers, comprising:

a coding step of applying error correction coding with a coding rate by which a ratio of a bit sequence of parity bits to a bit sequence of systematic bits is larger than a ratio of a superposed band which is a frequency band in which an interference signal is present to a non-superposed band which is a frequency band in which no interference signal is present;

a data allocation step of performing an allocation of predetermined data generated from transmission data to both the non-superposed band and the superposed band, or to the non-superposed band, while giving a higher priority to the non-superposed band; and a step of generating and transmitting the multicarrier signal based on the allocation.

18. The communication system according to claim 8, wherein the transmitting device performs wireless communication with a plurality of receiving devices by allocating a plurality of subcarriers included in an available frequency band to the plurality of receiving devices, and the retransmission control section selects the subcarriers with no interference for use in the retransmission from among all subcarriers included in the available frequency band.

19. The communication system according to claim 18, wherein the retransmission control section selects a plurality of subcarriers which are furthest in a frequency domain from the subcarriers with interference from among all subcarriers included in the available frequency band.

* * * * *